(12) United States Patent
Hall et al.

(10) Patent No.: US 7,626,805 B2
(45) Date of Patent: Dec. 1, 2009

(54) DISK-DRIVE SYSTEM SUPPORTING MASSIVELY PARALLEL VIDEO STREAMS AND METHOD

(75) Inventors: Jonathan E. Hall, Golden, CO (US); Daniel M. McCormick, Superior, CO (US); Eric J. Wendel, Johnstown, CO (US); Charles A. Lemaire, Apple Valley, MN (US)

(73) Assignee: Atrato, Inc., Louisville, CO (US)

( * ) Notice: Subject to any disclaimer, the term of this patent is extended or adjusted under 35 U.S.C. 154(b) by 280 days.

(21) Appl. No.: 11/537,607

(22) Filed: Sep. 30, 2006

(65) Prior Publication Data
US 2007/0035879 A1 Feb. 15, 2007

Related U.S. Application Data

(62) Division of application No. 11/027,777, filed on Dec. 29, 2004, now Pat. No. 7,167,359.

(60) Provisional application No. 60/580,987, filed on Jun. 18, 2004, provisional application No. 60/533,605, filed on Dec. 29, 2003.

(51) Int. Cl.
*G06F 1/16* (2006.01)
(52) U.S. Cl. ............... 361/579.33; 246/638; 360/97.03; 312/223.4

(58) Field of Classification Search .............. 360/97.03, 360/137; 312/223.1, 223.2; 248/638; 211/26; 361/679–687, 724, 727
See application file for complete search history.

(56) References Cited

U.S. PATENT DOCUMENTS

| 4,433,388 A | 2/1984 | Oosterbaan |
| 4,761,785 A | 8/1988 | Clark et al. |
| 5,435,737 A | 7/1995 | Haga et al. |
| 5,490,723 A | 2/1996 | Driscoll et al. |

(Continued)

*Primary Examiner*—Hung V Duong
(74) *Attorney, Agent, or Firm*—Charles A. Lemaire; Jonathan M. Rixen; Lemaire Patent Law Firm, P.L.L.C.

(57) ABSTRACT

A system and method for an improved multiple hard-disk-drive data-storage enclosure. Some embodiments position drives in counter-rotating pairs, each simultaneously accessing half the data, such that seek-caused actuator rotational-acceleration vibration cause simultaneous canceling rotational torque. Some embodiments position the edge of a first drive (or drive pair) at an angle to the actuator midpoint of a nearby second drive (or drive pair), such that rotational-acceleration vibration from a seek-caused actuator rotation in the first drive does not cause a rotational movement into the second drive that affects the tracking or seek operation. Some further embodiments position drives in a herringbone pattern to redirect air flow in addition to reducing rotational-acceleration vibration interaction. Other embodiments include a printed wire circuit board mounted to reduce the rotational-acceleration vibration interaction.

20 Claims, 25 Drawing Sheets

U.S. PATENT DOCUMENTS

| | | |
|---|---|---|
| 5,500,779 A | 3/1996 | Diel |
| 6,154,361 A | 11/2000 | Anderson et al. |
| 6,288,902 B1 | 9/2001 | Kim et al. |
| 6,292,360 B1 | 9/2001 | Carteau |
| 6,388,873 B1 | 5/2002 | Brooks et al. |
| 6,487,039 B1 | 11/2002 | Bernett |
| 6,574,721 B1 | 6/2003 | Christenson et al. |
| 6,636,380 B2 | 10/2003 | Goeke et al. |
| 6,785,133 B2 | 8/2004 | Barringer et al. |
| 6,948,090 B2 | 9/2005 | King |
| 6,987,674 B2 | 1/2006 | El-Batal et al. |
| 7,019,966 B2 * | 3/2006 | Lee ............................. 361/685 |
| 7,077,670 B2 | 7/2006 | Suwa et al. |
| 7,345,296 B2 | 3/2008 | Tombler, Jr. et al. |
| 2004/0057202 A1 | 3/2004 | Rabinovitz |
| 2004/0193791 A1 | 9/2004 | Felton et al. |
| 2005/0149671 A1 | 7/2005 | Suzuki et al. |
| 2006/0048001 A1 | 3/2006 | Honda et al. |
| 2006/0140069 A1 | 6/2006 | Hayashi |
| 2007/0035880 A1 * | 2/2007 | Hall et al. ................... 360/137 |
| 2007/0268662 A1 * | 11/2007 | Zhang et al. ................ 361/685 |

* cited by examiner

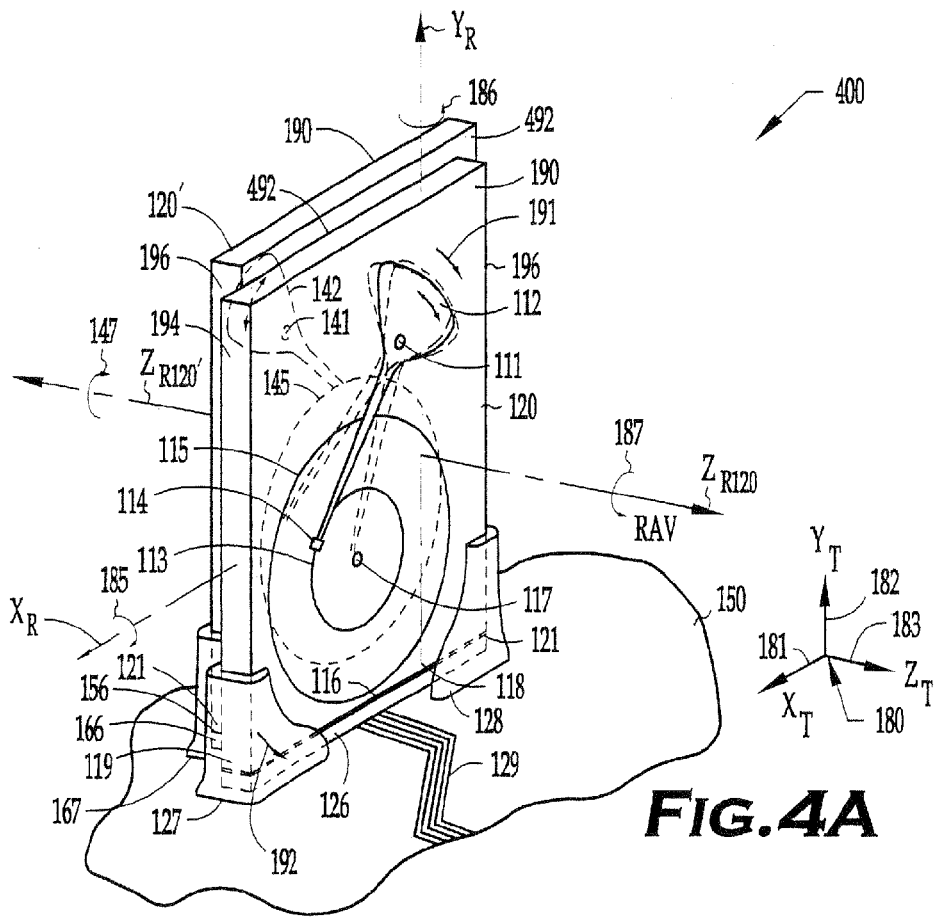
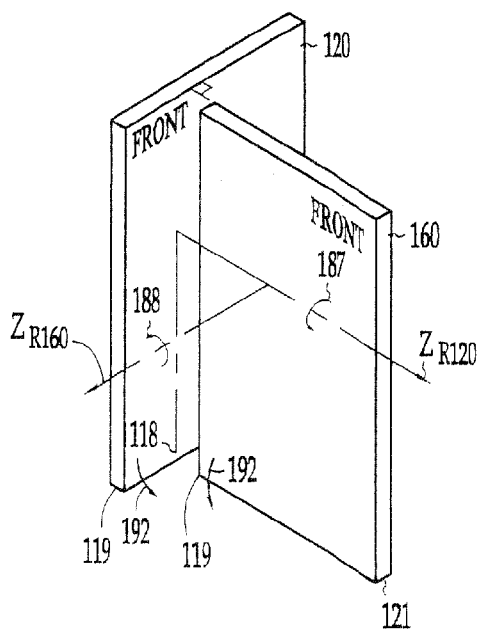 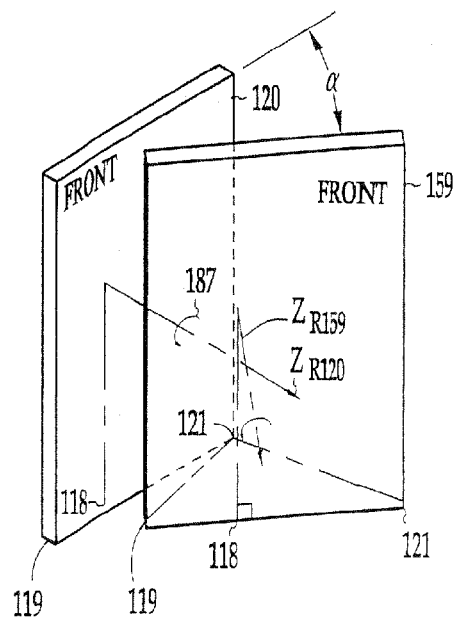
FIG.4A
FIG.4B
FIG.4C

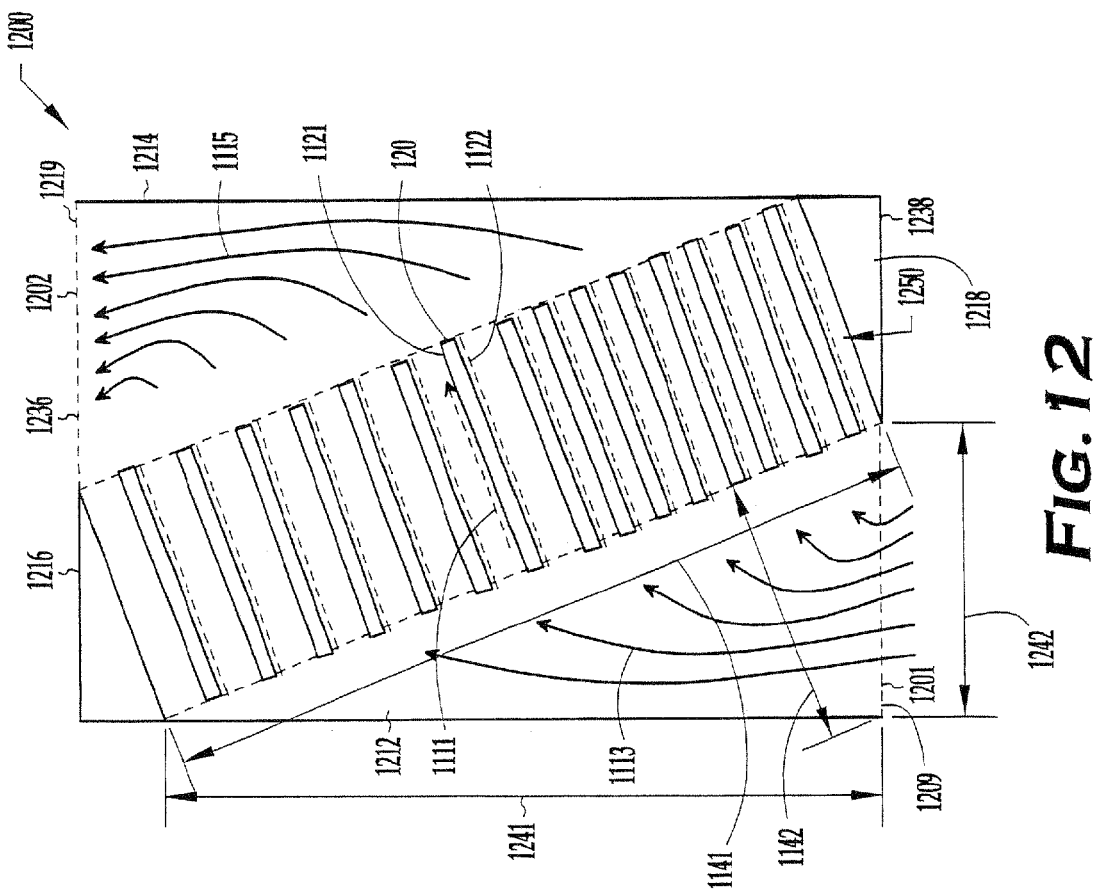

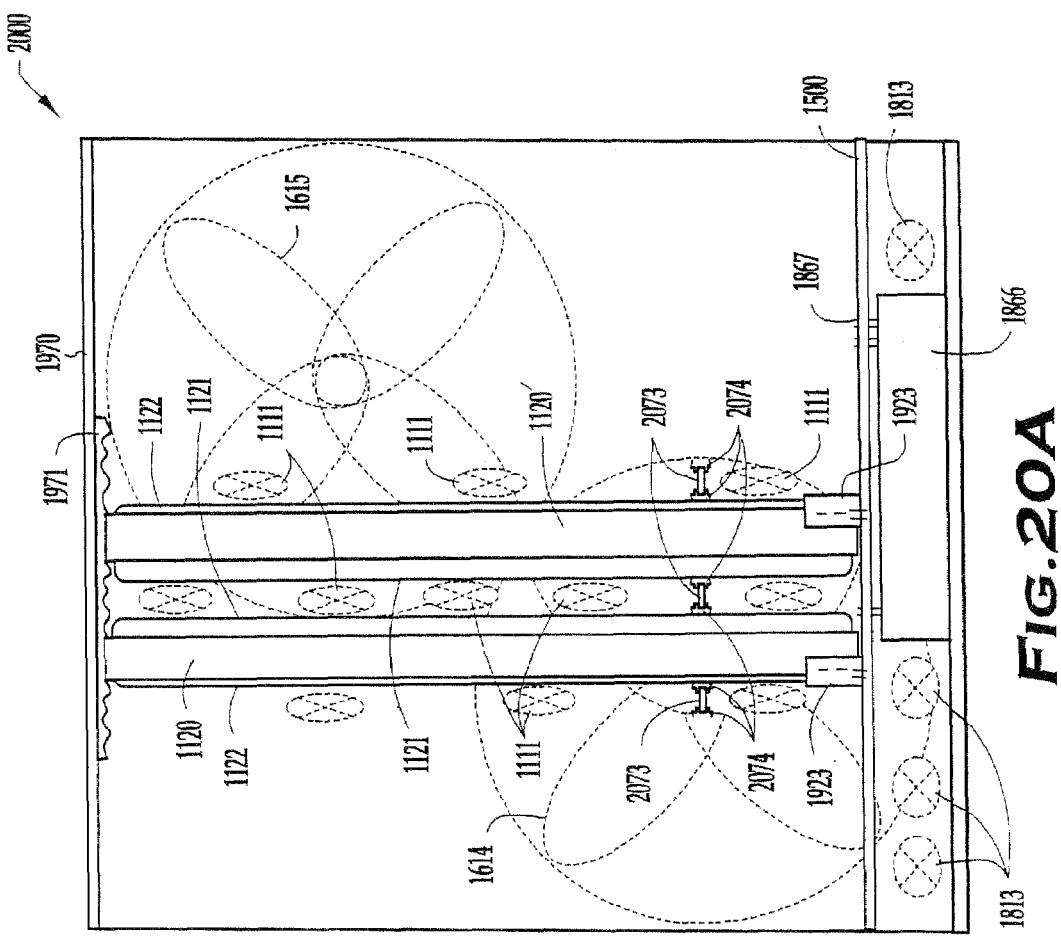
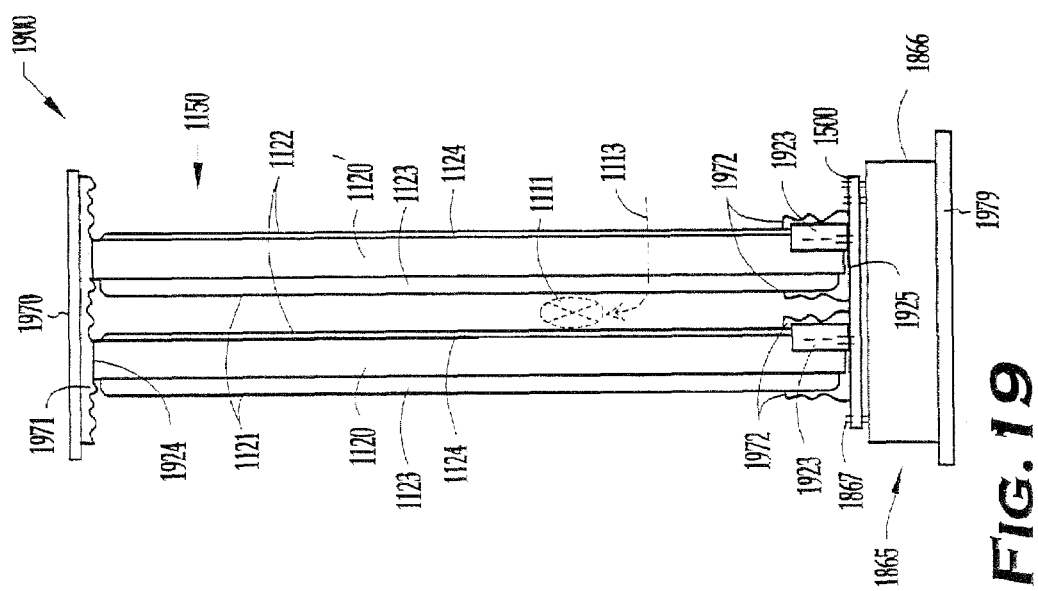

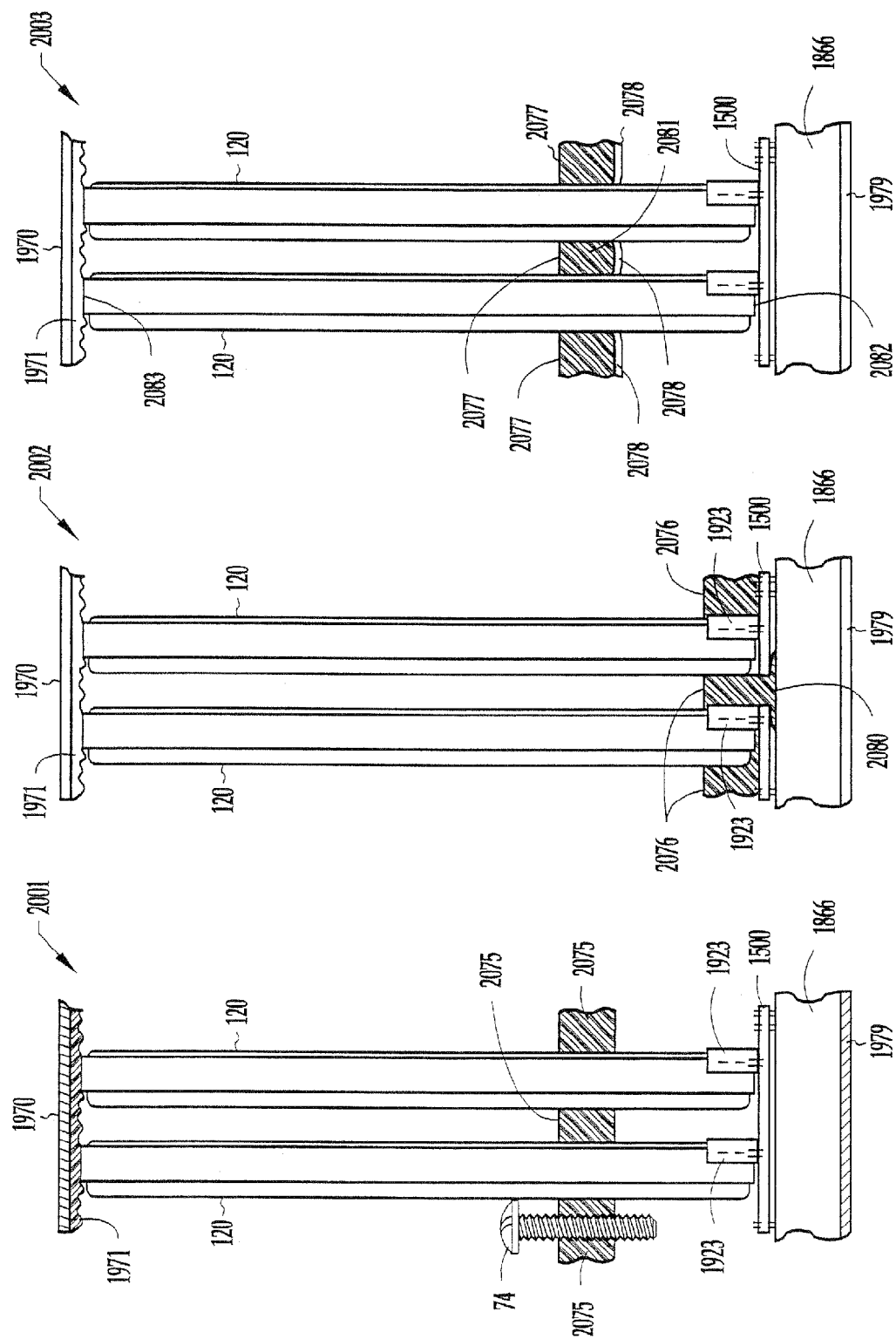

DISK-DRIVE SYSTEM SUPPORTING MASSIVELY PARALLEL VIDEO STREAMS AND METHOD

CROSS-REFERENCES TO RELATED INVENTIONS

This is a divisional of U.S. patent application Ser. No. 11/027,777, filed Dec. 29, 2004 and titled "SYSTEM AND METHOD FOR MASS STORAGE USING MULTIPLE-HARD-DISK-DRIVE ENCLOSURE," which claims benefit of U.S. Provisional Patent Application Ser. No. 60/580,987, filed Jun. 18, 2004 and titled "SYSTEM AND METHOD FOR REDUCED VIBRATION INTERACTION IN A MULTIPLE-HARD-DISK-DRIVE ENCLOSURE," and of U.S. Provisional Patent Application Ser. No. 60/533,605, filed Dec. 29, 2003 and titled "SYSTEM AND METHOD FOR IMPROVED HARD-DISK-DRIVE DATA-STORAGE ENCLOSURE," each of which is hereby incorporated by reference in its entirety. This application is also related to U.S. patent application Ser. No. 11/026,553, filed Dec. 29, 2004 and titled "SYSTEM AND METHOD FOR REDUCED VIBRATION INTERACTION IN A MULTIPLE-DISK-DRIVE ENCLOSURE," which is incorporated herein by reference in its entirety.

This application is additionally related to:

U.S. patent application Ser. No. 11/537,600 filed on Sep. 29, 2006 and entitled "DISK-DRIVE ENCLOSURE HAVING FRONT-BACK ROWS OF SUBSTANTIALLY PARALLEL DRIVES AND METHOD";

U.S. patent application Ser. No. 11/537,605 filed on Sep. 29, 2006 and entitled "DISK-DRIVE ENCLOSURE HAVING ROWS OF ALTERNATELY FACING PARALLEL DRIVES TO REDUCE VIBRATION AND METHOD";

U.S. patent application Ser. No. 11/537,606 filed on Sep. 29, 2006 and entitled "DISK-DRIVE ENCLOSURE HAVING LATERALLY OFFSET PARALLEL DRIVES TO REDUCE VIBRATION AND METHOD";

U.S. patent application Ser. No. 11/537,608 filed on Sep. 30, 2006 and entitled "DISK-DRIVE ENCLOSURE HAVING NON-PARALLEL DRIVES TO REDUCE VIBRATION AND METHOD";

U.S. patent application Ser. No. 11/537,614 filed on Sep. 30, 2006 and entitled "DISK-DRIVE ENCLOSURE HAVING PAIR-WISE COUNTER-ROTATING DRIVES TO REDUCE VIBRATION AND METHOD";

U.S. patent application Ser. No. 11/537,598 filed on Sep. 29, 2006 and entitled "DISK-DRIVE ENCLOSURE HAVING DRIVES IN A HERRINGBONE PATTERN TO IMPROVE AIRFLOW AND METHOD";

U.S. patent application Ser. No. 11/537,603 filed on Sep. 29, 2006 and entitled "DISK-DRIVE SYSTEM HAVING MULTIPLE POWER SUPPLIES AND MIRRORING AND METHOD";

U.S. patent application Ser. No. 11/537,610 filed on Sep. 30, 2006 and entitled "DISK-DRIVE SYSTEMS WITH A VARYING NUMBER OF SPARES FOR DIFFERENT EXPECTED LIFETIMES AND METHOD"; and U.S. patent application Ser. No. 11/537,613 filed on Sep. 30, 2006 and entitled "POROUS LIGHT-EMITTING DISPLAY WITH AIR FLOW THROUGH DISPLAY, ITS USE IN A DISK-DRIVE SYSTEM AND METHOD"; which are all hereby incorporated by reference in their entirety.

FIELD OF THE INVENTION

This invention relates to hard-disk-drive data-storage systems and methods, and more particularly, to enclosures that hold a large number of hard-disk-drives and provide a large number of serial data interfaces operating in parallel, resulting in, among other things, improved performance, reliability, manufacturing costs, and/or operational costs.

BACKGROUND OF THE INVENTION

Massive amounts of data storage are required for many emerging and existing applications. For example, video-on-demand applications can provide access to hundreds or thousands of movies for hundreds or thousands of users simultaneously, requiring vast amounts of digital storage, fast access, 24 hours-per-day and 7 days per week (24/7) availability and uptime, and huge bandwidth. Modern supercomputers also require these features, as well as requiring even faster access, extraordinary data integrity, error checking and error correction.

Semiconductor memories provide very fast access, reasonable densities, and moderate costs. However, most common semiconductor memories are volatile (they lose their data when not powered or not refreshed on a timely basis), they develop soft errors (errors that can be corrected by re-writing the affected location) due to various causes including alpha radiation, and they can be cost prohibitive. Additionally, the heat and power requirements can be problematic, if they are used to store vast amounts of information for long time periods.

Hard-disk drives (HDDs, also called just "disk drive" or "drive")) provide cost-effective non-volatile data storage on rotating media. Data are written and read by magnetic transducer heads that are moved to one of thousands of tracks to locate requested data. There are time penalties incurred to move the head to the requested track, to rotate the disk to the requested location on that track, and to serially read or write the data from or to the track location. The moving parts of a disk drive are prone to wear and failure over time. For applications requiring high reliability (error-free data) and availability (24/7 uptime), data can be stored in a redundant manner (e.g., redundant arrays of inexpensive disks, or RAID), and several different RAID schemes are known to the art, frequently making compromises between performance, cost, and data recoverability. Another requirement for many applications is serviceability—the ease of repairing a faulty system in the field (i.e., at a customer's location of the equipment).

Data storage servers (enclosures having one or more disk drives as well as a data processor to receive data access requests and control the storing and fetching of data to and from the disk drives) and storage vaults (enclosures having one or more disk drives but essentially no processor, and using a data processor housed in a separate enclosure to receive data access requests and control the storing and fetching of data to and from the disk drives) can be implemented in free-standing units (typically an upright unit placed on the floor or on a desk) or as rack-mount units (typically horizontally-oriented units bolted to a standardized nineteen-inch (48.26 cm) rack).

Typical conventional rack-mount disk-drive enclosures arrange a plurality (3 to 14) HDDs in removable carriers that are accessible from the "front" of the unit (the side typically facing a user area), and usually are arranged so that data and power cables are accessible from the "back" of the unit. The disk drives can thus be replaced fairly easily if one were to fail. RAID solutions can be utilized to use redundant data artifacts to compute the data that was on the failed disk drive. This data is sent to a requestor or used to recreate the data on a new (spare) disk drive once one is inserted to replace the failed unit. Since racks of rack-mount units are often installed in rows, there is typically no access provided from the sides of a rack-mount unit, and since the rack-mount units are stacked one on top of another in each rack there is typically no access provided from the top or bottom of a rack-mount unit.

High-density packaging of HDDs in an enclosure exacerbates drive-to-drive vibration interaction problems. With several HDDs, packaged closely together in single enclosure, potentially many doing simultaneous head-seeks, the vibration interaction problem is greatly increased. Previous systems and methods to package HDDs and reduce drive-to-drive vibration interaction involved mechanical stiffening of the enclosure and/or lower density packaging options.

Numerous computer applications utilize multiple disk drives for data storage and acquisition. These multiple disk drives are often located in separated locations. For example, disk drives may be arranged in rack systems that consume large amounts of space and require multiple cabinets to house the rack systems. Furthermore, positioning multiple disk drives in separate locations adds to the complexity of data acquisition from the disk drives because a more complex interface with the multiple disk drives is required. In addition, longer cabling is required to reach the separately located disk drives. Accordingly, what is needed is an apparatus that positions multiple disk drives in a manner that simplifies data acquisition from the disk drives and reduces the space needed to house the multiple disk drives.

SUMMARY OF THE INVENTION

In some embodiments, the present invention generally involves housing a large number of disk drives in an enclosure. In other embodiments, the invention is based on positioning disk drives such that forces occurring during seek and write functions within a first disk drive are counteracted by analogous forces occurring in one or more other drives that are positionally paired with the first disk drive in some embodiments. An example of such a force includes rotation and counter-rotation of disks that is caused by movement of an actuator arm within the disk drive that occurs during a seek or write function of the disk. Other examples of such forces include vibrational forces, rotational, counter-rotational forces, and the like that are due to the movement of a disk within a disk drive. These forces can be caused by numerous actions within a disk drive. Arranging the disk drives according to the invention helps to reduce detrimental results caused by such forces that can increase the incidence of read and write errors. Accordingly, the invention can be used to position multiple disk drives so that the disk drives have a reduced read and write error rate.

In some embodiments, the invention provides an apparatus that includes a substrate, and a plurality of disk drives each coupled electrically and mechanically to the substrate, the plurality of disk drives including at least a first and a second disk drive, wherein the first disk drive is positioned relative to the second disk drive so that a rotational force produced by the first disk drive is at least partially counteracted by a rotational force produced by the second disk drive.

In other embodiments, the invention provides a method that includes mounting a plurality of drives in an enclosure, the enclosure including a connector substrate, the plurality of drives including at least a first disk drive and a second disk drive that are each electrically and mechanically coupled to the enclosure; and mechanically coupling the first drive and the second drive such that rotational force produced by the first disk drive is at least partially counteracted by rotational force produced by the second disk drive.

In some embodiments, the invention provides an apparatus that includes an enclosure that includes a substrate, a means in the enclosure for mounting a plurality of disk drives to the enclosure, and a means for coupling a plurality of disk drives electrically and mechanically to the substrate, the plurality of disk drives including at least a first and a second disk drive, wherein the first disk drive is positioned relative to the second disk drive so that a rotational force produced by the first disk drive is at least partially counteracted by a rotational force produced by the second disk drive.

In some embodiments, the invention provides an apparatus that includes a substrate, and a plurality of disk drives each coupled electrically and mechanically to the substrate, the plurality of disk drives including at least a first disk drive and a second disk drive, wherein the first and second disk drive each have a first major face surrounded by a first, second, third and fourth edge and having a first, second, third and fourth corner, wherein the first disk drive and the second disk drive are positioned such that a rotational force produced by the first disk drive is conveyed primarily as a translational force to the second disk drive.

In some embodiments, the invention provides a method that includes mounting a plurality of drives in an enclosure, the plurality of drives including at least a first disk drive and a second disk drive that are each electrically and mechanically coupled to the enclosure, and mechanically coupling the first disk drive and the second disk drive such that rotational force produced by the first disk drive is at least partially transmitted as translational force to the second disk drive.

In some embodiments, the invention provides an apparatus that includes a substrate; and a means for mounting a plurality of disk drives to the substrate; and a means for coupling a plurality of disk drives electrically and mechanically to the substrate, the plurality of disk drives including at least a first disk drive and a second disk drive, wherein the first and second disk drive each have a first major face surrounded by a first, second, third and fourth edge and having a first, second, third and fourth corner, wherein the first disk drive and the second disk drive are positioned such that a rotational force produced by the first disk drive is conveyed primarily as a translational force to the second disk drive.

In some embodiments, the invention provides an apparatus that includes a substrate, and a plurality of disk-drive connectors each coupled electrically and mechanically to the substrate, the plurality of disk-drive connectors including at least a first and a second disk-drive connector, wherein the first disk-drive connector is positioned relative to the second disk-drive connector so that a rotational force produced by a first disk drive that is connected to the first disk-drive connector is at least partially counteracted by a rotational force produced by a second disk drive that is connected to the second disk-drive connector.

In some embodiments, the invention provides an apparatus that includes a substrate, and a plurality of disk-drive connectors each coupled electrically and mechanically to the substrate, the plurality of disk-drive connectors including at least a first disk-drive connector and a second disk-drive connector, wherein the first disk-drive connector and the second diskdrive connector are positioned such that a rotational force produced by a first disk drive connected to the first disk-drive connector is conveyed primarily as a translational force to a second disk drive connected to the second disk-drive connector.

In some embodiments, the invention provides a method that includes mounting a plurality of disk-drive connectors in an enclosure, the enclosure including a connector substrate, the plurality of disk-drive connectors including at least a first disk-drive connector and a second disk-drive connector that are each electrically and mechanically coupled to the enclosure, and mechanically coupling the first disk-drive connector and the second disk-drive connector such that rotational force produced by a first disk drive that is connected to the first disk-drive connector is at least partially counteracted by rotational force produced by a second disk drive that is connected to the second disk-drive connector.

In some embodiments, the invention provides a method that includes mounting a plurality of disk-drive connectors in an enclosure, the plurality of disk-drive connectors including at least a first disk-drive connector and a second disk-drive connector that are each electrically and mechanically coupled to the enclosure, and mechanically coupling the first disk-drive connector and the second disk-drive connector such that rotational force produced by a first disk drive that is connected to the first disk-drive connector is at least partially transmitted as translational force to a second disk drive that is connected to the second disk-drive connector.

In some embodiments, the invention provides a method that includes mounting a plurality of disk drives in an enclosure, the enclosure including a connector substrate, the plurality of disk drives including at least a first disk drive and a second disk drive; vibrationally coupling the first disk drive to the second disk drive, and sending a first seek operation to the first disk drive and a second seek operation to the second disk drive, wherein a timing of the first seek operation relative to the second seek operation is adjusted to minimize adverse vibrational interaction between the first disk drive and the second disk drive.

In some embodiments, the invention provides an apparatus that includes a data structure having a plurality of entries, each entry containing vibration-interaction information relative to a read operation occurring on a first disk drive of a pair of disk drives and a seek operation being performed on a second disk drive of the pair.

In some embodiments, the invention provides an apparatus that includes a memory, the memory holding vibration-interaction information, an information processing unit operatively coupled to the memory to receive the vibration-interaction information and adjusting a timing of seek operations to a plurality of disk drives based on the information.

In some embodiments, the invention provides a method that includes mounting a plurality of disk drives in shock mounts in an enclosure and "detenting" the plurality of disk drives against vibration using a disengagable detent device.

In some embodiments, the invention provides an apparatus that includes an enclosure, a substrate held within the enclosure, a plurality of disk-drive connectors each coupled mechanically to the substrate, the plurality of disk-drive connectors including at least a first and a second disk-drive connector, and an over-shock detector operatively coupled to the enclosure and adapted to detect and store information regarding one or more over-shock events.

In some embodiments, the invention provides a method that includes analyzing vibration-interaction between a plurality of disk drives held in an enclosure and storing information that is based on the analysis into a data structure.

In some embodiments, the invention provides a method that includes mounting a plurality of disk drives to disk-drive connectors within an enclosure, adhering a resilient sheet across the plurality of disk drives, and attaching a cover to the resilient sheet.

In some embodiments, the invention provides an apparatus that includes a plurality of disk drives mounted to disk-drive connectors within an enclosure, a resilient sheet (such as a visco-elastic membrane, for example) across the plurality of disk drives, and a cover.

BRIEF DESCRIPTION OF THE DRAWINGS

Various features and attendant advantages of the present invention will become fully appreciated as the invention becomes better understood upon reading the following description and when considered in conjunction with the accompanying drawings, in which like reference characters designate the same or similar parts throughout the several views.

FIG. 4A is a perspective drawing of disk drives 120 and 120' mounted in a vertical orientation in a disk-drive system 100.

FIG. 4B is a perspective drawing of a pair of disk drives in a T orientation.

FIG. 4C is a perspective drawing of a pair of disk drives in a Y orientation.

FIG. 11 is a plan-view block diagram of a data-storage system 1100 of some embodiments of the invention that provides a high density enclosure having one or more rows of disk drives.

FIG. 12 is a plan-view block diagram of a data-storage system 1200 of some embodiments of the invention that uses tapered inlet and outlet air chambers.

FIG. 19 is an elevation view of a data-storage system 1900 of some embodiments of the invention that provides a high-density enclosure having one or more rows of disk drives.

FIG. 20A is an elevation view of a data-storage system 2000 of some embodiments of the invention that provides a high-density enclosure having one or more rows of disk drives arranged in coupled pairs of counter-rotating disk drives.

FIG. 20B is an elevation view of a data-storage system 2001 of some embodiments of the invention that provides a high-density enclosure having one or more rows of disk drives with an adjustable-height mid-drive vibration damper 2075.

FIG. 20C is an elevation view of a data-storage system 2002 of some embodiments of the invention that provides a high-density enclosure having one or more rows of disk drives with a cast-in-place vibration-damper boot 2076.

FIG. 20D is an elevation view of a data-storage system 2003 of some embodiments of the invention that provides a high-density enclosure having one or more rows of disk drives with a cast-in-place mid-drive vibration damper 2077.

DETAILED DESCRIPTION

Figure 1:
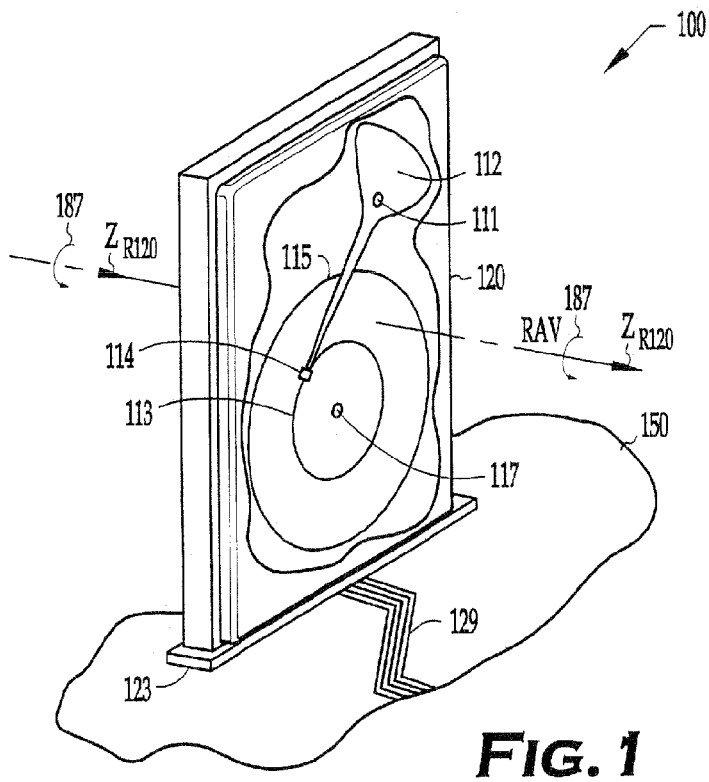
FIG. 1 is a perspective drawing of disk drive 120 mounted in a perpendicular-to-the-major-face orientation (e.g., vertical, if the major face is horizontal) in a disk-drive system 100.

In the following detailed description of preferred embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention. The references to relative terms such as top, bottom, upper, lower, vertical, horizontal, etc., refer to an example orientation such as used in the Figures, and not necessarily an orientation used during fabrication or use.

Systems and methods to densely package disk drives in an enclosure, while at the same time reducing negative effects on the disk drives that are due to drive-to-drive interactions, can improve performance, density, reliability, and also reduce manufacturing costs and operational costs.

Individual disk drives include one or more head-disk assemblies (HDAs) and the electronics for control and data transfer to and from the disks. The HDA includes one or more disks and one or more actuator on which a head is attached. An actuator to which a head is attached is positioned within the disk drive such that the actuator can be rotated about an axis to selectively position the attached head to a select location on an adjoining disk. Accordingly, data can be retrieved from, or written to, a specific location on a disk by movement of the actuator to position the attached head at the specific location on the disk.

System Environment

The present invention provides improved systems and methods to densely package the hard-disk drives in an enclosure, while at the same time reducing drive-to-drive vibration interaction. These can improve performance, density, reliability, and also reduce manufacturing and operational costs. Each hard-disk drive (HDD, also called "disk drive" or "drive") includes one or more HDAs and the electronics for control and data transfer to and from the disks.

High-density packaging of HDDs in an enclosure exacerbates drive-to-drive vibration interaction problems. With several HDDs, packaged closely together in single enclosure, potentially many doing simultaneous head-seeks, the vibration interaction problem is greatly increased. Previous systems and methods to package HDDs and reduce drive-to-drive vibration interaction involved mechanical stiffening of the enclosure and/or lower density packaging options.

Hard-disk-drives are sensitive to vibration. The performance and reliability of a HDD are decreased with vibration. When multiple HDDs are operating within an enclosure, rotational-acceleration vibration generated from the head-seek operation on one HDD can adversely affect the read/write operations (and possibly head-seek operations as well) on other HDDs. (Note that non-acceleration vibration such as due to disk-spindle wobble, room noise, or fan vibration is generally less problematic than acceleration vibration due to actuator seek operations.) The drive-to-drive rotational-acceleration vibration interaction can cause the heads in an HDD to move off track, and thus cause read-data errors and write-data errors. Such errors may result in additional revolutions to re-locate the data, excessive retries, lost data, longer head-seek times, slow data access, increase power consumption and heat production. Reducing the vibration transferred between HDDs can improve HDD performance, density, reliability, manufacturing costs, and/or operational costs.

FIG. 1 is a perspective drawing of disk drive 120 mounted in a perpendicular-to-the-major-face orientation (e.g., vertical, if the major face is horizontal) in a disk-drive system 100. In some embodiments, a plurality of other drives (up to one-hundred-fifty, one-hundred-ninety-two, two-hundred or two-thousand drives or more) are each plugged into their respective sockets (or to other suitable connectors) (e.g., connector 123) that are coupled to connector circuit 129 (e.g., in some embodiments, a plurality of insulated conductors carrying power and signals to and from drive 120) on connector circuit board or substrate 150. Disk drive 120 includes one or more disks 115 that rotate around their axis 117, an actuator 112 that rotates back and forth around its axis 111 to move its head 114 onto a given track 113 on disk 115. The data is written serially on each track 113 (e.g., as magnetic domains in the case of magnetic recording disks, or as optical artifacts in the case of optical disks, or as atomic-force artifacts or other suitable information), so the head 114 must be moved to and kept on track 113 in order to read the data. Any movement of drive 120 that causes the drive 120 to have a rotational force 187 around its $Z_{R120}$ center-of-mass axis, or a transitional rotation vibration force, can cause head 114 to be moved off track 113.

Data is organized on the disk drive 120 in serial fashion. This means that the data is stored on individual tracks (e.g., track 113) on the disk 115, which can be exemplified as concentric rings. A head that is positioned at a constant radius from the center of rotation of the disk is able to read data from a specific track on the disk as the disk turns. This allows data to be stored and retrieved from specific tracks on the disk by positioning the head above the specific track. However, if the position of the head is disrupted (i.e., moved off track), the head is no longer able to read the data from the desired specific track and must be repositioned. Accordingly, events that cause the position of the head to change in an undesired manner disallow proper reading of data from a disk and disallow proper writing of data to the disk. Examples of such events include shock to the disk drive, vibrational forces, torques, and the like.

The time required to find and transfer data on a disk is referred to as the access time. Access time can be divided into seek time, rotational latency, and data transfer time. Seek time refers to the time required to position an actuator on a track that contains the desired data. Rotational latency refers to the time required for the disk to spin such that the desired data on the requested track is under the head 114 of the properly positioned actuator 112. Transfer time refers to the time required to transfer the data to or from the head 114 on the actuator 115 to a location on a track 113 where the data is stored or retrieved (put to use). The rate of data transfer can be altered by placing different portions of the data on different disk drives (this is called striping, explained further below). For example, data can be split into blocks that are stored on two or more disk drives. Different blocks of data can then be read from the multiple disk drives in an overlapped or parallel manner and used as needed without having to wait for a single disk drive to free up. This process allows overall data to be transferred more rapidly than if the data are stored on a single disk drive. The rate of data acquisition can also be altered by placing multiple copies of data onto a disk. For example, five copies of the same data block can be stored on a single track or closely adjacent tracks of a disk to reduce rotational latency as the disk would only have to turn at most one-fifth of a revolution for one of the copies of the data to be accessed (one tenth of a revolution on average), as compared to accessing data on average in one-half revolution for data that was stored on the disk as a single copy. (Since the location on the track where the head starts is random with respect to the location of the data, some of the time the head will reach the track exactly at a point in time that it can immediately access the data (no revolution time), and other times it will take a full revolution until the data is in a position to be accessed; thus, on average the rotational latency is generally a half revolution is a single copy of the data is used, and $\frac{1}{2}N$ revolutions if N copies of the data are stored.) Additionally, storing multiple copies of data on a single track can decrease the time required for data acquisition in the event of a tracking or other recoverable error, since the rotational latency would be reduced following repositioning of the head following the error.

When data is retrieved or written to a disk, a seek operation is used that rotates the actuator about its axis and positions the attached head at the track on the disk where the data is to be written or read. The rotation of the actuator arm produces a rotational force, wherein the disk drive experiences a rotational force in the opposite direction as the actuator motion. This rotational force can move the disk drive and thus move the neighboring enclosure and cause a neighboring drive to move. This can cause the track position of the actuator in that neighboring disk drive to change and if that disk drive is reading or writing data at the time, it will thereby cause a read or write error to occur in the neighboring drive.

In conventional disk-drive arrays, the enclosure and the HDA cases are quite heavy in relation to the mass of the actuator. Accordingly, the disk drives of the disk-drive arrays are less affected by rotational forces that are transferred from one disk drive doing a seek operation to a neighboring disk drive doing a read or write operation. As the mass of the HDA is reduced, the proportional mass of the actuator increases, and the relative rotational force due to the actuator is relatively larger. In addition, smaller drives allow the enclosure's metal case (which is used to fabricate the disk-drive-array enclosure) to be made thinner and less rigid. The resulting lighter weight can produce less damage to the unit if it is dropped. However, the thinner metal can also allow a greater amount of rotational or translational force to be transmitted between drives. Generally, moderate translational force is not a problem, nor is rotational force that does not move the read-write head (e.g., rotational acceleration around an axis perpendicular to the actuator axis). With increasingly smaller drives and thinner cases, the rotational force from a seek operation in one drive has a larger deleterious affect (i.e., primarily a rotational force that moves a head off track) that is transmitted to nearby disk drives and that results in the problems described.

Accordingly, these negative effects of rotational and translational force on disk drives are exacerbated by two major trends in the disk drive and disk array industries. The first of these is the trend toward smaller and lighter HDA mechanisms. As HDA mechanisms become smaller (as a function of disk diameter), the mass of platters decreases roughly as a function of the square of the platter radius. The mass of disk drive motors also tends to decrease exponentially as a function of disk diameter. However the mass of the head actuator tends to decrease only linearly, as a function of the length of the actuator. The result is that as HDA mechanisms become smaller, the mass of the actuator becomes a proportionately larger part of total HDA mass. The non-actuator portion of total HDA mass acts (beneficially) as an inertial mass (i.e., a damper of higher frequency vibrations since the heavier mass has a lower characteristic frequency) that attenuates rotational force, so the loss of non-actuator mass in proportion to total HDA mass represents a growing problem in disk arrays.

The second of these is the trend in disk arrays toward larger numbers of disk drives per unit of disk enclosure volume. Conventionally, these drives are lined up along the narrow front and/or back surface of the enclosure, where the right-angle corners constrain rotation and/or vibration. As disk drives are packaged more densely, they must be mounted interior to the enclosure on the membranes formed by the lower and/or upper covers, and the effect of inter-drive mechanical coupling and rotational and translational forces to nearby disk drives is exacerbated. With high-density enclosures and random disk accesses, the possibility of several HDDs generating additive rotational and/or translational forces is increased. In addition, the problem is greatly magnified for HDDs attempting to hold sector tracking while doing reads or writes.

Figure 2:
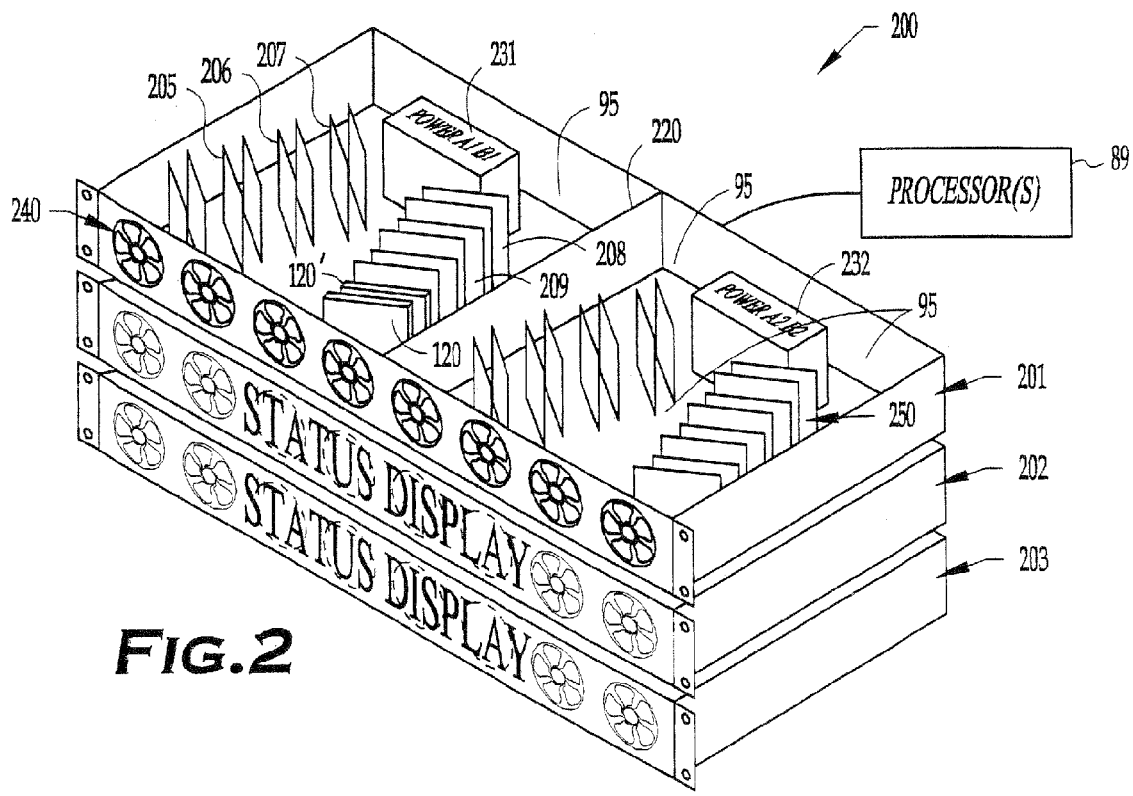
FIG. 2 is a perspective drawing of a storage system 200 with the disk drives placed in a new physical-layout pattern 250 that enables the disk drives themselves to serve as the "fins" of a large heat sink.

FIG. 2 is a perspective view that illustrates a storage system 200, according to some embodiments of the invention, with the disk drives placed in a new physical-layout pattern 250 that enables the disk drives 120, 120', and disk-drive pairs 205, 206, 207, 208, 209, (each having two disk drives 120) and the like, to individually and collectively serve as the "fins" of a large heat sink through which air is drawn or pushed in order to remove heat generated by the disk drives and the driving circuitry connected to use the disk drives. The arrangement of the disk drives further creates a plurality of tuned spaces such as inlet manifold 1112, outlet manifold 1114 and between-drive spaces 95 that control air flow from fans 240 to a high degree of precision in order to increase cooling efficiency. In some embodiments, the staggered herringbone orientation of HDDs with graduated spacing between disk drives is to optimize cooling by forcing airflow between the disk drives and taking into account the increasing temperature of the air as it moves through the disk drives. Since heat transfer is proportional to the temperature difference between the air and the drives, and to the amount of air, more air is used where the air temperature is higher and the temperature difference is less. In some embodiments, system 200 is connected to one or more processors 89, each coupled to communicated data to a plurality of disk-drive enclosure systems 201, 202, and/or 203 and the like, each having a large plurality of disk drives 120. In some embodiments, two or more power supplies 231, 232 provide redundant power for the disk drives 120. In some embodiments, the fans 240 are locates at a far end of the airflow through the enclosure so they pull air through the disk drives and push the heated air out of the cabinet in order that the heat from the fans is inserted into the air stream after it has cooled the other components. In some embodiments, the fans 240 are accessible and possibly replaceable by the user or service persons at an exterior surface of the enclosure, but enough redundancy is provided for the disk drives and power so that the system can continue to operate with substantially full functionality even if multiple individual components fail. Thus, the disk drives can be held in place in the enclosure using visco-elastic adhesive along one or a few edges, reducing weight and virtually eliminating the need for service calls. Further, small DC-to-DC regulated power supplies can be permanently mounted (e.g., soldered, in order to reduce connector-caused failures) in place, since multiple ones of the power supplies can fail and yet the system continues to function fully using the remaining good power supplies.

Power-supply Description

Figure 3A:
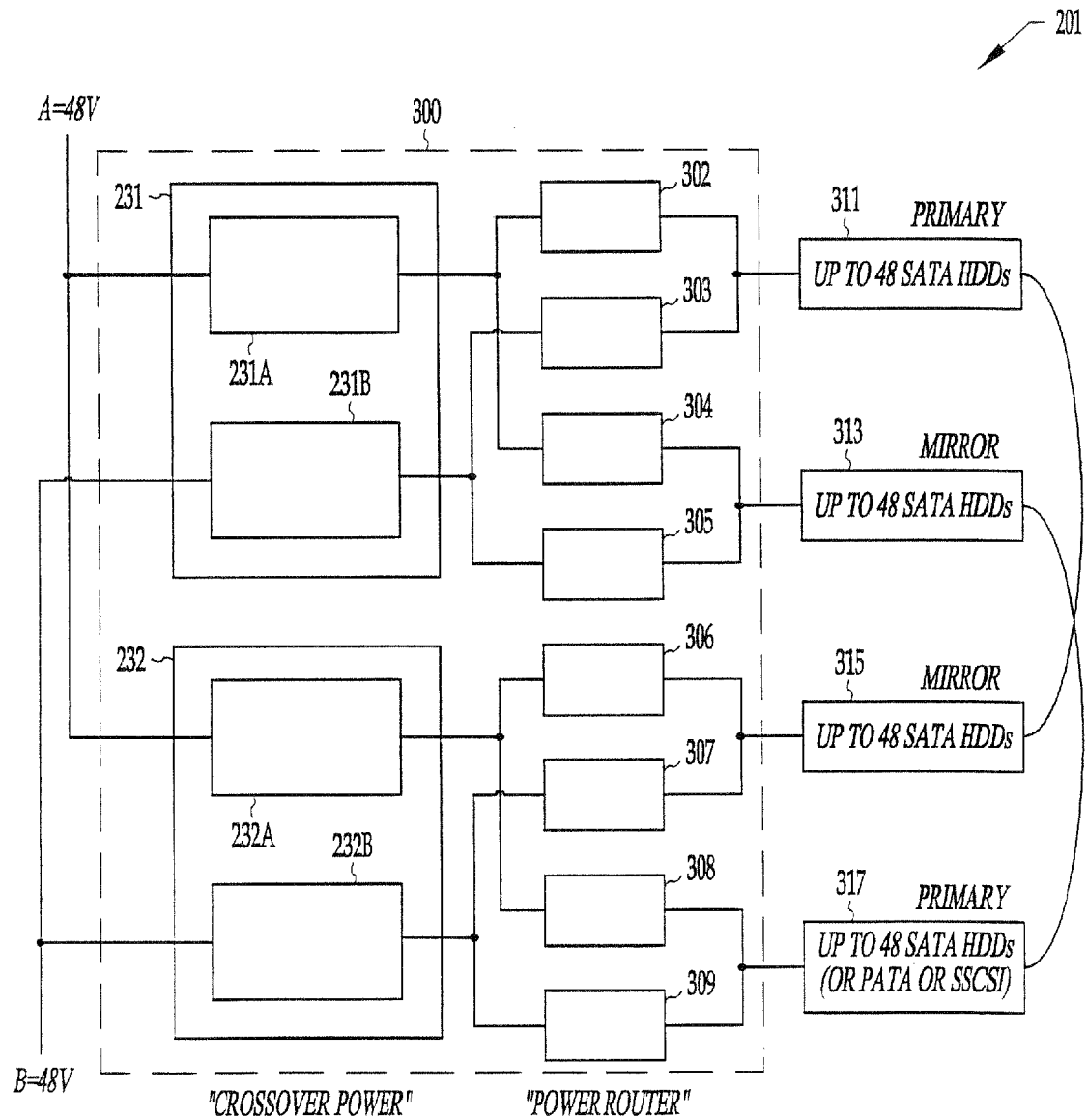
FIG. 3A is a block diagram of a power supply 300, as used in some embodiments.

FIG. 3A shows a disk drive system 201 having a power supply 300, as used in some embodiments of the invention. Power supply 300 includes a power crossover and power router configuration that meets the needs of a dense box of disk drives (DBOD). Power supply 231 includes two DC-to-DC power supplies 231A and 231B.

In some embodiments, each of these uses a AM80A-048L-050F40 model power supply available from Astec company. In some embodiments, the input to such a power supply includes dual 48-Volt DC supply lines with optional remote-control telecommunications to control the power. In some embodiments, the power modules can take DC input power from 36- to 72-Volt DC. One or more of the following features apply to some embodiments of the invention. The PRIMARY and MIRROR notation refers to drives that provide the primary data storage (the primary copy of data) and the mirrored data storage (the other copy or copies of the data). In some embodiments, there is no difference between primary and mirror copies of data, in that all write operations will write to all copies of the data, and read operations will only access one of the copies, wherein the selection of which copy is to be read is made on a rotation or alternating basis, or on a basis of which disk drive is not busy with another operation at the time when the read operation is started. For example, if the data are mirrored three ways, three disk drives will each have a copy of the same data, and when writing, the write data will be sent to all three disk drives, but when reading, a first read operation is sent to only the first disk drive, a second read operation is sent to only the second disk drive, and a third read operation is sent to only the third disk drive. When a fourth read operation arrives, it would generally be sent to the first disk drive, but if that disk drive is still busy with the first read operation, the fourth read operation could be sent to the second or third disk drive if either of those were finished with their earlier operations. By spreading the read operations among all the drives, it is more likely that a drive with the requested data for a particular read request will be available (that the data is on a drive that is not already busy with another prior operation).

In some embodiments, "Power Module Redundancy" is provided on the input, (i.e., each disk drive is configured to receive power from each of two or more DC-to-DC power supplies) wherein if any DC-to-DC power supply fails, it can be automatically disconnected and the remaining DC-to-DC power supply or supplies is able to handle the load. Like aircraft engines that have two spark plugs per cylinder, four cylinders, and "crossed over" ignitions for redundancy (e.g., two-way), some embodiments of the invention take a similar approach. In some embodiments, the sources 48V A and 48V B also cross the primary and mirrored boundaries. Dual redundant input (of the 48-volt DC sources) and the crossover configuration provide capability to power both sides in the event of a single 48V input loss. Each input can power both sides. In some embodiments, the power modules are made by Astec and provide less than 100-mV ripple (which is, in some embodiments, a requirement for the disk drives and some other power supplies cannot meet this), are parallelable, controllable, provide monitor sensors (e.g., voltage, temperature and current), provide high reliability that is more than one million hours MTBF (mean time between failures), regulatory approvals, and provide four voltage-range options: 18-36 VDC, 36-72 VDC, 90-200 VDC, and 180-400 VDC. This allows some embodiments to obtain power simply from AC, for example using a simple rectifier on the front end. In some embodiments, these power supplies provide an efficiency of 84 percent typical for 5 volts output, and ripple is 50 mV typical, and maximum 100 mV. In some embodiments, the entire box or enclosure of a plurality of drives is made to be "Hot Box" swappable (i.e., where an entire subsystem box is swapped out while the system is running), with just a little more switching to selectably disconnect power supplies 231 and 232 from their power sources.

In some embodiments, the next section or stage is the "power router." This is a plurality of high-current, redundant relays (having a relatively low voltage drop at high current as compared to solid-state relays that have higher voltage drops) that can interconnect with each other, or switch power around, providing routing (if one should fail). When no power supply has failed, the switches connect a plurality of power supplies to each section of disk drives, thus reducing the amount of power that must be supplied by each power supply (e.g., in normal mode, each power supply provides half the power needed, and once a power supply fails, the other power supply provides all the power for its disk drives).

The last stage includes the disk drives. In some embodiments, each disk drive uses 5 volts DC, 5.5 Watts maximum (less than about one amp during power up). Lines drawn that "Link" the disk drives indicate which drives are mirrored, in some embodiments. This provides a data link between various copies of the mirrored data across different power sources 48-volt source A and 48-volt source B. In some embodiments, battery-backed uninterruptible power supplies (UPS) are provided for these sources. In some embodiments, Astec AM80A modules produce 240 Watts at 5-Volts DC, or 40 Amps at 5-Volts DC, for a 48-VDC input. In some embodiments, a version is used that is pin for pin compatible but more expensive, BM80A, 300W, 60A, if a design needs more power.

Some embodiments include four rows of forty-eight disk drives for a total of one-hundred-ninety-two drives. Rows are powered up one row at a time, sequentially over a period of time. When a row is powered on, the forty-eight disk drives may use 5.5 watts each maximum, just on power up, thus drawing 264 watts maximum for a short period of time. In some embodiments, two of the 240-Watt DC-to-DC power supplies are wired in parallel to provide this power requirement. Some embodiments provide additional individually activated relay switches, such that fewer disk drives (e.g., twenty-four at a time) are powered on at any one time. In some embodiments, two rows are powered on simultaneously, using different pairs of DC-to-DC power supplies. In some embodiments, a plot of disk-drive power over time at power up shows transient power to be below 0.5 amps after 3 seconds, but even if it is 10 or 15 seconds, or some other value; some embodiments provide a programmable delay between the power up of rows to keep the power draw well within the capability of the power supplies.

Sequencer timing and power control, in some embodiments, is simple, easy to develop and inexpensive. Some embodiments use one or more PIC-brand controllers (model PIC16F872, an 8-bit high-performance RISC CPU available from Microchip Technology Inc., Chandler, Ariz., is used for some embodiments) that are RISC-based CMOS technology and have an interface for chip-to-chip communication. In some embodiments, they provide temperature sensing and full environmental control. In some embodiments, the controller is made using one of the chip sets (such as model VSC7160 12-Port SAS Expander that can run at 1.5 Gbps and 3.0 Gbps, and that includes Table Routing and a Serial SCSI Protocol (SSP) engine, or model VSC7151 9-Port Serial Attached SCSI Edge Expander that can run at 1.5 Gbps and 3.0 Gbps) from Vitesse, or other suitable controller and/or expander chip sets for just-a-bunch-of-disks (JBOD) control.

Figure 3B:
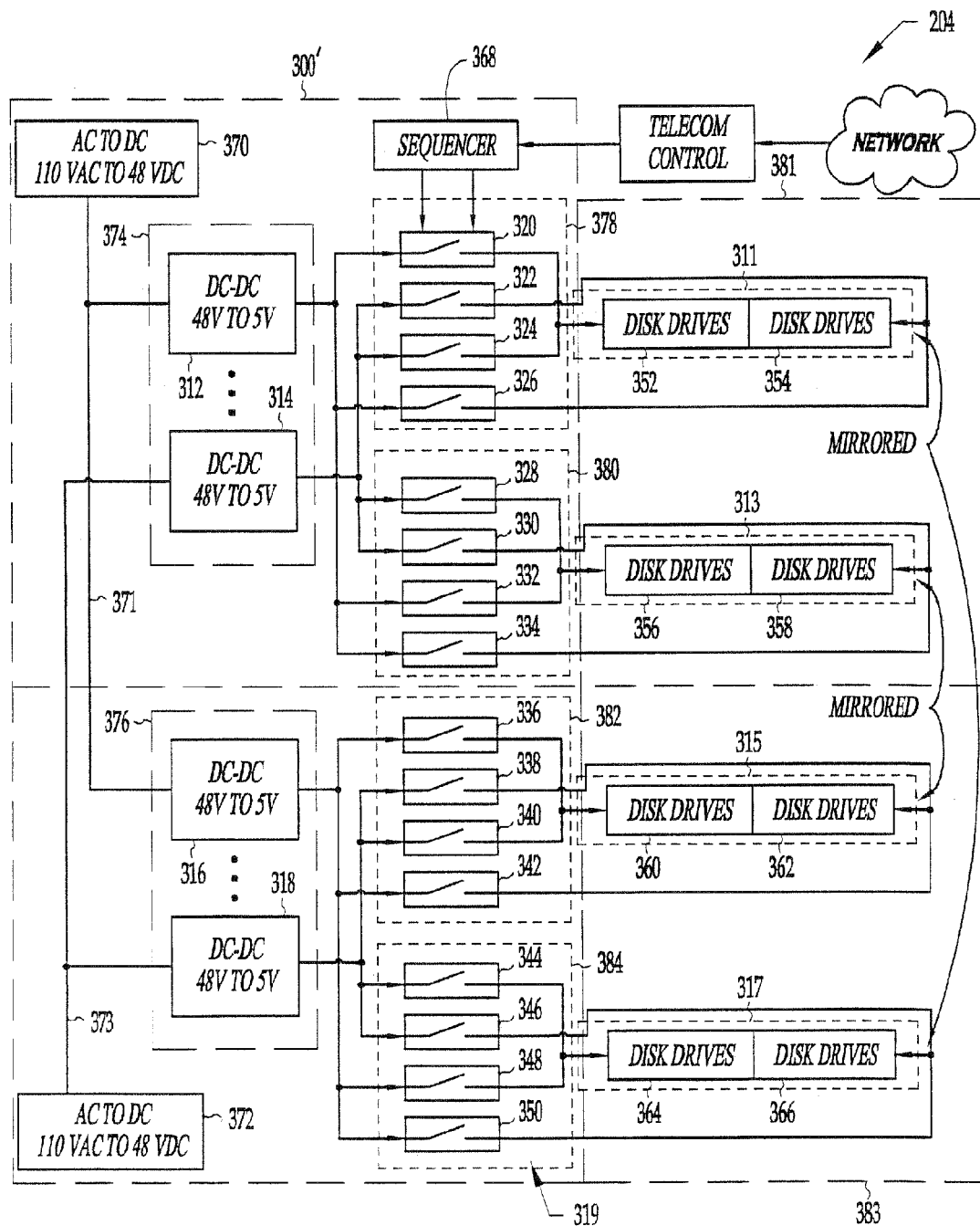
FIG. 3B is a block diagram of a power supply 300', as used in some embodiments.

FIG. 3B is a schematic of a disk-drive data-storage apparatus 204 having a power supply 300'. In some embodiments, apparatus 204 includes a first circuit board 381 and a first plurality of disk-drive connectors 311 that are operatively coupled to the first circuit board 381. The apparatus also includes a first plurality of electrically controlled relay switches 378 that include a first relay switch 320, a second relay switch 322, a third relay switch 326, and a fourth relay switch 324. The apparatus also includes a first plurality of DC-to-DC power supplies 374 that includes a first DC-to-DC power supply 312 and a second DC-to-DC power supply 314 that are operatively coupled to the first circuit board 381. In some embodiments, the DC-to-DC power supplies 374 receive an intermediate power voltage. In some embodiments, the intermediate voltage is about 48 volts. In some embodiments, the plurality of DC-to-DC power supplies 374 are connected through the first plurality of switches 378 to supply power to each one of the first plurality of disk-drive connectors 311. The plurality of DC-to-DC power supplies 374 provide crossover power to the plurality of switches 378 such that each one of the plurality of disk-drive connectors 311 is coupled through the plurality of switches 378 to each one of the first plurality of DC-to-DC power supplies 374. Dual power inputs with crossover power being directed through the plurality of switches to a plurality of disk-drive connectors provide a redundant supply of power to the plurality of disk-drive connectors.

In some embodiments, sequencer 368 is operable to control a plurality of switches in order to sequentially power up subsets of a plurality of disk drives. Use of a sequencer reduces the magnitude of power surges occurring within the apparatus. For example, in some embodiments, the apparatus includes a sequencer 368 that is operable to control a plurality of switches 378 in order to sequentially power-up subsets 352 and 354 of the first plurality of disk-drive connectors 311. In some embodiments, sequencer 368 first activates (e.g., applies power to the relay coils) only certain switches (e.g., switches 320 and 324) that supply power to one subset of the disk drives (e.g., subset 352), and at a slightly later time (e.g., 0.5 seconds to 5 seconds later, depending on the length of time that the disk drives draw extra power to spin up), sequencer 368 then activates only certain other switches (e.g., switches 322 and 326) that supply power to one other subset of the disk drives (e.g., subset 354). This reduces the maximum power surge that must be supplied by the power supplies 374 and 376 and by the AC-to-DC power sources 370 and 372). In some embodiments, sequencer 368 later activates only certain other switches (e.g., switches 328 and 332) that supply power to one other subset of the disk drives (e.g., subset 356), and still later sequencer 368 then activates only certain other switches (e.g., switches 330 and 334) that supply power to one other subset of the disk drives (e.g., subset 358). At four still later sequential times, sequencer 368 will successively activate the relay switches 336-350 to power on subgroups 360, 362, 364, and 366. By dividing the disk drives into subgroups (e.g., eight subgroups in the embodiment described above), the power surge for spin up is quite reduced.

In some embodiments, either individual power supply 312 or 314 alone can provide enough power for all of the disk-drive connectors to which it is operatively coupled. Accordingly, if a power supply 314 fails, the redundant power supply 312 is able to provide power to the plurality of disk-drive connectors and the apparatus will continue to operate. Power supplies that can be used within an apparatus of the invention can be obtained commercially (e.g., ASTEC POWER, Carlsbad, Calif. 92008). In some embodiments, each power supply will provide less than 100 mV of ripple. In some embodiments, each power supply will produce about 50 mV of ripple. Furthermore, power supplies having a variety of voltage-ranges may be used in various embodiments. In some embodiments, an AC power supply is used that has a simple rectifier and a voltage-range of, for example 18-36VDC, 36-72VDC, 90-200VDC, 180-400VDC, or the like. In some embodiments, each power supply within an apparatus is "Hot Box" swappable which enables the power supply to be removed and replaced while the apparatus is running.

In some embodiments, the apparatus includes one or more AC-to-DC power supplies or sources 370, 372 that are operable to receive AC wall power and to generate an intermediate power voltage. In some embodiments, an intermediate power voltage ranges from about 18 volts to about 36 volts. In some embodiments, an intermediate power voltage ranges from about 36 volts to about 72 volts. In some embodiments, an intermediate power voltage ranges from about 90 volts to about 200 volts. In some embodiments, the intermediate voltage is about 48 volts of direct current.

In some embodiments, the voltage output from a power supply into each one of the switches 320 to 350 is a voltage that is suitable to be used directly by a disk drive 120 that is plugged into one or more of the plurality of disk-drive connectors 126. Examples of voltages that are suitable to be used directly by a disk drive include those within a range of 5 volts plus or minus five percent (e.g., for disk drives using the industry standard 2.5-inch form factor). In some embodiments, the suitable voltage is within a range of 3.3 volts plus or minus five percent (e.g., for disk drives using the industry standard 1.8-inch form factor). In some embodiments, the suitable voltage is some other suitable voltage selected for the disk drives used.

In some embodiments, a first switch 320 is connected to couple a first DC-to-DC power supply 312 to a first subgroup (proper subset) 352 of a first plurality of disk-drive connectors 311, and the second switch 322 is connected to couple a second DC-to-DC power supply 314 to a second proper subset 354 of the first plurality of disk-drive connectors 311.

In some embodiments, an apparatus includes a third switch 326 that is connected to couple a first DC-to-DC power supply 312 to the second proper subset 354 of the first plurality of disk-drive connectors 311, and a fourth switch 324 that is connected to couple the second DC-to-DC power supply 314 to a first proper subset 352 of the first plurality of disk-drive connectors 311.

In some embodiments, an apparatus includes a fifth switch 332 that is connected to couple the first DC-to-DC power supply 312 to a third proper subset 356 of the second plurality of disk-drive connectors 313, a sixth switch 330 that is connected to couple the second DC-to-DC power supply 314 to a fourth proper subset 358 of the second plurality of disk-drive connectors 313, a seventh switch 334 that is connected to couple the first DC-to-DC power supply 312 to the fourth proper subset 358 of the second plurality of disk-drive connectors 313, and the eighth switch 328 is connected to couple the second DC-to-DC power supply 314 to a third proper subset 356 of the second plurality of disk-drive connectors 313.

In some embodiments, an apparatus includes a third DC-to-DC power supply 316. In some embodiments, an apparatus includes a fourth DC-to-DC power supply 318.

In some embodiments, an apparatus includes a ninth switch 336 that is connected to couple a third DC-to-DC power supply 316 to a fifth proper subset 360 of a third plurality of disk-drive connectors 315. In some embodiments, an apparatus includes a tenth switch that is connected to couple a fourth DC-to-DC power supply 318 to a sixth proper subset 362 of the third plurality of disk-drive connectors 315. In some embodiments, an apparatus includes an eleventh switch 342 that is connected to couple a third DC-to-DC power supply 316 to a sixth proper subset 362 of a third plurality of disk-drive connectors 315. In some embodiments, an apparatus includes a twelfth switch 340 that is connected to couple a fourth DC-to-DC power supply 318 to a fifth proper subset 360 of a third plurality of disk-drive connectors 315.

In some embodiments, an apparatus includes a thirteenth switch 348 that is connected to couple a third DC-to-DC power supply 316 to a seventh proper subset 364 of a fourth plurality of disk-drive connectors 317. In some embodiments, an apparatus includes a fourteenth switch 346 that is connected to couple a fourth DC-to-DC power supply 318 to an eighth proper subset 366 of a fourth plurality of disk-drive connectors 317. In some embodiments, an apparatus includes a fifteenth switch 350 that is connected to couple a third DC-to-DC power supply 316 to an eighth proper subset 366 of a fourth plurality of disk-drive connectors 317. In some embodiments, an apparatus includes a sixteenth switch 344 that is connected to couple a fourth DC-to-DC power supply 318 to a seventh proper subset 364 of a fourth plurality of disk-drive connectors 317.

In some embodiments, the apparatus includes a sequencer 368 that is operatively coupled to each one of the plurality of switches 378, 380, 382, and 384 and operable to apply power in a sequence over a period of time to the plurality of switches 378, 380, 382, and 384 in order to reduce the magnitude of power-on surge.

In some embodiments, the apparatus includes a second circuit board 383 to which a second plurality of disk-drive connectors 313 are each operably coupled. In some embodiments, an apparatus includes a third DC-to-DC power supply 316 and a fourth DC-to-DC power supply 318 that are both operably coupled to a second circuit board 383.

In some embodiments, the apparatus includes a plurality of disk drives connected to a first plurality of disk-drive connectors 311.

In some embodiments, the apparatus is included within an enclosure. In some embodiments, the enclosure includes a first air-inlet manifold 1112 configured to direct air between a first plurality of disk drives and a first air-outlet manifold 1114 configured to receive warmed air and direct the warmed air out of the enclosure.

In some embodiments, an apparatus includes a multiprocessor having two or more processing units and a memory coupled to the processing units, wherein the memory is operable to send and receive data from a first plurality of disk drives.

In some embodiments, an apparatus includes a video-streaming subsystem, the video-streaming subsystem including one or more processing units and a memory coupled to the one or more processing units and operable to send and receive data from the first plurality of disk drives and to simultaneously output a plurality of video streams.

In some embodiments, an apparatus includes a video-on-demand controller operable to receive requests for video programming from each one of a plurality of users, and to access and direct video output to the plurality of users based on the requests.

In some embodiments, the invention provides a method that includes operatively coupling a first plurality of disk-drive connectors 311 to a first circuit board 381, operatively coupling a first plurality of DC-to-DC power supplies 374 to the first circuit board 381, and connecting the DC-to-DC power supplies 374 through a first plurality of electrically controlled relay switches 378 to supply power to each one of the first plurality of disk-drive connectors 311. The plurality of power supplies 374 provide crossover power to the plurality of switches 378 such that each one of the plurality of disk-drive connectors 311 is coupled through the plurality of switches 378 to each one of the first plurality of DC-to-DC power supplies 374. In some embodiments, the first plurality of electrically controlled relay switches 378 includes a first switch 320 and a second switch 322. In some embodiments, the DC-to-DC power supplies 374 receive an intermediate power voltage. In some embodiments, the intermediate voltage is about 48 volts of direct current. In some embodiments, the first plurality of DC-to-DC power supplies 374 includes a first DC-to-DC power supply 312 and a second DC-to-DC power supply 314.

In some embodiments, the method includes operatively coupling a sequencer 368 to control a first plurality of switches 378 in order to sequentially power up a first proper subset 352 and a second proper subset 354 of a first plurality of disk-drive connectors 311 over a period of time.

In some embodiments, the method includes providing an AC-to-DC power supply 370 that is operable to receive AC wall power and to generate an intermediate power voltage.

In some embodiments, the method includes providing an AC-to-DC power supply 370 having an intermediate voltage that is about 48 volts of direct current. In some embodiments, the voltage output from the AC-to-DC power supply 370 into each one of the switches 378 is a voltage suitable to be directly used by a disk drive that is plugged into one or more of the plurality of disk-drive connectors 311.

In some embodiments, the method includes connecting a first switch 320 to couple a first DC-to-DC power supply 312 to a first proper subset 352 of a first plurality of disk-drive connectors 311, and connecting a second switch 322 to couple a second DC-to-DC power supply 314 to a second proper subset 354 of a first plurality of disk-drive connectors 311. In some embodiments, the method includes connecting a third switch 326 to couple a first DC-to-DC power supply 312 to a second proper subset 354 of a first plurality of disk-drive connectors 311, and connecting a fourth switch 324 to couple a second DC-to-DC power supply 314 to a first proper subset 352 of a first plurality of disk-drive connectors 311.

In some embodiments, the method includes connecting a fifth switch 332 to couple a first DC-to-DC power supply 312 to a third proper subset 356 of a second plurality of disk-drive connectors 313. In some embodiments, the method includes connecting a sixth switch 330 to couple a second DC-to-DC power supply 314 to a fourth proper subset 358 of a second plurality of disk-drive connectors. In some embodiments, the method includes connecting a seventh switch 334 to couple a first DC-to-DC power supply 312 to a fourth proper subset 358 of a second plurality of disk-drive connectors 313. In some embodiments, the method includes connecting an eighth switch 328 to couple a second DC-to-DC power supply 314 to a third proper subset 356 of a second plurality of disk-drive connectors 313.

In some embodiments, the method includes connecting a ninth switch 336 to couple a third DC-to-DC power supply 316 to a fifth proper subset 360 of a third plurality of disk-drive connectors 315. In some embodiments, the method includes connecting a tenth switch 338 to couple a fourth DC-to-DC power supply 318 to a sixth proper subset 362 of a third plurality of disk-drive connectors 315. In some embodiments, the method includes connecting an eleventh switch 342 to couple a third DC-to-DC power supply 316 to a sixth proper subset 362 of a third plurality of disk-drive connectors 315. In some embodiments, the method includes connecting a twelfth switch 340 to couple a fourth DC-to-DC power supply 318 to a fifth proper subset 360 of a third plurality of disk-drive connectors 315.

In some embodiments, the method includes connecting a thirteenth switch 348 to couple a third DC-to-DC power supply 316 to a seventh proper subset 364 of a fourth plurality of disk-drive connectors 317. In some embodiments, the method includes connecting a fourteenth switch 346 to couple a fourth DC-to-DC power supply 318 to an eighth proper subset 366 of a fourth plurality of disk-drive connectors 317. In some embodiments, the method includes connecting a fifteenth switch 350 to couple a third DC-to-DC power supply 316 to an eighth proper subset 366 of a fourth plurality of disk-drive connectors 317. In some embodiments, the method includes connecting a sixteenth switch 344 to couple a fourth DC-to-DC power supply 318 to a seventh proper subset 364 of a fourth plurality of disk-drive connectors 317.

In some embodiments, the method includes operatively coupling a sequencer 368 to each one of a plurality of switches 378, 380, 382, and 384 that are operable to apply power in a sequence over a period of time to the plurality of switches 378, 380, 382, and 384 in order to reduce the magnitude of power-on surge.

In some embodiments, the method includes operably coupling a second plurality of disk-drive connectors 313 to a second circuit board 383, and operably coupling a third DC-to-DC power supply 316 and a fourth DC-to-DC power supply 318 to the second circuit board 383.

In some embodiments, the method includes including the apparatus 300 within an enclosure. In some embodiments, the enclosure forms a first air-inlet manifold 1112 configured to direct air between a first plurality of disk drives and a first air-outlet manifold 1114 configured to receive warmed air and direct the warmed air out of the enclosure.

In some embodiments, the method includes providing a multiprocessor that includes two or more processing units and a memory coupled to the processing units and that is operable to send and receive data from a first plurality of disk drives.

In some embodiments, the method includes providing a video-streaming subsystem that includes one or more processing units and a memory coupled to the one or more processing units that are operable to send and receive data from a first plurality of disk drives and to simultaneously output a plurality of video streams.

In some embodiments, the method includes providing a video-on-demand controller operable to receive requests for video programming from each one of a plurality of users, and to access and direct video output to the plurality of users based on the requests.

Figure 3C:
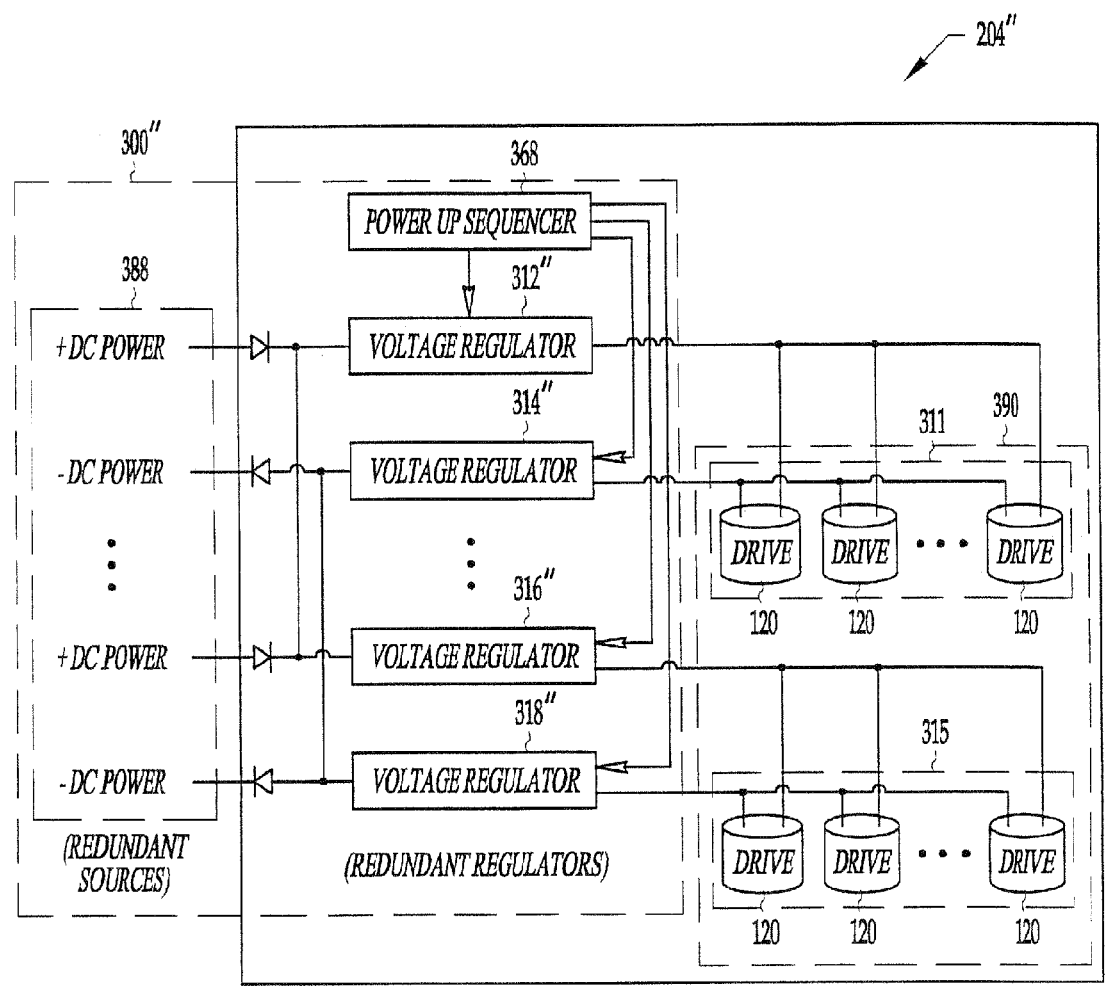
FIG. 3C is a block diagram of a power supply 300'', as used in some embodiments.

FIG. 3C is a schematic of a disk-drive data-storage apparatus 204" having a power supply 300". In some embodiments, apparatus 204" includes a first plurality of disk-drive connectors 311 that are operatively coupled to a circuit board. The apparatus also includes a first plurality of electrically controlled voltage regulators 312"-314" that are controlled by power-up sequencer 368 and connected to provide redundant sources of operating voltage to disk drives 120 in the subgroup of disk drives connected to connectors 311. The apparatus also includes a second plurality of electrically controlled voltage regulators 316"-318" that are operatively coupled to provide redundant sources of operating voltage to disk drives 120 in subgroup 315. In some embodiments, the electrically controlled voltage regulators 312"-318" receive DC power from one of a plurality of sources 388 of an intermediate power voltage. In some embodiments, the intermediate voltage is about forty-eight volts.

FIG. 4A is a perspective drawing of disk drive 120 mounted in a perpendicular-to-the-major-face-of-the-enclosure orientation in a disk-drive system 400. This disk drive 120 is as described for FIG. 1 above.

In some embodiments (as shown in FIG. 4A), a second disk drive 120' is mounted face-to-face, substantially parallel to, and adjacent to drive 120, such that if simultaneous seek operations are performed to both drives from the same starting position and to the same ending track, the two rotational accelerations will at least partially cancel. With respect to drive 120' and its $Z_{R120'}$ center-of-mass axis (in some embodiments, $Z_{R120'}$ is collinear with, and in the opposite direction as, $Z_{R120}$), accelerations 147 around its $Z_{R120'}$ center-of-mass axis are in the opposite direction (clockwise versus counterclockwise) and approximately equal in magnitude as accelerations 187 of drive 120.

Rotational and translational forces that are produced by a disk drive can be transmitted to other disk drives. For example, if the front corner 119 (the corner furthest from actuator axis 111) is moved or rotated downward (as a result of torque 192) relative to the rest of the drive (and/or corner 121 is moved relatively upward), the actuator 112 will rotate in a direction 191 taking the head 114 off its track 113. Conversely, if the actuator 112 rotates in a direction 191 for its seek operation, the front corner 119 moves downward 192 relative to the rest of the drive, transmitting rotational force to other drives in its neighborhood. Moving a head off track during a read or write operation causes a loss in performance, since an entire disk revolution is needed to get back to the data that was missed when the head moved off track.

Disk drives can be arranged through use of the methods of the invention to reduce transmission of rotational forces to neighboring disk drives. Additionally, the invention provides multiple disk drives that are arranged within an apparatus so that transmission of rotational forces from one disk drive to a neighboring disk drive is reduced. In some embodiments of the invention, a second drive 120' is placed back-to-back to drive 120, such that its disks 145 are rotating in the opposite direction as disks 115, and its actuator 142 moves in the opposite direction around its axis 141 as does actuator 112 relative to an outside frame of reference. In some embodiments, connector 116 of drive 120 is plugged into socket 126 on board 150, and is held by one or more visco-elastomeric (or, in some embodiments, elastomeric, rubbery, soft plastic or otherwise compliant to some degree) holder(s) 127 and 128. Similarly, connector 156 of drive 120' is plugged into socket 166 on board 150, and is held by one or more visco-elastomeric (or, in some embodiments, elastomeric) holder(s) 167. In some embodiments, drives 120 and 120' are mounted so that their $Z_R$ center-of-mass axes are aligned, and actuators 112 and 142 are driven with substantially simultaneous operations, in order to cancel some or all of the rotational force due to their respective seek operations.

In contrast to rotational forces, an up or down movement of board 150 at location 118 directly under the drive's center of rotational mass will merely cause a translation motion in the $Y_T$ direction 182, which does not cause a rotation around the $Z_R$ center-of-mass axis, and thus does not cause tracking errors in drive 120. Thus, a rotational force received at point 118 causes fewer problems than if at corner 119 or corner 121 of drive 120. Further, if the actuator 112 moves in a direction 191 for its seek operation, the point 118 does not move upward or downward, but experiences a minor twist, transmitting very little rotational force to other drives if their corner 119 is closest to this point 118 on drive 120. Thus, very little rotational force is transmitted from point 118; this causes fewer problems to neighboring drives if their corner 119 or corner 121 is closest to this point 118.

Translational displacements 180 which move the entire drive 120 in $X_T$ direction 181, $Y_T$ direction 182, or $Z_R$ direction 183 generally do not cause tracking errors, nor does rotational acceleration 185 around the $X_R$ center-of-mass axis or rotational acceleration 186 around the $Y_R$ center-of-mass axis. However, a rotational acceleration 187 around its $Z_R$ center-of-mass axis is problematic, as described above.

Disk drives are generally able to function adequately in environments that induce/transmit translational vibrations along 3 axes of the drive (translational movements along $X_T$, $Y_T$ and $Z_T$ will not move the head off track, since the actuator is generally quite balanced on its rotational axis) and angular acceleration or rotational force about 2 axes ($X_R$, $Y_R$; see FIG. 4A) also do not generally move the head off track. However, rotational force that is transmitted to the head-disk assembly (HDA) around the $Z_R$-axis is problematic. Rotation of the actuator around this axis is what moves the head that is attached to the actuator from track-to-track. When caused by the actuator motor, this moves the head to the desired track during a seek operation. However, when its neighboring drives transmit rotational force to a drive, sector-tracking problems can occur. Even a very small amount of rotational force is known to increase the position-error signal of the head, cause instability in the servo system, degrade I/O performance, increase power consumption and increase error rates of disk drives. During any seek operation, an HDA using a rotary head actuator generates rotational force in a direction opposite to that of the acceleration of the head actuator, and transmits this energy to the environment around it, including other disk drives. Disk drives are most sensitive to rotational force during the sector-tracking media transfer phase of operation, but are less sensitive to rotational force during a seek operation.

The following aspects and embodiments of the invention are aimed at reducing the effects of rotational and translational forces among a plurality of disk drives mounted in a mechanical enclosure. In addition, where RAID hardware or software logic is used to increase the performance and/or reliability of a plurality of disk drives, the following aspects and embodiments also describe how the disk drives can be arranged mechanically in relation to one another and in relation to RAID striping and mirroring logic to reduce the effects of rotational and/or translational forces.

Embodiment A1

Counter-Rotating Disk Drives in a Mirrored Set to Offset Rotational Acceleration Vibration (RAV)

"Mirrored disks" are a set of M (where M is two or greater) disk drives that are logically connected as a set and at least some of the data written to that logical set is replicated to each of the M drives for each write operation. In some embodiments, all data sent to the set of drives is replicated, while in other embodiments, some amount (e.g., one-hundred-fifty GB) or some percentage of the drive's data space (e.g., fifty percent) is mirrored and the remaining data on each drive is unique or different, in order to provide mirrored speed and redundancy for the portion that is replicated, while also providing a lower cost per gigabyte for the other data by writing only a single copy. The processor elements (PEs) or operating system (OS), in some embodiments, could see a set of four three-hundred-GB drives as one four-way-mirrored drive of one-hundred-fifty GB, plus four non-mirrored drives of one-hundred-fifty GB each. In some embodiments, some portion or percentage of the data is replicated with a higher number of copies (e.g., a set of four three-hundred-GB drives could have thirty percent of the data or 90 GB replicated four times, once for each disk drive, with the operating system software seeing one 4-way-mirrored ninety-GB drive), while other data is replicated across fewer drives (e.g., ninety GB replicated twice to a first pair of drives, and another 90 GB replicated twice to a second pair of drives, so the OS sees two 2-way-mirrored ninety-GB drives), and/or split differently (e.g., one-hundred-twenty GB replicated thrice to three drives, and another one-hundred-twenty GB sent as non-mirrored data to a fourth drive, so the OS sees one 3-way-mirrored 120-GB drive and one non-mirrored one-hundred-twenty-GB drive). In such mirrored embodiments, every full-mirrored write operation is sent to all N drives, so every drive has a copy of all the data, while subset-mirrored writes are sent only to the specified subset. In some embodiments, each of a plurality of subsets of the drives have drives placed alternately back-to-back or front-to-front, as shown in FIG. 4A, so that half of the drives are rotating in the opposite direction as the other half. In some embodiments, read operations are also sent to all N drives (or to all of the subset of drives having the replicated data), so the drive that can return the data fastest has its data used, and the other drives' data is discarded. This provides the increased reliability of the duplicated data, and increases read performance to that of the drive that happens to have the least rotational latency (by the happy chance of having the rotational angle of its disks closest to the requested data) to reach the requested data. Further, since all seek operations (reads and writes) are sent to all M drives (or subset of M drives) of the set at substantially at the same time, the rotational accelerations of the M simultaneous seek operations cancel, at least to some extent. Further there are no seek operations for some of the drives while others of this set of M drives are reading or writing, tracking errors due to RAV are reduced.

Embodiment A2

Counter-Rotating Disk Drives in a Mirrored Set to at Least Partially Offset RAV, Optionally Also Using Read Splitting Again, every write operation is sent to all M drives, so every drive has a copy of all the data. In some embodiments, each read operation is sent to only one of the M drives, so the other drives have less utilization and can accept read operations to retrieve other data. This provides the increased reliability of the duplicated data, and increases read performance since more drives can be performing separate read operations simultaneously. Again, the drives are placed alternately back-to-back or front-to-front, as shown in FIG. 4A, so that half of the drives are rotating in the opposite direction as the other half. Since all write seek operations (only for writes) are sent to all M drives of the set, the rotational accelerations of the write-seek operations cancel, at least to some extent. Further, to the extent that probability allows, the read-seek operation to one drive will not occur during the read-data-tracking portion of a read to another drive of the set of M drives. Since all drives have the same data, four successive read commands to any of the data can each be sent to a different drive.

In some embodiments, read operations to large blocks of data are broken into smaller read commands, each to a different portion of the data, and each sent substantially simultaneously to a different drive of the set. Thus, if M=4, a read operation to fetch, for example, a 640-KB block of data is broken into four 160-KB read operations, each sent substantially at the same time to a different drive of the set. Thus, four seeks of substantially the same duration and to approximately the same locations on each drive will occur at about the same time. Two would have a clockwise acceleration and the other two would be counter-clockwise. The first drive would return the first 160-KB portion of the 640 KB-read request, the second drive would return the second 160-KB portion, the third drive would return the third 160-KB portion, and the fourth drive would return the fourth 160-KB portion. This provides the advantage of the counter-rotating seek commands canceling some of the RAV, the seek operations occurring when the other drives are not trying to keep on track and not occurring when heads are trying to stay on track, and the speed of parallel data retrieval providing improved performance.

Some embodiments use vulnerability mapping, described below, as one basis for selecting which drive or drives are to be used for a read-split read (i.e., a read operation that could be satisfied by data stored on any one of a mirrored set of drives since all prior write operations replicated their data on all drives of that mirrored set).

Embodiment A3

Counter-Rotating Disk Alternation in a Striped Set to Offset RAV

"Striped disks" are a set of N disk drives that are logically connected as a set and data written to that logical set is spread across the set. At some level of granularity, a block of data is broken into sub-blocks, wherein each successive sub-block is written to a different drive. Thus, the block need not wait to be entirely written to or read from one drive in a serial manner, but instead the set of drives works in parallel, each writing or reading their portion of the block. The set of striped disks are, or can be, viewed by the system's processors as a single logical disk drive having a capacity that is the sum of the capacities of all drives in the set, and wherein each successive block of data (where a block can be any convenient size, such as 512 bytes, 8192 bytes, or any other desired size) is written to a different drive (with a plurality of N drives, every Nth block is written to the first drive, every N+1$^{st}$ block is written to the second drive, and so on). When data is written to or read from the logical disk that includes the set of striped physical disk drives, a single I/O request to the logical disk frequently spans two or more logically adjacent physical disk drives (each having one stripe of the data), and as a result, there is a high probability of simultaneous actuator-seek movements among these neighboring head-disk assemblies (HDAs).

In some embodiments, the minimum processor-level block size is made to be an N multiple of the minimum drive-level block size, such that every processor-level read or write is automatically striped across N drives of a set. For example, if N=4 and the processor-level block size is made 8 KB, the drive-level block size is made 2 KB, and each read operation from the processor causes a read operation to each one of the N drives. An 8-KB processor read causes four 2-KB read operations, while a 16-KB processor read causes four 4-KB read operations, one to each of the drives of the set. A 56-KB write operation causes four 14-KB write operations, one to each of the drives of the set. The N operations, one to each one of the N drives in a set will be to the same logical address on each drive, and thus cause substantially simultaneous seek accelerations that cancel if the drives are alternately clockwise and counterclockwise. Since the N operations that are sent to the N drives each access 1/N of the data, the data-transfer phase is shortened. Often, the seek accelerations are rotational accelerations that tend to be substantially simultaneous, and similar in duration, speed/acceleration, direction and frequency in the N drives of a set. By alternating the position (face-to-face or back-to-back) of each of the drives in the stripe, the combined rotational accelerations of the HDAs will, by design, offset one another other as shown in FIG. 4A. In some embodiments, for example, a 16-KB read operation from the system is broken into two 8-KB operations to logically adjacent drives in a set, where a first drive has a seek in a clockwise direction as seen from its top cover, and a second drive also has a seek in a clockwise direction as seen from its top cover, but when the top covers are face-to-face adjacent, these two rotational accelerations are in opposite rotational directions and at least partially cancel each other's mechanical motions. Coupling disk drives in this way, both mechanically and also to the RAID striping logic, takes advantage of the simultaneity of seek operations, during which time the disk drives are largely insensitive to RAV disturbances.

In some embodiments, it also takes advantage of the local stiffness of board 150 between two adjacent HDD connectors. That is, in some embodiments, the connectors themselves provide stiffening, and in some embodiments, the connectors are molded in pairs such that they are more rigid to one another. In some embodiments, such a pair of unitary-molded connectors is attached to the bottom metal plate using a visco-elastic material that dampens any vibrations that otherwise would be transferred to the bottom metal cover, and the more rigid connection between the two connectors allows the counter-rotating accelerations to cancel. In some embodiments, more than two drives are alternately placed face-to-face, then back-to-back, then face-to-face, etc., and more than two of the drives will have simultaneous seek operations (e.g., two clockwise drives and two counter-clockwise drives).

In other embodiments, a pair of drives has one of its drives write data from the inner diameter to the outer, and the other drive writes its data from the outer diameter to the inner. Such a pair can be placed both facing the same direction (i.e., face-to-back) such that when one does a seek operation from the inner-to-outer diameter, the other will have a seek operation from the outer-to-inner (the opposite rotational direction), and their total rotational acceleration will at least to some extent cancel. These embodiments, however, have non-symmetrical seeks at the outer or inner diameters (when one drive seeks at its outer diameter, the other drive of that pair seeks at its inner diameter), since a seek operation that moves across, for example, 20-GB of data has fewer tracks to move at the outer diameter than at the inner diameter.

In other embodiments, each pair of drives includes one drive that rotates its disks and actuator in the opposite rotational direction as those in the other drive. This requires non-standard drives (i.e., half of the drives are built as mirror-images as viewed from the cover), but allows all the drives to be facing in the same direction (i.e., face-to-back). These embodiments, however, have symmetrical seeks at the outer or inner diameters, since a seek operation done at the outer diameter of one drive, will be accompanied by a seek operation in the opposite direction but also at the outer diameter or the other drive.

Thus, some embodiments have one or more pairs of disk drives, each pair operated such that their actuators are operated substantially simultaneously. This provides the advantage that the counter-rotating rotational accelerations, at least to some extent, cancel one another. This canceling reduces the RAV transmitted to other drives near the pair in the enclosure, as well as reducing the RAV within the pair. It also provides the advantage, that even if not performed exactly at the same time, each acceleration (due to an actuator seek) occurs when the neighboring drive is also in or temporally near the seek mode time, and thus is less susceptible to read or write errors than if the rotational acceleration occurred while that drive's head was on track and trying to write or read.

In addition, since the system sends down a set of one or more system-sized blocks, and the set of N drives (where N can be two or more drives) each write a disk-sized blocks, each being the system block size divided by N, the data can be written twice as fast, once the drives reach the desired data location (i.e., after the seek and rotational delay). Suppose the system has a granularity of 8192 bytes (commonly called 8-KB blocks), and the drives are organized as 2-KB blocks (2048 bytes), then a pair of drives can write the first and third 2-KB blocks to the first drive of a pair, and the second and fourth 2K the second drive. Alternatively, a "pair" could include two physical pairs, or four drives, each receiving a 2-KB portion of each 8-KB write operation. In other embodiments, other numbers of drives can be used in each set of drives.

In other embodiments, a replicated set of drives can be provided, wherein data is M-way mirrored and N-way striped. For example, fifteen disk drives can be configured as a 4-way-mirror, 5-way-stripe set of drives (e.g., if 200-GB drives are used, five groups of four mirrored drives each form a one-terabyte logical drive, where each block of data is replicated four times, and data is striped across the five groups of mirrored drives). In such embodiments, the mirrored drives can be configured to have counter-rotating pairs or quads to cancel at least some of their RAV. When mirroring is done with an even number of replications (i.e., M=2, 4, 6, etc.), all write operations can be RAV balanced (the same number of seek commands being sent to clockwise-rotating (CW) drives as to counterclockwise-rotating (CCW) drives).

For systems performing read splitting and if a read command specifies data kept on an odd number of drives, or for write operations if M and N are both odd numbers (e.g., M=3 and N=5), approximately half of the drives can be configured to rotate in the opposite direction as the other approximately half (e.g., 7 CW and 8 CCW drives). Commands sent to such a configuration have almost all of the RAV of the set of drives cancelled by almost balancing (for all but one drive) the clockwise (CW) acceleration with counterclockwise (CCW) acceleration.

In other embodiments, an exactly even number of counter-rotating seek operations can be sent, even if the data requested (to be read or written) is kept on an odd number of drives, by sending one unused seek operation to another drive of a set—for example to a spare drive (i.e., one with no system data stored on it, but which is provided in order to be able to swap for a failed drive in the future, if and when a failure occurs or is predicted) or to an idle drive (i.e., one that has system data on it) (e.g., if 3-way mirroring and 5-way striping were used, and one spare drive was provided for the other 15 drives, for each access that accessed an odd number of drives (e.g., 3, 9 or 15 drives), a seek to the spare drive would also be simultaneously sent, but for accesses that accessed an even number of drives (e.g., 6 of 12 drives), no seek command would be sent to the spare drive. In this way, counter-rotating seeks to the drives would always substantially cancel the rotational acceleration.

Embodiment B

Orthogonal Placement of Disk Drives as Rotational-Force Mass Dampers

When data is read from or written to a plurality of mechanically coupled disk drives, each seek operation issued to any disk produces a corresponding rotational force in the head-disk assembly (HDA) mechanism, the energy of which is transmitted to surrounding structures which either absorb or transmit that energy. When a subject disk absorbs an RAV component produced by another nearby disk about the $Z_R$ axis of the subject disk, the negative effects of RAV are maximized. By positioning a plurality of disk drives orthogonally to each other, the RAV energy created by one drive may be transmitted to and absorbed by the mass of nearby orthogonally oriented drives without acting on the subject drives around their $Z_R$ axis, which is the axis of greatest sensitivity.

FIG. 4B shows a pair of drives in a T orientation. Neighboring disk drive 160 is at a right angle (at or about ninety degrees) to reference drive 120, with its corner 119 placed nearest to point 118 (under the center of rotational mass) of drive 120, then drive 120 acts as an inertial mass that resists the rotational force motion 192' from the neighboring drive 160, and drive 120 suffers little or no tracking errors, since the neighboring drive's rotational force 192' acts as a $Y_T$ translational movement, not a rotational force for drive 120. Conversely, any rotational force 192 of drive 120 causes the least motion at point 118 of drive 120, and thus does not cause rotational tracking errors in the neighboring drive 160. The moments of inertia of the drives will be about axes that are orthogonal to each other. This allows the mass of orthogonally positioned disk drives to act as a mass damper for rotational force produced by nearby disk drives and allows rotational force to be dissipated harmlessly around the X-axis and Y-axis of subject disk drives, which is an advantageous situation for either reading or writing of data. A rotational force 187 of drive 120 around its $Z_{R120}$ axis causes little or no movement at point 118, and thus causes no tracking error in drive 160. A rotational force 188 of drive 160 around its $Z_{R160}$ axis causes only translational movement at point 118 of drive 120, and thus causes no tracking error in drive 120.

FIG. 4C shows a pair of drives in a Y orientation. Neighboring disk drive 159 is at an oblique angle to drive 120, with its corner 119 placed nearest to point 118 (under the center of rotational mass) of drive 120, then drive 120 acts as an inertial mass (as in FIG. 4B) that resists the RAV motion from the neighboring drive 159, and drive 120 suffers little or no tracking errors, since the neighboring drive's motion acts as a $Y_T$ translational movement, not a rotational force. In some embodiments, the $Z_{R159}$ axis of drive 159 aligns with the back corner 121 of drive 120 ($Z_{R159}$ axis passes next to the rear edge of drive 120). By having the perpendicular plane containing the $Z_{R159}$ axis also include the rear edge of drive 120, then point 118 of drive 159 is closer to rear corner 121 of drive 120 than is either of corner 119 or corner 121 of drive 159.

Figures 4D, 4E:
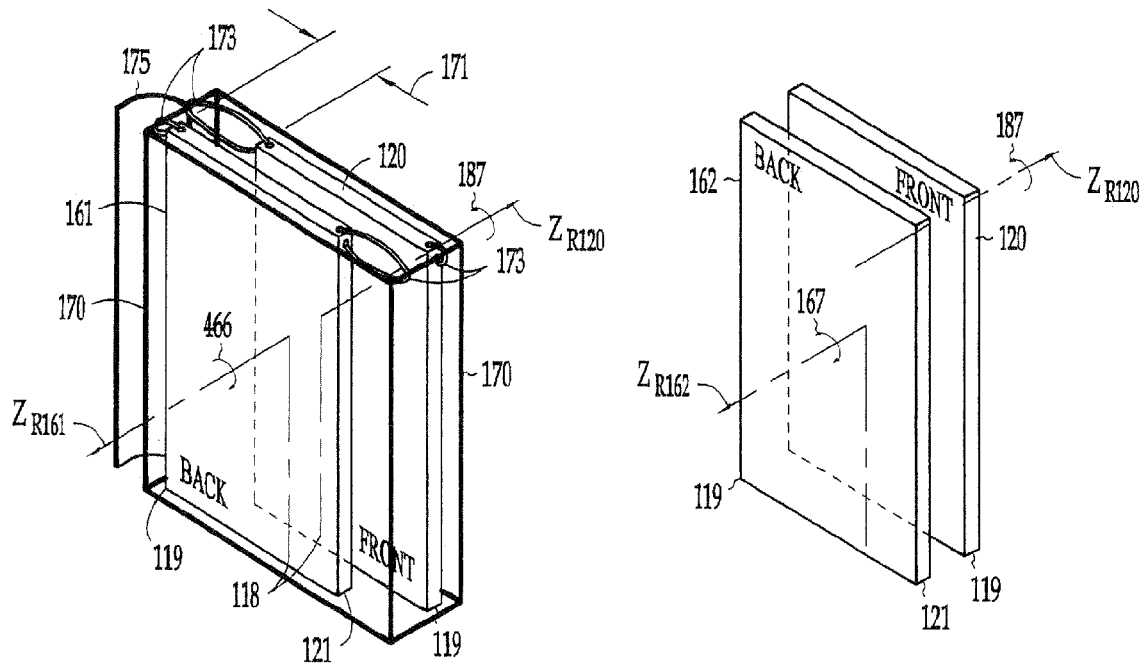
FIG. 4D is a perspective drawing of a pair of disk drives in a counter-rotating parallel orientation with their axes of rotation aligned.
FIG. 4E is a perspective drawing of a pair of disk drives in a counter-rotating parallel orientation with their edges aligned.

FIG. 4D shows a pair of drives in a counter-rotating parallel orientation with their axes of rotation aligned. That is, $Z_{R120}$ axis of reference drive 120 is co-linear with $Z_{R161}$ axis of neighboring drive 161. In some embodiments, seek operations are synchronized (by pairing, striping or both), such that rotation force 187 of drive 120 is to some extent simultaneous with and cancels some or all of rotational force 466 of drive 161. In some embodiments, each pair of drives 120 and 161 is mounted in a shuttle or holder 170 that holds the drives at the necessary offset 171 to align rotational axis $Z_{R161}$ to rotational axis $Z_{R120}$, and to provide a convenient carrying, electrical, and/or cooling holder that can be easily inserted into the disk-array enclosure. In some embodiments, such a holder 170 is provided for other sets of two or more drives (such as for FIGS. 4A, 4B, 4C, 4E, or 4F), to make handling easier.

Thus, in some embodiments, the invention provides one or more drive holders or cages 170 for holding a plurality of counter-rotating disk drives (e.g., drive 120 and drive 161). In some embodiments, each holder 170 holds two drives, one drive rotating in a clockwise direction and the other rotating counterclockwise. In other embodiments, each holder 170 holds more than two drives, where half of the drives are rotating in a clockwise direction and the other half rotating counterclockwise. In some embodiments, each holder 170 includes a single connector to connect to board 150, and a plurality of connections, one to each of the contained drives. In some embodiments, each holder 170 includes air-flow openings and one or more air-deflection vanes 175 to help direct the airflow through the drives in the enclosure. In some embodiments, each holder 170 is substantially only a wire-frame following an outline of the drives, wherein the drives are held in place by one or more visco-elastic or elastomeric bands 173, or are adhesively affixed to wire-frame holder 170.

FIG. 4E shows a pair of disk drives (reference drive 120 and neighboring drive 162) in a counter-rotating parallel orientation with each of their edges 119 aligned to edge 121 of the other drive. Even though (at least for drives whose centers of rotational mass do not coincide with the X-direction centerline of the drive) the center of rotational mass axis $Z_{R162}$ of drive 162 will not exactly align with the center of rotational mass axis $Z_{R120}$, at least some of the rotational force will cancel if the seek operations overlap completely or to some extent.

Figure 4F:
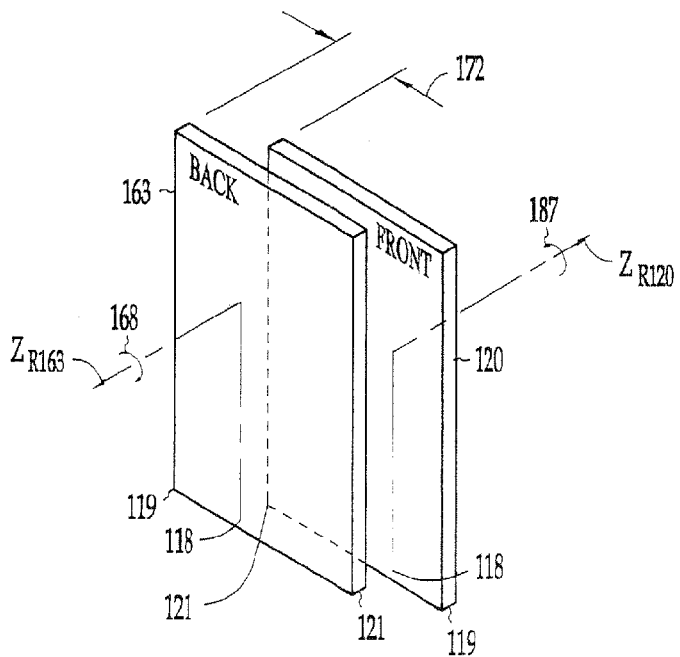
FIG. 4F is a perspective drawing of a pair of disk drives in a counter-rotating parallel orientation each with its axis of rotation aligned with an edge of the other disk drive.

FIG. 4F shows a pair of drives in a counter-rotating parallel orientation each with its axis of rotation aligned with an edge of the other drive. In this configuration, rather than trying to cancel the clockwise and counterclockwise rotational forces, the corner 121 of a reference (first) drive 120 is placed next to the center-of-rotational-mass point 118 of the neighboring (second) drive 163 (rotational axis $Z_{R120}$ of drive 120 is aligned to the edge of neighboring drive 163), and the corner 121 of the second drive 163 is placed next to the center-of-rotational-mass point 118 of the first drive 120 (rotational axis $Z_{R163}$ of neighboring drive 163 is aligned to the edge of drive 120). In other embodiments, corners 119 of each drive are aligned next to point 118 of the other drive. Thus, either one of these two drives can perform a seek while the other is trying to read or write, and transfer little or no rotational force to the other drive. In some embodiments, drive 120 is front-to-front facing drive 163, as shown. In other embodiments, drive 120 is front-to-back to drive 163 (the front of both drives facing the same direction. In some embodiments, offset 172 is selected to align corner 121 of each drive to the center-of-rotational mass 118 of the other drive.

Furthermore, the angle alpha (see FIG. 4C) between the two drives may be a function of the structural environment (transmission path) that connects the two drives. The mass, stiffness, shape and properties of the connecting structure will offer a "tunable" platform to minimize rotational force effects between drives in a paired and/or rowed set. The angle of offset could vary depending on the structure, and may range from 90 degrees (where the drives are perpendicular) to 0 degrees (where the drives are parallel, and, in some embodiments, the parallel drives are offset in the X direction). In some embodiments, the placement of drives is based, at least in part, on a computer simulation of the expected vibration-transmission and/or standing-wave resonance patterns. In other embodiments, a mock-up is built with movable masses that represent the masses of the disk drives (e.g., actual disk drives are used, in some embodiments), and the masses are iteratively moved, tested, moved again, and tested again, etc., until a satisfactory resonance pattern is achieved that also provides a suitable air-flow pattern for cooling.

Figure 4G:
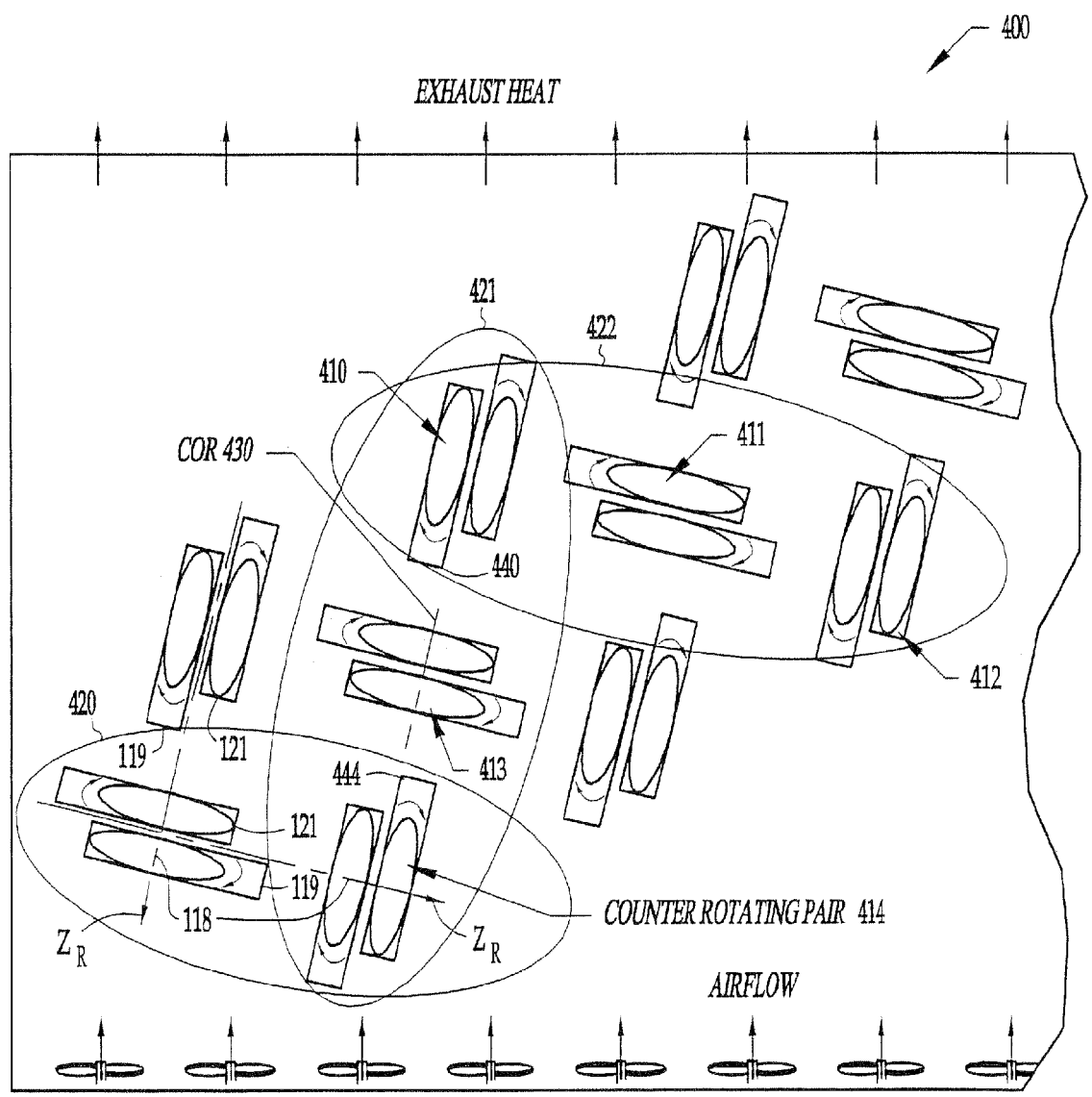
FIG. 4G is a plan-view schematic of a herringbone configuration 400' with counter-rotating pairs of disk drives.

FIG. 4G shows a herringbone configuration 400 with counter-rotating pairs of drives, e.g., 410, 411, 412, 413, and 414 that are in T-orientations to one another, e.g., 420, 421, and 422. Note that in the T-orientation set 421 that counter-rotating pair 413 has its center of rotation 430 aligned to the corner 440 of pair 410 that move the most on a seek, and also to corner 444 of drive pair 414. This provides cross-wise stiffening at these corners 440 and 444, while also exposing the least sensitive area 430 (i.e., if the center of rotation (COR) is moved up or down, there is much less likelihood of error than if this area is rotated) of drive pair 413.

Figure 5:
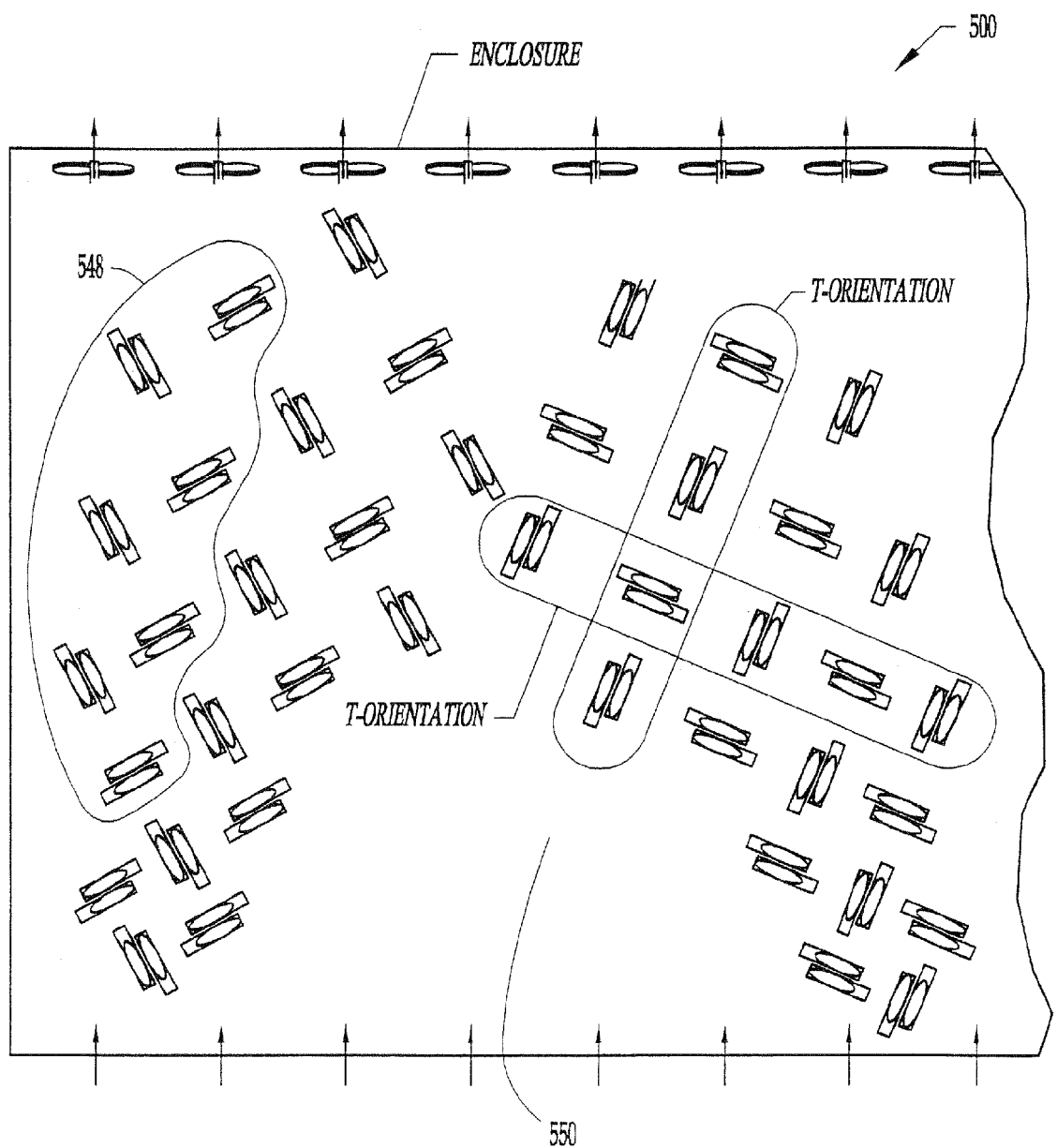
FIG. 5 is a plan-view schematic of a herringbone configuration 500 with counter-rotating pairs of disk drives.

FIG. 5 shows, for some embodiments, a herringbone T configuration 500 with counter-rotating pairs of drives. The drives 548 at the downstream end of a heating air flow are spaced further apart than are the drives at the upstream end. Further, the center area 550 is left open so the source of cooling air has better access to the drives deep in the enclosure.

Figure 6A:
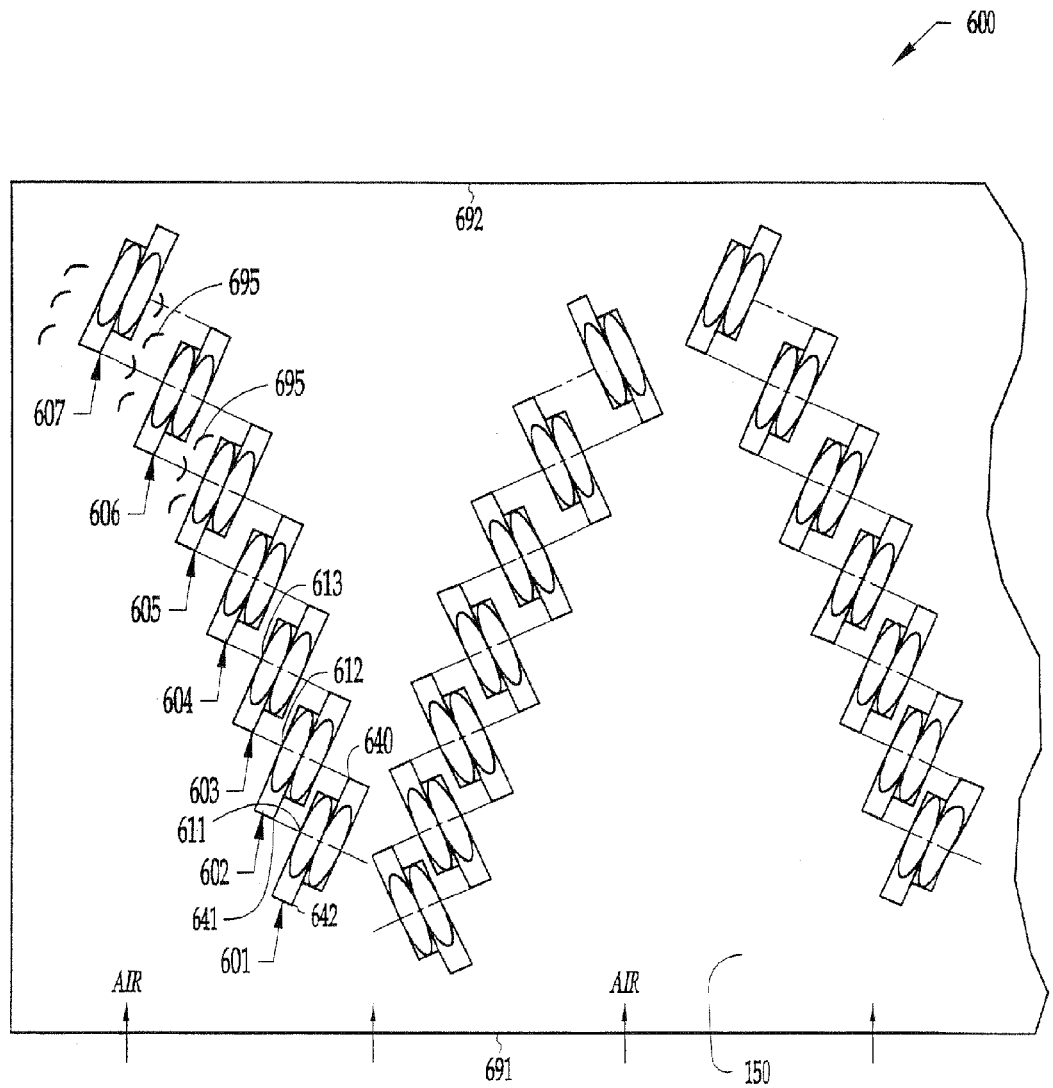
FIG. 6A is a plan-view schematic of another herringbone configuration 600 with counter-rotating pairs of disk drives.

FIG. 6A shows another herringbone configuration 600 with counter-rotating pairs of drives, not in a T-orientation, but in a parallel configuration that places a corner 640 of a first pair of drives 601 closest to the COR 612 if a second pair of drives 602, and the corner 641 of drive pair 602 next to the COR 611 of drive pair 601. This pattern is repeated for pairs 603, 604, 605, 606, and 607, and in the series of pairs to the right etc. Notice also that the rearward or upward end drives 605, 606, and 607 are spaced further from one another than are the frontward or lower drives 601, 602, and 603. In some embodiments, the fans are omitted and the 692 end of the enclosure is uppermost and the 691 end is lowermost (e.g., of a vertically-aligned enclosure), in order that heat convention pulls air up through the enclosure, allowing cooling with fewer or no fans. In other embodiments, the enclosure is mounted horizontally, with ends 691 and 692 substantially horizontally aligned with one another, and fans providing the air movement. In some embodiments, air "turbulators" 695 are provided, particularly for the wider spaced, in order to introduce turbulence and have more of the cooling air come into contact with the drive pairs 605-607.

Figure 6B:
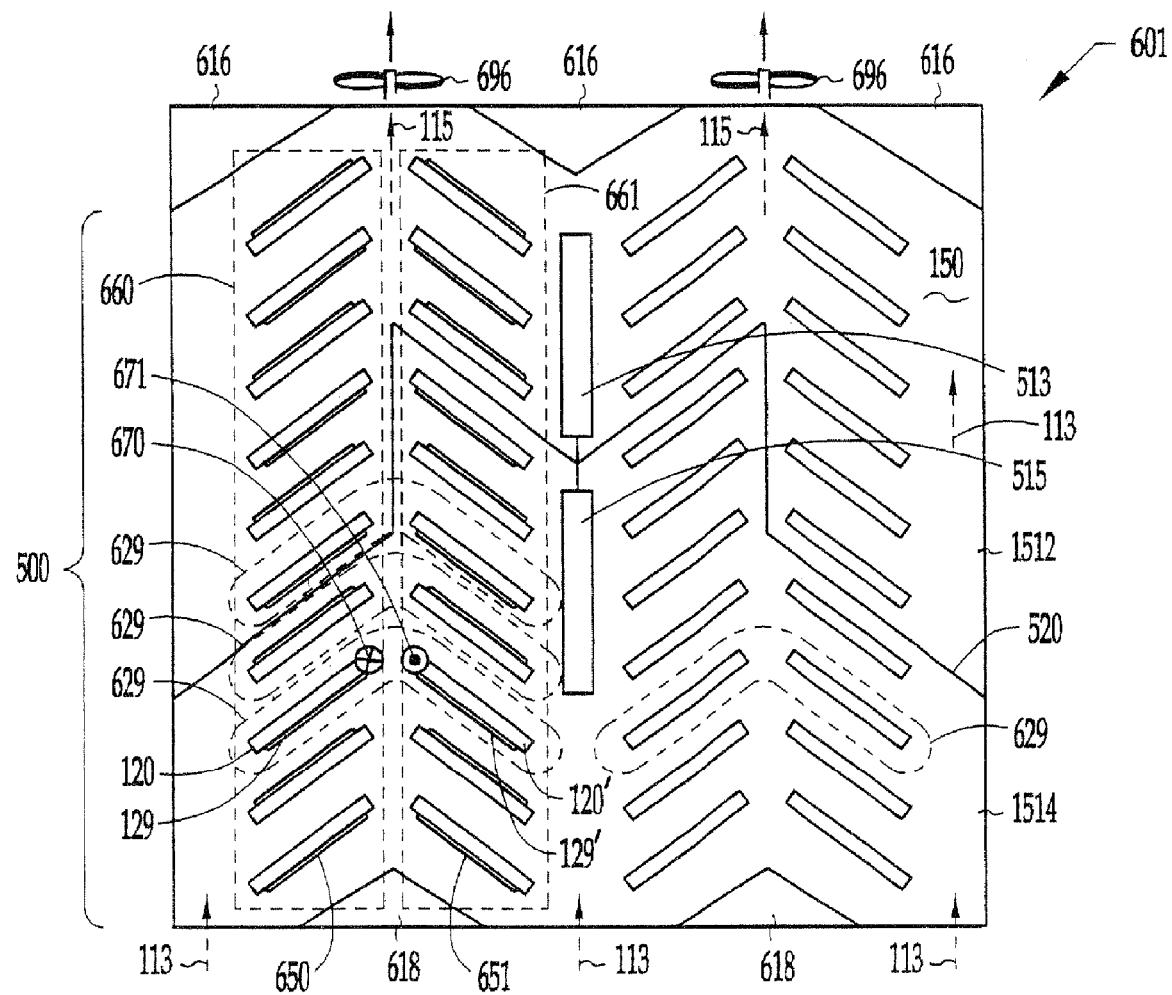
FIG. 6B is a plan-view schematic of another herringbone configuration 601 with counter-rotating pairs of disk drives.

FIG. 6B is a schematic plan view of the configuration of an enclosure 601 having a plurality of approximately right-angled paired disk-drive connectors 629. In some embodiments, each individual one of the disk-drive connectors 129 of the first plurality of disk-drive connectors 650 and each corresponding respective one of the disk-drive connectors 129' of the second plurality of disk-drive connectors 651 are oriented so that each pair of connectors form about a ninety-degree angle. In some embodiments, each pair 629 has a first connector 129 for a first disk drive 120 and a second connector 129' for a second disk drive 120', where a corner of the first disk-drive connector 129 is near a corner of the second disk-drive connector 129' and the two connectors are oriented at an approximately ninety-degree angle to each other. In some embodiments, a first plurality of disk-drive connectors 129 are coupled electrically and mechanically to a substrate 150 in a first row 650 and a second plurality of disk-drive connectors 129' are coupled to the substrate 150 in an adjacent second row 651 that is substantially a mirror image of the first row 650. In some embodiments, a disk-drive connector 129 in the first plurality of disk-drive connectors 650 and a second disk-drive connector 129' in the second plurality of disk-drive connectors 651' are oriented such that a disk drive 120 connected to the first disk-drive connector 129 produces a rotational force at the adjacent corner 670 (e.g., downward into substrate 150 for a particular seek direction and magnitude) that is opposite that produced by a second disk drive 120 that is connected to the second disk-drive connector 129' at the adjacent corner 671 (e.g., up out of substrate or board 150 for a particular seek direction and magnitude). In some embodiments, data is striped across the disk drives 660 that are connected to the first plurality of disk-drive connectors 650 and the same data is mirrored to and striped at corresponding locations (e.g., logical-block addresses, or LBAs) across the disk drives that are connected to the second plurality of disk-drive connectors 661. In some embodiments, data that is striped on disk drives 660 that are connected to the first plurality of disk-drive connectors 650 is mirrored onto corresponding respective ones of the plurality 661 of disk drives 120 that are connected to the second plurality of disk-drive connectors in row 651, such that rotational force resulting from a read or write function in the first plurality of disk drives is opposed by the rotational force resulting from the same read or write function in the second plurality of disk drives. In some embodiments, inlet air dams 618 at the air inlet side force air 113 into the inlet manifolds 1112, then between the drives and outlet air 115 is drawn by fans 696 out the outlet side (e.g., rear) of enclosure, and outlet air dams 616 form the rest of the airflow guidance. In some embodiments, circuit board 150 is made in two or more (e.g., horizontal) parts 1512 and 1514 that connect to a single (e.g., vertical) circuit board that is connected to both connectors 513 and 515, and provides wiring to either a controller card mounted parallel to board 150 at the opposite end of drives 120, or to cables running out the rear of the enclosure (e.g., at the top of FIG. 6B).

Figure 7A:
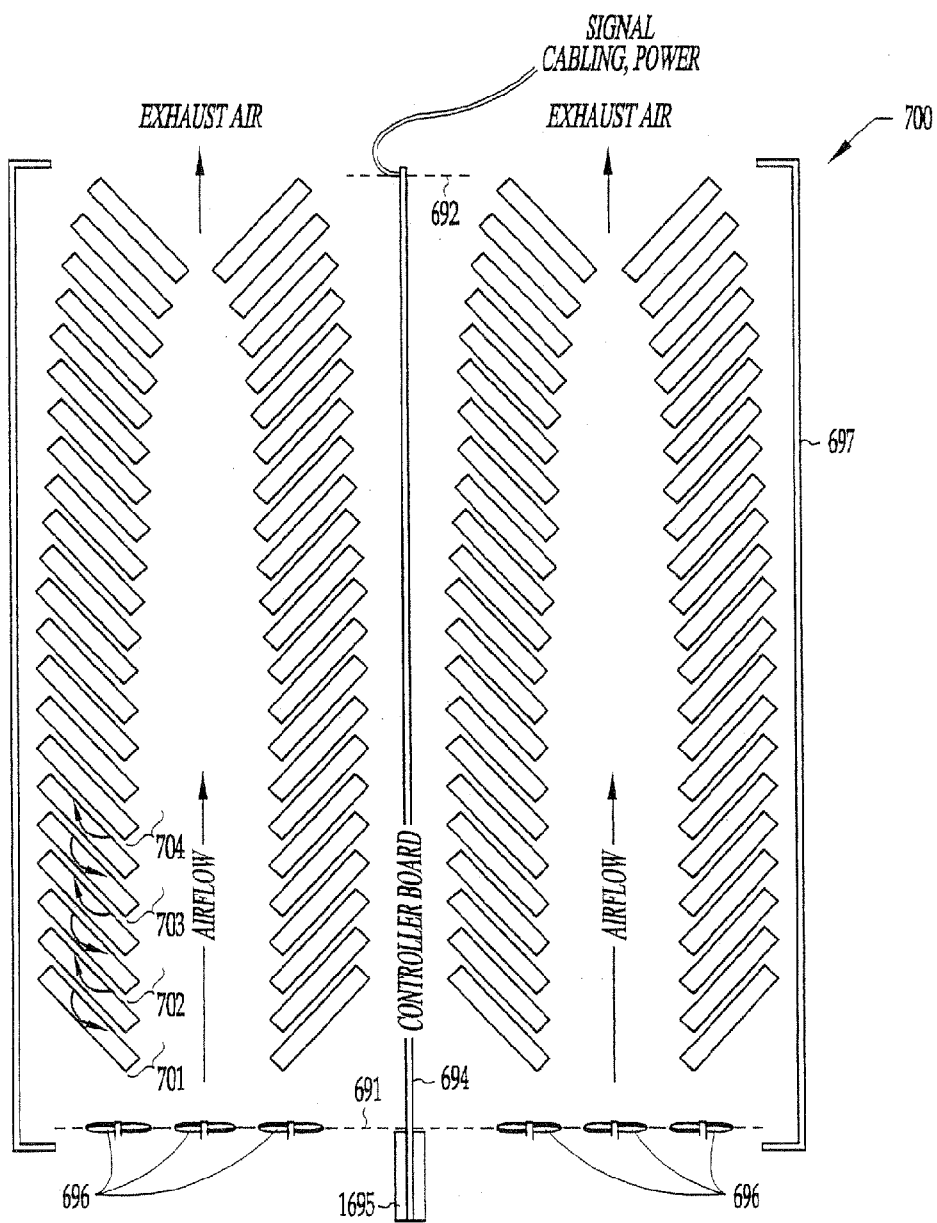
FIG. 7A shows a plan view of yet another herringbone configuration 700 of disk drives.

FIG. 7A shows a plan view of yet another herringbone configuration 700 with alternating counter-rotating pairs of drives 701, 702, 703, 704. The drives at the top or back 692 of the enclosure 692 are spaced further apart than are the drives near the bottom or front 691. In some embodiments, the controller board 694 is mounted on edge between the covers to stiffen them and provide vibration isolation. In some embodiments, a display 1695 (either one-sided or two-sided) is mounted to stick out at a right (or other suitable) angle from the front or bottom of the enclosure, so as not to interfere with air flow through the fans 696, while providing easy viewing at an angle for a user in front of the unit.

Figure 7B:
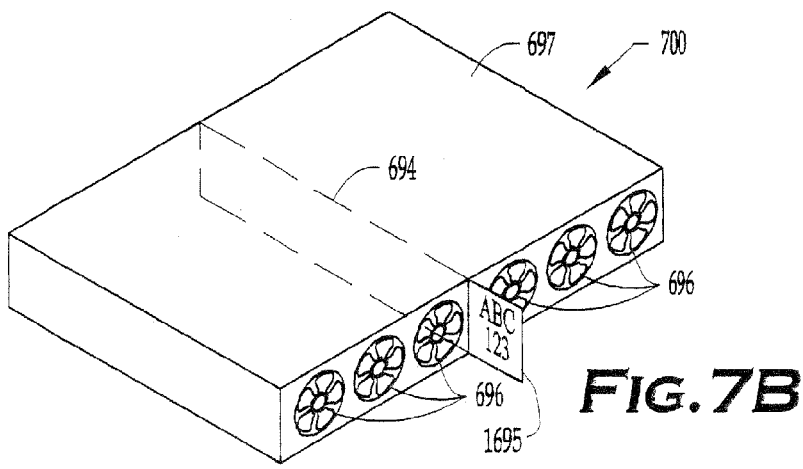
FIG. 7B shows a perspective view of system 700.

FIG. 7B shows an abstraction perspective view of storage subsystem 700 of FIG. 7A.

Figure 8A:
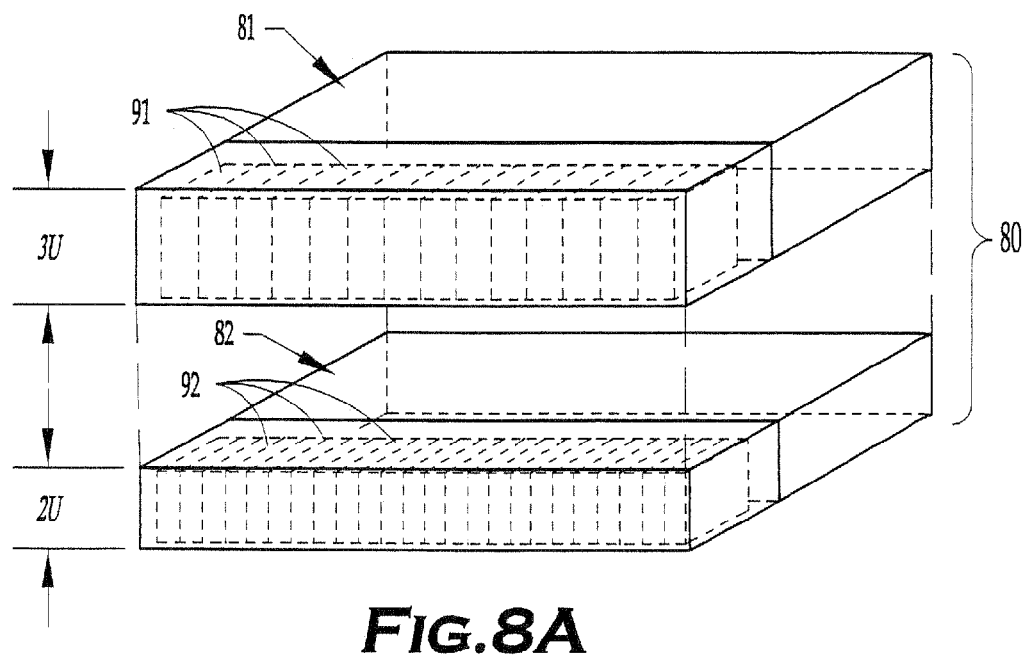
FIG. 8A is a perspective drawing of prior-art "high-density" hard-disk-drive (HDD) enclosure systems 81 and 82 as might be mounted in a rack 80.

FIG. 8A is a front perspective drawing of prior-art "high-density" hard-disk-drive (HDD) enclosure systems 81 and 82 as might be mounted in a rack 80. In some embodiments, enclosure system 81 is 3 U or 5.25 inches high (13.34 cm), while in others enclosure system 82 is 2 U or 3.5 inches high (8.89 cm). In some embodiments, enclosure system 81 contains a plurality of disk drive enclosures 91, whereas in other embodiments enclosure system 82 contains a plurality of drive enclosures 92.

Figure 8B:
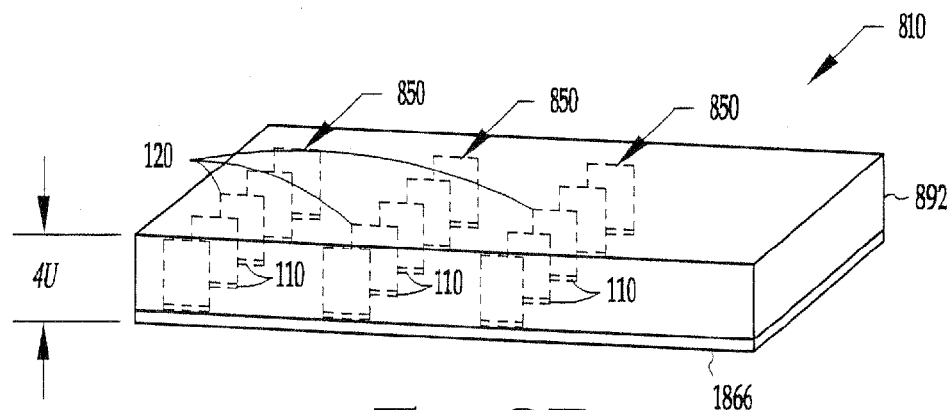
FIG. 8B is a perspective drawing of a high-density HDD enclosure system 810 according to the present invention.

FIG. 8B is a front perspective drawing of a high-density HDD enclosure system 810 according to the present invention. In some embodiments, this enclosure is 4 U high or 7 inches (17.78 cm), and contains the plurality of disk drives 120, each drive 120 coupled to the enclosure 892 via one or more connectors 110. In some embodiments, a plurality of drives 120 is aligned in one or more substantially straight rows 850.

Figure 8C:
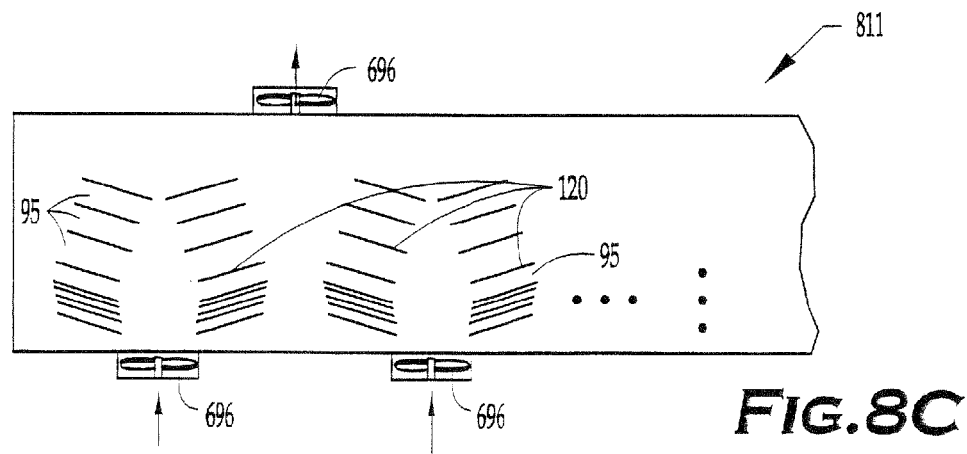
FIG. 8C is a perspective drawing of a high-density HDD enclosure system 811 using a herringbone configuration according to the present invention.

FIG. 8C is a top-down perspective drawing of a high-density HDD enclosure system 811 using a "herringbone" configuration according to the present invention. This herringbone configuration contains the plurality of disk drive enclosures 92, separated by one or more tuned air-flow spaces such as inlet manifold 1112, outlet manifold 1114 and between-drive spaces 95. In some embodiments, system 811 contains one or more fan 696 for allowing air to flow into the system 811, and one or more of these fans 696 for urging air to flow out of the system 811.

Figure 8D:
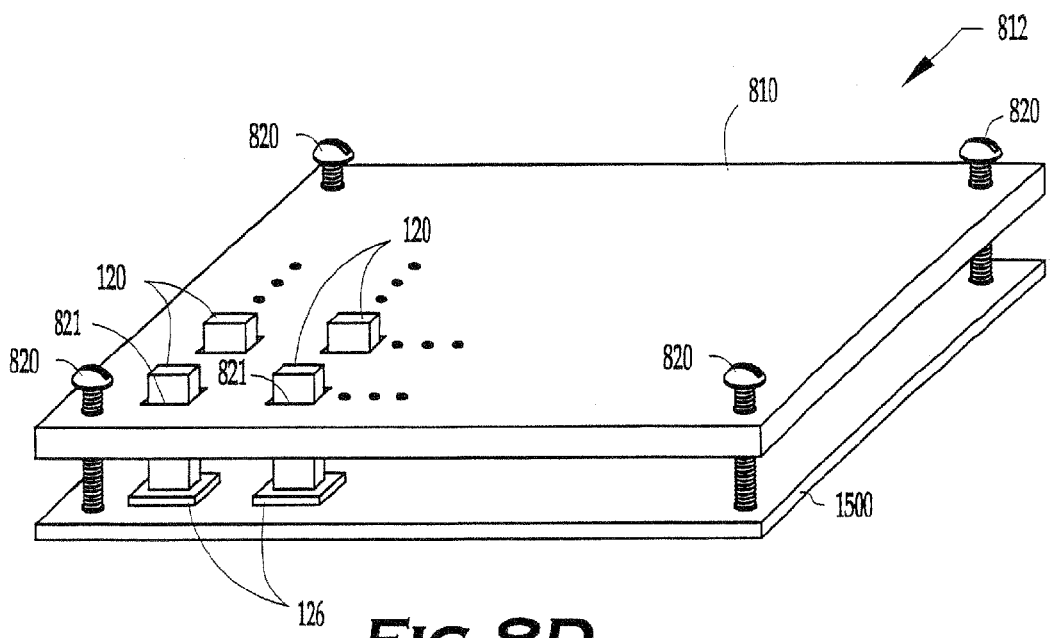
FIG. 8D is a perspective view that illustrates a perforated support grid for a plurality of disk drives with ESD-(electro-static discharge prevention)-coated visco-elastomeric material.

FIG. 8D is a front perspective view that illustrates a system 812 having a perforated support grid 819 for a plurality of disk drives 120 with an anti-ESD-coated (i.e., having a high-resistivity (but not insulating) coating for electro-static discharge prevention and/or dissapation) visco-elastomeric material, and height-adjustment screws 820.

Figure 8E:
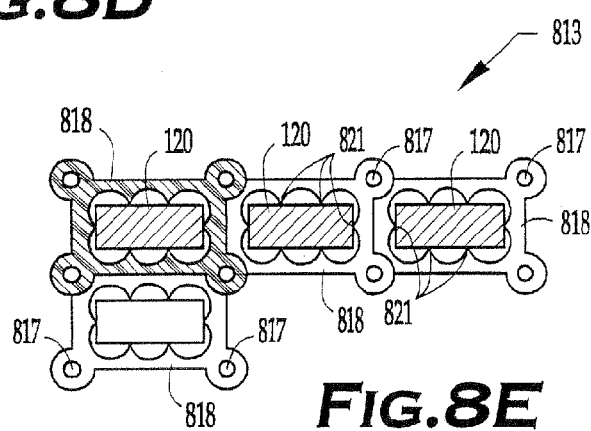
FIG. 8E is a top view that illustrates nesting support grid for a plurality of disk drives with ESD-(electro-static discharge prevention)-coated visco-elastomeric material.

FIG. 8E is a top view that illustrates a system 813, which, in some embodiments, includes a set of nesting support grids 818 (for a plurality of disk drives 120) made with ESD- (electro-static discharge prevention)-coated visco-elastomeric material. In some embodiments, each support grid 818 fits over a pin 817 and provides a plurality of spaced-apart connection points 821 to each drive 120.

Figure 8F:
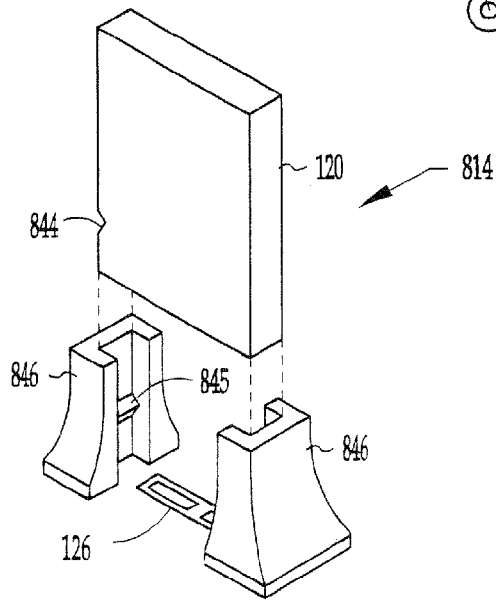
FIG. 8F is a perspective view that illustrates system 804 having a molded-in connector 819 support for a plurality of drives mounted in a vertical orientation.

FIG. 8F is a front perspective view that illustrates system 814, which, in some embodiments, has a separate molded-in ESD-coated visco-elastomeric material connector support (mold-in connector support) 846 for each one of a plurality of drives 120 mounted in a vertical orientation. In some embodiments, each of the drives 120 has a notch 844 to independently secure each of the drives 120 in the mold-in connector support 846. This notch 844 locks into a detent 845 in support 846. Each of the drives 120 connects to a circuit board via a connector 126.

Figure 8G:
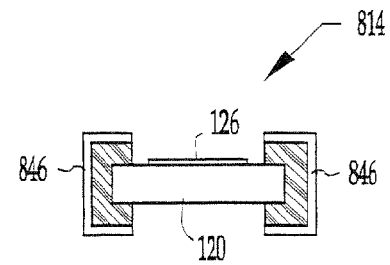
FIG. 8G is a top view of system 804 of FIG. 8F.

FIG. 8G is a top view of system 814 of FIG. 8F that, in some embodiments, contains a plurality of the illustrated drive 120 each secured in its molded-in connector support 846.

Figure 8H:
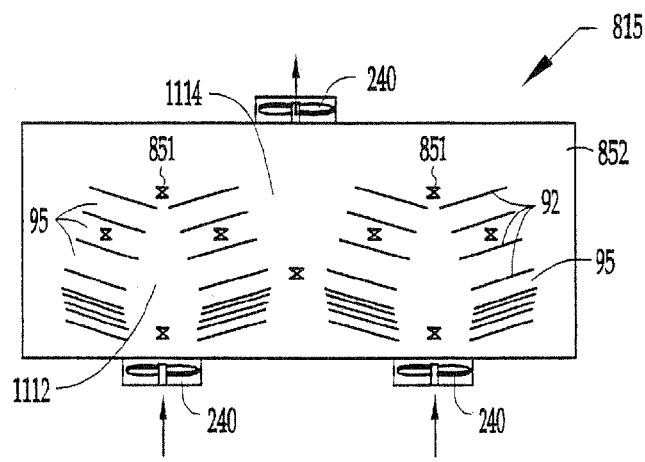
FIG. 8H is top view that illustrates the distribution of temperature sensors around the inlet manifold 1112, outlet manifold 1114 and between-drive spaces 95.

FIG. 8H is a top view that illustrates the top view of a high-density HDD enclosure system 815 using a herringbone configuration according to the present invention, wherein, in some embodiments, there is a distribution of temperature sensors 851 around the tuned airflow spaces such as inlet manifold 1112, outlet manifold 1114 and between-drive spaces 95. This herringbone configuration contains the plurality of disk drives 120, separated by one or more tuned airflow spaces such as inlet manifold 1112, outlet manifold 1114 and between-drive spaces 95. In some embodiments, system 815 contains one or more fans 240 for allowing air to flow into the system 815, and one or more of these fans 240 for allowing air to flow out of the system 815.

Figure 8I:
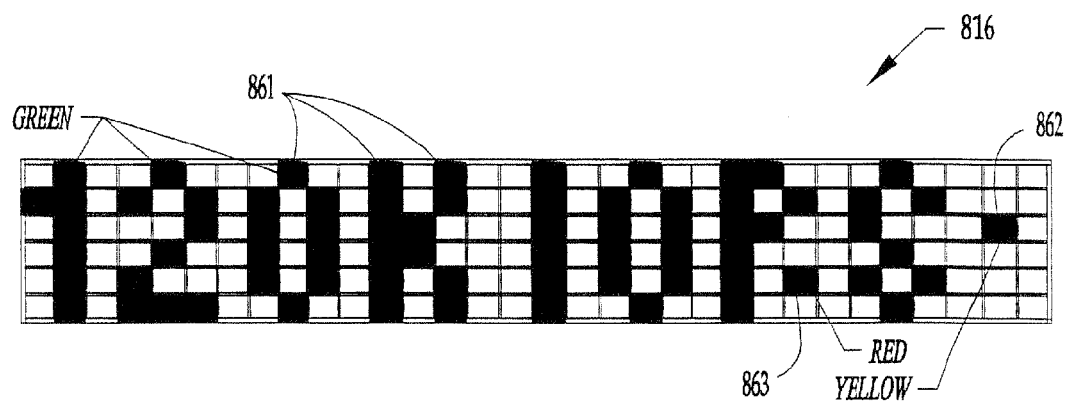
FIG. 8I is a front view that illustrates the status-display grid 816.

FIG. 8I is a front view that illustrates a status display grid system 816, wherein, in some embodiments, the display grid system is composed of various light emitting diodes (LED). Specifically, in some embodiments a green LED 861 is used by itself or in combination with a yellow LED 862 and/or a red LED 863. And again, in some embodiments the yellow LED is used by itself of in combination with the green LED 861 and/or the red LED 863. In still further embodiments the red LED 863 is used by itself or in combination with the green LED 861 and/or the yellow LED 862.

Figure 8J:
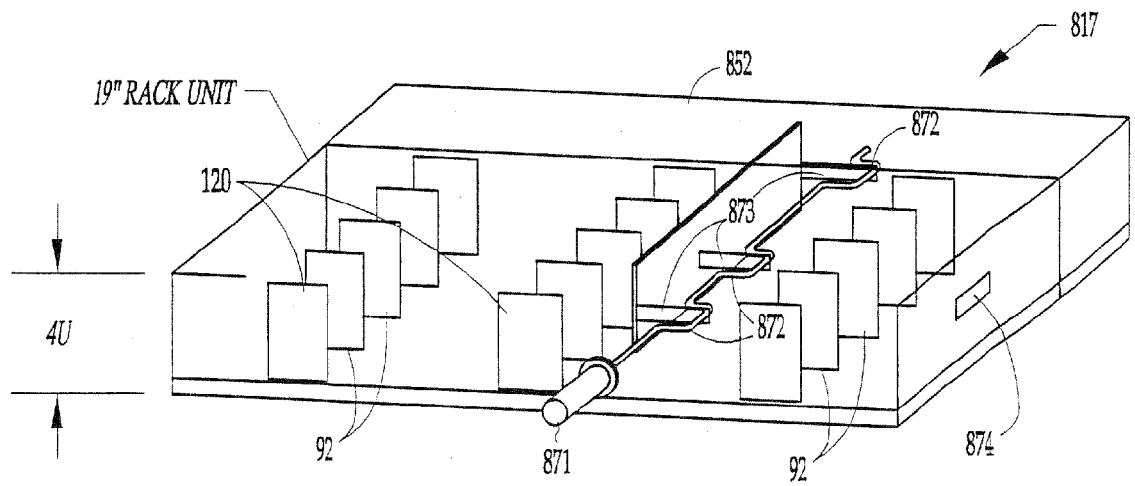
FIG. 8J is a perspective view that illustrates a cover-latching mechanism that seats the drives into their connectors.

FIG. 8J is a perspective view that illustrates an exposed front view of a system 817 wherein, in some embodiments, a cover-latching mechanism is used to seat the drives into their connectors. In some embodiments, this cover-latching mechanism is contained in a case 852 which is 4 U high or 7 inches (17.78 cm), and is placed into a 19 inch (48.26 cm) rack unit. In some embodiments, contained within this case 852 is a plurality of drives 120, which can be seated or unseated using a cam 872 mechanism movably attached to a handle 871. The handle 871 is used to lift or lower the cam 872 and to seat or unseat the plurality of drives 120. When the plurality of drives 120 are seated, the cam 872 sits recessed in a slot 873. In some embodiments, individual drives 120 may be seated or unseated using the above disclosed cover-latching mechanism.

Figure 9A:
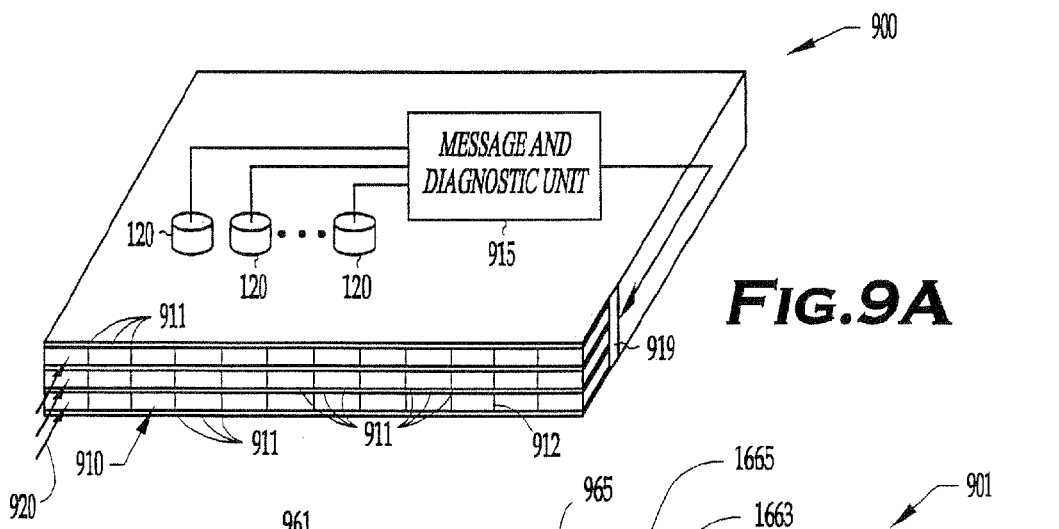
FIG. 9A is a perspective view that illustrates a porous display having LEDs mounted on a screen that has much space for air flow through the displays.

FIG. 9A is a perspective view of a system 900 that illustrates a porous display 910 having LEDs 911 mounted on a screen 912 that has much space for air flow 920 through the display. In some embodiments, the display 910 includes a plurality of different color LEDs (e.g., red, green, blue, and/or yellow) that can be activated by control unit 915 that senses various parameters in system 900 (such as temperature, air flow, disk-drive status, performance (e.g., input-output operations per second, or IOPS, and the like), and generates appropriate text and/or graphical display messages that are transmitted to the array 910 of LEDs 911 for viewing by a user or operator. In some embodiments, a connector 919 is provided to connect controller unit 915 to the display 910. By attaching the LEDs to a sparse grid having conducting wires therein, air flow is improved since the air can flow through the display rather than being forced around the display. In some embodiments, a grid is provided having openings that are approximately 6 mm by 6 mm passing through a grid having grid support (e.g., wiring and insulating supports) that is about 1 mm or less in diameter.

Figure 9B:
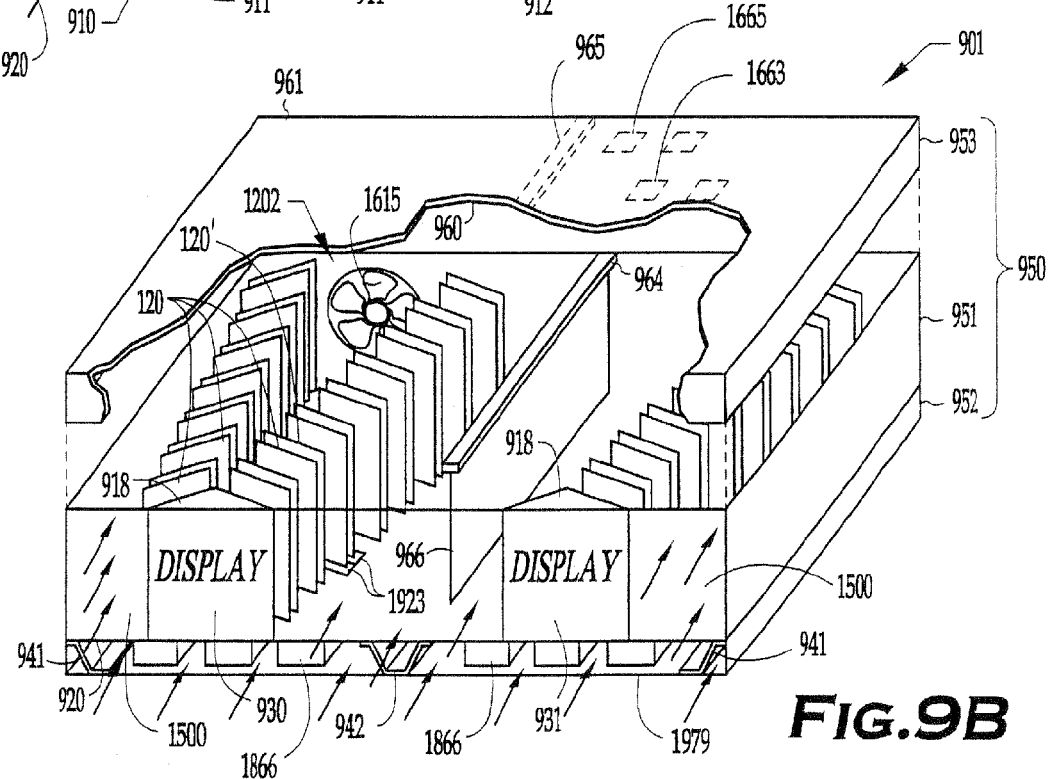
FIG. 9B is a perspective view that illustrates an LCD display mounted on the inlet air dams allowing much space for air flow around the displays.

FIG. 9B is a perspective view of a system 901 that illustrates one or more LCD displays 930, 931 mounted on the inlet air dams 918 allowing much space for air flow 920 around the displays 930 and 931. The configurations of displays 930 and 931 provide an alternative to the configuration of flow-through display 910 of FIG. 9A. In some embodiments, a circuit board 1500 has a plurality of disk-drive connectors 1923, each of which connects to its respective disk drive 120. In some embodiments, the disk drives 120 are mounted to the top side of board 1500, and one or more DC-to-DC power supplies 1866 are attached to the bottom of board 1500. In some embodiments, a plurality of cross-brace members 941 and 942 are provided between bottom cover 1979 and circuit board 1500 to provide stiffness. In some embodiments, a center circuit board 966 (in some embodiments, board 966 includes one or more metal I-beams in parallel with it for further stiffness—see FIG. 21). In some embodiments, a controller unit 953 includes a controller circuit board 960 that includes a plurality of serial expander circuits 1663, 1665, and a top sheet metal cover 961. In some embodiments, enclosure 950 includes a bottom enclosure 952 that provides an air manifold for power supply 1866, a middle enclosure 951 that provides air manifolds 1112 and 1114 directing air around disk drives 120 and a top enclosure 953 directing air around controller card 960. In some embodiments, center board 966 is pulled into a socket on board 1500, and, in turn, provides a plug-and-socket connection 964, 965 to controller board 960. In some embodiments, expander circuits 1663, 1665, are distributed among top-controller card 960, middle connector board 966, and disk-drive connector board 1500. In some embodiments, disk drives are arranged in pairs 120, 120' that are oriented and operated to counteract rotational vibration, as described elsewhere herein. In some embodiments, fans 1615 mounted on the rear of system 901 pull air 920 through the system between the drives 120, across the circuit boards 1500, 966, and 960 and around the power supplies 1866. The air is exhausted through outlet ports 1202 and the rear of the unit.

Figure 9C:
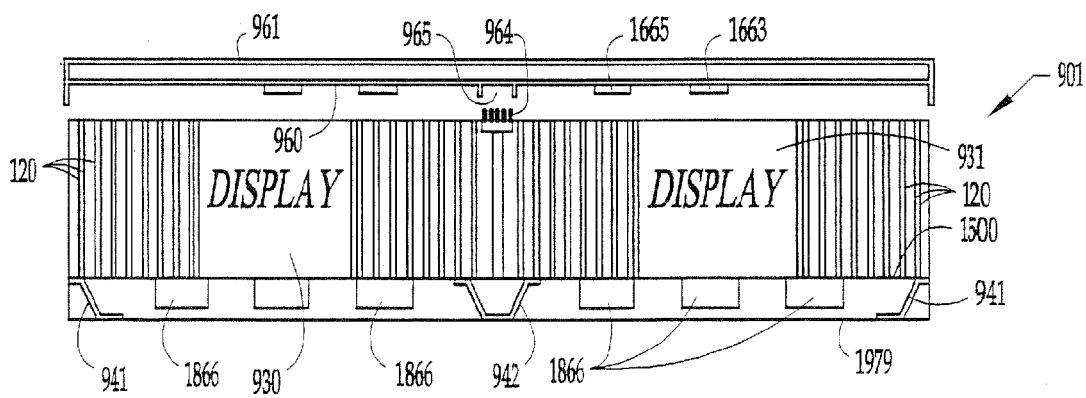
FIG. 9C is a front-elevation view that illustrates an LCD display mounted on the inlet air dams allowing much space for air flow around the displays.

FIG. 9C is a front elevation view of system 901 that illustrates LCD displays 930, 931 mounted to the inlet air dams allowing much space for air flow around the displays and between the drives 120. The other reference numbers indicate features and configurations of the corresponding units shown in FIG. 9B and described above.

Figure 10:
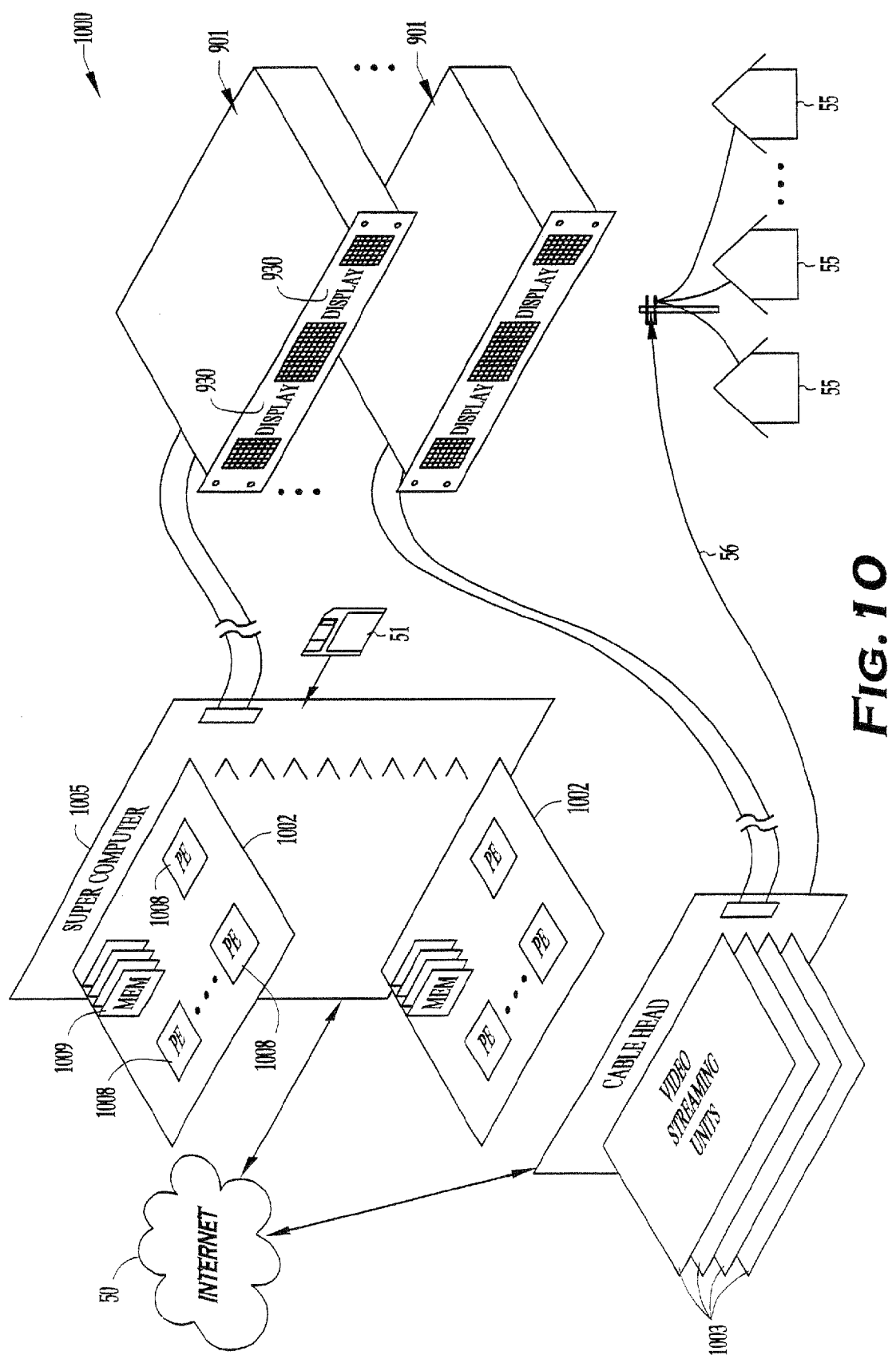
FIG. 10 is a blown-up perspective view of a system 1000 of some embodiments having one or more disk-drive systems 1001 operatively coupled to one or more central processing units (CPU) 1002 and/or one or more video-streaming units 1003 or some combination thereof.

FIG. 10 is an illustration of a system 1000 wherein, in some embodiments, one or more multiple-disk-drive units 901 are operatively coupled to one or more multi-processors (MPs) 1002, of supercomputer 1005 and/or one or more video-streaming unit 1003. In some embodiments, each MP 1002 includes memory 1009 and two or more processing elements (PEs) 1008. In some embodiments, supercomputer 1005 is a high performance scientific computer well known in the art. In some embodiments, supercomputer 1005 is connected to an internet 50. Video-streaming units 1003, in some embodiments, provide the capability for video-on-demand to a large plurality of subscribers such as homes 55 connected to cable system 56, in order to provide each subscriber with a selectable source of television programming.

In some embodiments, the invention includes a computer-readable medium 51 (such as a diskette, CDROM, FLASH ROM with a USB plug, internet-connected data source, or the like) having control information (such as, for example, instructions, tables, formulae, state transitions, data structures, and/or the like) stored thereon for causing a suitable programmed apparatus, such as system 1000 or other system described herein, to execute one or more of the methods described herein. For example, in some embodiments, super-computer 1005 and/or video-streaming units 1003 of FIG. 10 provides a programmable information processor that is coupled to read and obtain control information (such as instructions and/or data structures) from computer-readable medium 51 (which can include storage that is accessed across internet 50), and coupled to control apparatus 1000 or other system described herein, according to the instructions stored on the medium.

FIG. 11 is a plan-view block diagram of a data-storage system 1100 of some embodiments of the invention that provides a high density enclosure that, in some embodiments, has one or more rows 1150 of disk drives 120 (only one row 1150 is shown in FIG. 11). In some embodiments, system 1100 includes an enclosure 1110 that holds a plurality of disk drives 120 in a straight row 1150. Other embodiments provide a plurality of such rows. In some embodiments, enclosure 1110 is fabricated from sheet metal. In other embodiments, the enclosure is fabricated from other materials that include plastic, fiberglass, reinforced composites, and the like. In some embodiments, enclosure 1110 is made to a standard form factor such as a five-unit (or 5 U, referring to a height) enclosure for a nineteen-inch (48.26 centimeter) rack. (A rack unit or "U" is an Electronic Industries Alliance (EIA) standard unit for measuring the height of rack-mount-type equipment. One rack unit is one-and-three-fourths inches (1.75 inches) (about 4.45 cm) in height. A 5 U enclosure is eight-and-three-fourths inches (8.75 inches) (about 22.23 cm) high. Enclosure 1110 has a first surface 1138 facing the air inlet side 1101 (the side having inlet port 1109, which is typically called the "front") and an opposite second surface 1136 facing the air outlet side 1102 (the side having exit port 1119, which is typically called the "back"). In some embodiments, side 1101 also includes one or more user-input buttons and/or a status display for showing the status of the enclosure as a whole, performance numbers, the status of one, several, or all the enclosed disk drives, and the like.

In some embodiments, a plurality of systems 1100 (e.g., two rows, three rows, four rows, or any other number of rows 1150) are enclosed side by side in a single enclosure sharing a common first surface 1138 and second surface 1136. In some embodiments, a first face 1121 of each disk drive is facing one direction along the axis of row 1150 and the opposing second face 1122 is facing the opposite direction along row 1150. For example, in some embodiments, the first face 1121 includes a metal cover 1123 that covers the disks and actuator and opposite side (second face 1122) includes a printed circuit card 1124 that holds the electronics for the disk drive 120. Along one side of disk-drive row 1150 is air-inlet manifold 1112 that conveys inlet air 1113 to one edge of the disk-drives 120 in row 1150. In some embodiments, the plan cross-section shape of inlet manifold 1112 is rectangular, and the plan cross-section shape of outlet manifold 1114 is also rectangular in shape. Thus, each of the disk drives is aligned along a straight line perpendicular to the "front" first surface 1138 and to back second surface 1136. In some embodiments, a visual display panel is mounted on surface 1138 to show information messages and/or the status of each individual disk drive 120. Along the opposing side of disk-drive row 1150 is air-outlet manifold 1114 that conveys outlet air 1115 from the opposite edge of the disk-drives 120 in row 1150. In some embodiments of the apparatus 1100, the inlet air manifold 1112 has a length 1141 measured parallel to the first row that is longer than the inlet air manifold's width 1142 measured perpendicular to the first row 1150, and wherein the outlet air manifold 1114 has a length measured parallel to the first row that is longer than the outlet air manifold's width measured perpendicular to the first row 1150.

In some embodiments, enclosure 1110 is oriented vertically such that the cool inlet air is induced upwards within air-inlet manifold 1112, then the cross-face air 1111 flows between each adjacent drive in horizontal direction and is heated, the warm outlet air 1115 rises by convection to the exit port 1119 of air-outlet manifold 1114. This convection helps pull additional inlet air into the system 1100. In some other embodiments, a fan is provided to provide increased air flow. In some such embodiments, the fan is positioned at the exit port 1119 of air-outlet manifold 1114 in order that its self-generated heat (e.g., about 2 watts for each fan, in some embodiments) is inserted into the airstream as it exits the enclosure, after the air has passed across the disk drives, thus improving the disk-drive heat-transfer characteristics of system 1100.

In some embodiments, the spacings 1126 between disk drives increase in relation to their position in row 1150 from the inlet side (the bottom of FIG. 11) to the outlet side (the top of FIG. 11), in order that an equal amount of cooling is provided to each of the disk drives. For example, some embodiments provide a relatively small spacing 1125 between disk drives 120 near the air inlet side 1101 and a relatively larger spacing 1127 between disk drives 120 near the air outlet side 1102. In some embodiments, the same small spacing 1125 is used for each of the disk drives near the air inlet side 1101 and the same larger spacing 1127 is used for each of the disk drives near the air outlet 1102 and, intermediate spacing is used for disk drives between. In some other embodiments, a gradually increasing spacing is used (e.g., following an exponential curve) in which the spacing follows the exponential curve with an increase in spacing occurring toward the air outlet side 1102.

In some embodiments, the air flow speed and turbulence creates a standing wave of variable pressure and the spacings between individual pairs of the disk drives are empirically determined or varied (other embodiments use computer analysis of the air flow to adjust the spacings) to compensate for the standing wave and provide more even cooling for each disk drive 120. In some embodiments, the amount of airflow decreases in relation to the distance from the air inlet and thus the spacing between the drives is increased in order to achieve an equivalent amount of air cooling for each disk drive 120. At the air inlet side, a blocking panel 1118 provides an enclosed airspace at the bottom face (the face closest to the bottom of FIG. 11, which depending on the orientation of the enclosure 1110, may or may not be downward facing in the installed system 1100) of the first disk drive 120 in row 1150. A corresponding blocking panel 1116 provides an enclosed air space at the top face (the face closest to the top of FIG. 11, which depending on the orientation of the enclosure 1110, may or may not be upward facing in the installed system 1100) of the last disk drive 120.

FIG. 12 is a plan view block diagram of a data-storage system 1200 of some embodiments of the invention that uses tapered inlet and outlet air chambers. System 1200 holds a plurality of disk drives 120 in a straight row 1250 that is oriented in a non-perpendicular acute angle relative to first surface 1238. System 1200 has a first surface 1238 facing the air inlet side 1201 and an opposite second surface 1236 facing the air outlet side 1202. In some embodiments, a plurality of systems 1200 (e.g., two rows, three rows, four rows, or any other number of rows 1250) are enclosed side by side in a single enclosure sharing a common first surface 1238 and second surface 1236. In some embodiments, a first face 1121 of each disk drive is facing one direction along the axis of row 1150 and the opposing second face 1122 is facing the opposite direction along row 1250. Along one side of disk-drive row 1250 is air-inlet manifold 1212 that conveys inlet air 1113 to one edge of the disk-drives 120 in row 1250. In some embodiments, the plan cross-section shape of inlet manifold 1212 is substantially triangular, and the plan cross-section shape of air-outlet manifold 1214 is also substantially triangular in shape. In some embodiments, a visual display panel (not shown), such as an LCD dot matrix display with backlighting or an LED dot-matrix display, is mounted on front surface of triangle-shaped air blocking structure 1218 in order to be able to show information messages and/or the status of each individual disk drive 120. Note that due to the triangular shape of inlet manifold 1212 and the diagonal orientation of row 1250, a much larger (in some embodiments, about twice the area) air inlet port 1201 is provided compared to air inlet port 1101 of FIG. 11. Thus the display area on the front of blocking structure 1218 is smaller. Along the opposing side of disk-drive row 1250 is air-outlet manifold 1214 that conveys outlet air 1115 from the opposite edge of the disk-drives 120 in row 1250.

In some embodiments, system 1200 is oriented vertically such that the cool inlet air 1113 is induced upwards from inlet port 1209 within air-inlet manifold 1212, then the cross-face air 1111 flows between each adjacent drive in an upward-angled direction and is heated, the warm outlet air 1115 rises by convection to the exit port 1219 of air-outlet manifold 1214. This convection helps pull additional inlet air into the system 1200. In some other embodiments, a fan is provided to provide increased air flow. In some such embodiments, one or more fans are positioned at the exit port 1219 of air-outlet manifold 1214 in order that its self-generated heat (e.g., about 2 watts for each fan, in some embodiments) is inserted into the airstream as it exits the enclosure, after the air has passed across the disk drives, thus improving the disk-drive heat-transfer characteristics of system 1200. Because of the diagonal orientation of the drive, a larger area is available for installation of fans or other air-movement devices.

In some embodiments, the spacings between disk drives 120 increase in relation to their position in row 1250 as described above for FIG. 11. Other aspects of disk drive spacing described for FIG. 11 also apply to some embodiments of system 1200.

At the air inlet side 1201, a substantially triangular blocking structure 1218 provides an enclosed airspace at the bottom face (the face closest to the bottom of FIG. 12, which depending on the orientation of the system 1200, may or may not be downward facing in the installed system 1200) of the first disk drive 120 in row 1250. A corresponding blocking structure 1216 provides an enclosed air space at the face of disk drive 120 closest to the top of FIG. 12.

In some embodiments of apparatus 1200, the inlet air manifold 1212 has a length 1141 measured parallel to the first row that is longer than the inlet air manifold's width 1142 measured perpendicular to the first row 1250, and wherein the outlet air manifold 1214 has a length measured parallel to the first row that is longer than the outlet air manifold's width measured perpendicular to the first row 1250. In some embodiments of apparatus 1200, the inlet air manifold 1212 has a length 1241 measured perpendicular to air inlet side 1201 that is longer than the inlet air manifold's width 1242 measured parallel to air inlet side 1201, and wherein the outlet air manifold 1214 has a length measured perpendicular to air outlet side 1202 that is longer than the outlet air manifold's width measured parallel to air outlet side 1202. In some embodiments, one or more of these conditions also applies to the apparatus shown in FIG. 13, FIG. 14, FIG. 16A, FIG. 17, FIG. 18, and other systems described herein.

Figure 13:
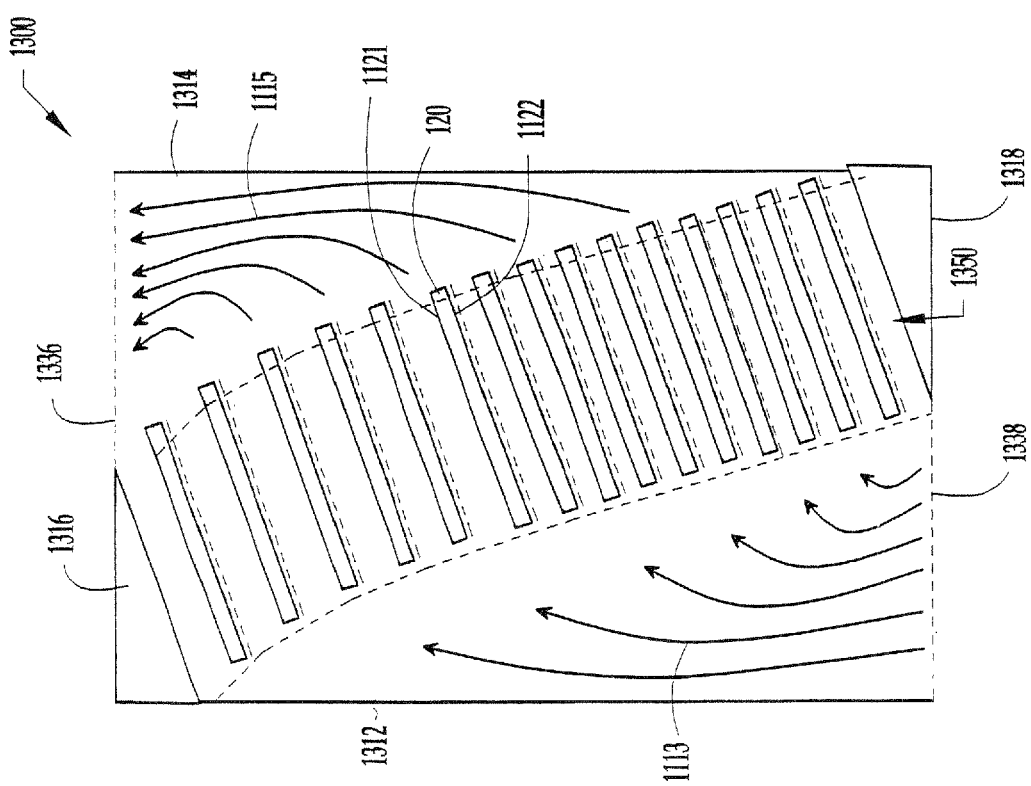
FIG. 13 is a plan-view block diagram of a data-storage system 1300 of some embodiments of the invention that uses curving tapered inlet and outlet air chambers.

FIG. 13 is a plan view block diagram of a data-storage system 1300 of some embodiments of the invention that uses curving tapered inlet and outlet air chambers. System 1300 holds a plurality of disk drives 120 in a curved row 1350 that is oriented relative to first surface 1338. System 1300 has a first surface 1338 facing the air inlet side and an opposite second surface 1336 facing the air outlet side. Along one side of disk-drive row 1350 is a curved substantially triangular shaped air-inlet manifold 1312 that conforms to the shape of the curve of row 1350. In some embodiments, the plan cross-section shape of outlet manifold 1314 is curved to conform to the opposite curved side of row 1350. In some embodiments, the curve of row 1350 substantially follows an exponential curve, in order to provide more even air flow between each of the adjacent disk drives. Other aspects of system 1300 are as described above for FIG. 11 and FIG. 12.

Figure 14:
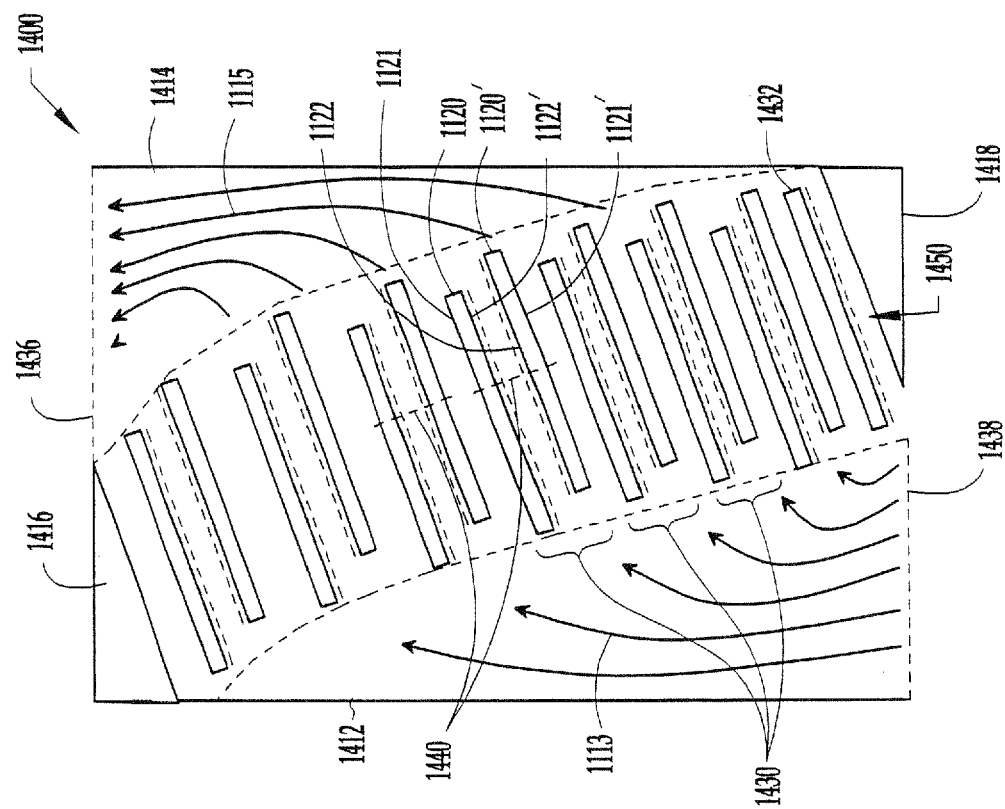
FIG. 14 is a plan-view block diagram of a data-storage system 1400 of some embodiments of the invention that uses curving tapered inlet and outlet air chambers, and laterally offset paired drives.

FIG. 14 is a plan view block diagram of a data-storage system 1400 of some embodiments of the invention that uses curving tapered inlet and outlet air chambers, and laterally offset paired drives. System 1400 holds a plurality of disk drives 120 in a curved row 1450 that is oriented at an angle relative to first surface 1438, however, the disk drives are arranged in coupled pairs 1430, each pair having a disk drive 120 facing generally towards air inlet side 1438 and another disk drive 120 facing in an opposite direction (generally towards air outlet side 1436). For example, a first disk drive 120 can have its metal face 1121' facing the exit side 1436 and its printed circuit side 1122 facing inlet side 1438, while the other drive of the coupled pair 1120' has its metal face 1121" facing inlet side 1438 and its printed circuit side 1122' facing outlet side 1436. Thus each coupled pair 1430 includes a disk drive 120 having disks that rotate in a first direction (for example, clockwise) and another disk drive 120 having disks that rotate in an opposite direction (for example, counter-clockwise). More important than the direction of disk rotation, in some embodiments, is the direction of rotational acceleration due to actuator seek operations. This is because disk rotation assumes a steady-state velocity (no acceleration due to disk rotation), however actuator seek operations cause rotational acceleration that can be transmitted as a vibration to neighboring disk drives. This rotational acceleration vibration can force a transducer off its desired track during a read or write operation thus causing an error and a retry or recovery operation which slows the system and hinders performance.

Some embodiments mirror data across a two (or more) drives that are physically across from one another in adjacent rows of disk drives. In some embodiments, the data is mirrored across a pair of (i.e., two) disk drives, wherein each write access writes the same data to the same (corresponding) addresses in each respective disk drive, and wherein each read access is sent to only one drive (either alternating between the two drives, or sent to the drive that is idle at the moment). By alternating or spreading the read accesses so a read is sent to only one disk drive of a set, the disk drives are less busy and more available to quickly access the requested data. In some embodiments, the mirrored pair are physically oriented to be perpendicular to one another, or at a non-parallel angle, in order to provide additional stiffness and vibration resistance.

Some embodiments stripe data across multiple disk drives in a row. In some embodiments, this is done in addition to mirroring as just described. In some embodiments, the system's address space is divided into a plurality of stripes, and each stripe is multiple sectors (e.g., using a plurality of adjacent logical block addresses) located on one disk drive, and successive stripes are located on different disk drives. For example, in some embodiments, each stripe is the same size (e.g., 32 sectors/16 KB, 64 sectors/32 KB, 128 sectors/64 KB, 256 sectors/128 KB, 512 sectors/256 KB, 1024 sectors/512 KB, 2048 sectors/1 MB, or other suitable sizes).

Some embodiments "fork" data across two or more drives. Forking data across disk drives is similar to striping data across drives, except that the minimum size of a data access (a read or write operation) by the system (e.g., one kilobyte, in some embodiments using two disk drives, or two KB in embodiments using four disk drives) is an integer multiple of the minimum size of a data access (a read or write operation) allowed by each drive (e.g., one-half kilobyte, in some embodiments). In some embodiments, every read access and every write access to a forked set of drives causes all drives of the forked set to perform the same access (i.e., since the same access is sent to the same address on each drive, all drives will start and end on the same track as the other drives. This reduces the number of independent arms, but increases the data transfer rate while keeping the seek and rotational latency the same. Further, if a pair of forked drives is physically oriented so that the rotational accelerations at least partially cancel because of the simultaneous seeks, this can reduce tracking errors and improve performance for some workloads. For example, in some embodiments, the even numbered sector addresses would be sent to one disk drive of a mechanically coupled pair, and the odd numbered sector addresses would be sent to the other disk drive of the pair. Data transfer times are thus substantially reduced, especially for long data lengths. By forking the data evenly across a pair of disk drives 120 such that half of every data block is on the clockwise rotation disk drive and the other half of the respective data blocks is on the counterclockwise rotation disk drive, every rotational acceleration seek operation to the first disk drive will be accompanied by an equal and opposite rotational acceleration seek operation to the second disk drive. By forcing these rotational accelerations to be simultaneous, some or all of the rotational acceleration will be counteracted or cancelled. In some embodiments, the rotational acceleration due to actuator seek operations is minimized by sending simultaneous seek commands to each drive of a coupled pair 430. This reduces error rates and increases system performance. Further, because two drives are providing the data, some aspects of data-transfer bandwidth can be doubled. In some embodiments, the axis of rotational mass 1440 of each disk drive 1120 within a coupled pair 1430 is aligned to be collinear (lying on or passing through the same straight line or having axes lying end to end along a straight line) with the axis of rotational mass of the other disk drive 120 of that coupled pair 1430. In some embodiments, one or more disk drives 1432 is not a member of a coupled pair. For example, if an odd number of operating drives is provided, or if one or more drives fails, it is sometimes not possible for all drives to be members of respective coupled pairs. In some embodiments, spare drives are provided in coupled pairs such that if one drive of one of the operating sets of coupled pairs fails, the spare pair can be substituted for the coupled pair having the failed drive. In some embodiments, at a later time, it may be desirable to use the now-single remaining operational drive of the swapped-out pair to be used in some capacity, (e.g., if all the spare pairs are used up, a single drive failure could cause swap of the now-single remaining operational drive for the newly failed drive). Other aspects of system 1400 are as described for FIG. 11, FIG. 12, and/or FIG. 13.

Figure 15:
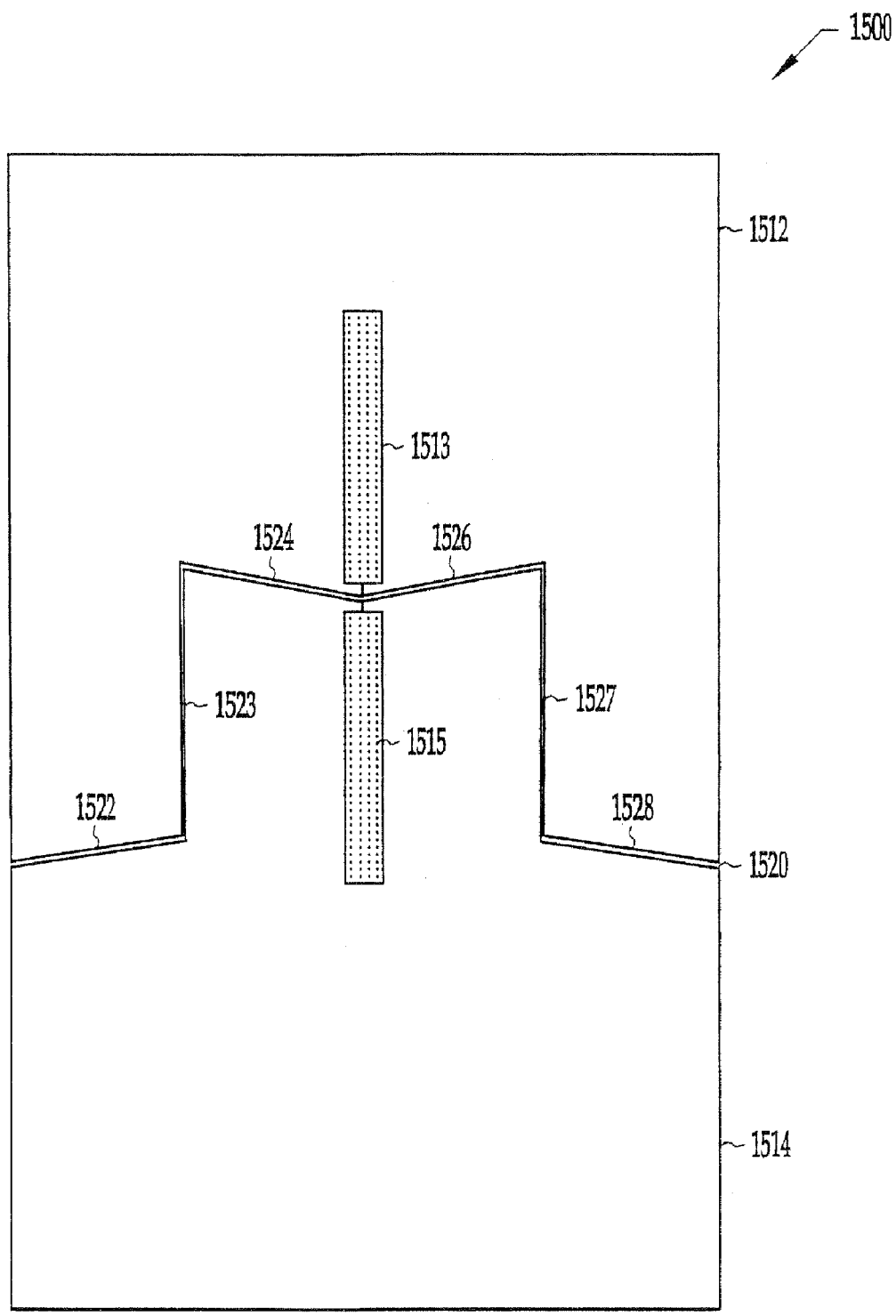
FIG. 15 is a plan-view block diagram of a connector circuit card pair 1500 used in some embodiments of the invention.

FIG. 15 is a plan view block diagram of a disk-drive-connector circuit card system 1500 used in some embodiments of the invention. In some embodiments, a rear circuit card 1512 has a relatively short center aspect such that its connector 1513 is closer to the top of circuit card system 1500 (as illustrated in FIG. 15) and circuit card 1514 has a relatively longer center aspect such that its connector 1515 is also closer to the top of circuit card system 1500 (as illustrated in FIG. 15). By having connector 1515 closer to the top of the circuit card system 1500, a shorter perpendicular connector card can be used to connect connectors 1515 and 1513 to the top of the circuit card system 1500 (in some embodiments, this is the back of the enclosure which includes the air outlet side of the enclosure). In some embodiments, gap 1520, between circuit card 1514 and circuit card 1512, matches the angle of the space between disk-drive connectors at its edges 1522, 1524, 1526, and 1528. Thus, gap 1528 is at an angle to the front of the enclosure that matches the angle of the disk drives in that respective row. Accordingly, the gap 1528 between circuit cards 1512 and 1514 falls midway between two neighboring disk-drive connectors. Thus the continuity of disk drive spacing within a row is not interrupted. This allows the connectors that are adjacent to these edges to be completely on either circuit card 1512 in the case of a connector on one side of gap 1520 or on circuit card 1514 in the case of the connector adjacent the other side of gap 1520. The pattern of gap 1520 further allows an at least approximately equal number of disk drives to be placed on circuit card 1512 as are placed on circuit card 1514 while still mounting connector 1515 closer to the top of circuit card system 1500. By splitting the connector circuit onto two cards, the longest dimension of each card is reduced, making manufacturing easier and less expensive, and increasing yields. In some embodiments, the length of circuit card system 1500 is approximately 32 inches (about 81.28 cm), and the width is about 17 inches (about 43.18 cm), however each of the cards 1512 and 1514 have a length and width each less than about 20 inches (50.8 cm) making fabrication easier and less costly than if longer dimensions are used.

In some embodiments, redundant power supplies are provided for each circuit-card portion. For example, in some embodiments, two DC-to-DC power supplies, either of which could alone supply sufficient power for about fifty disk drives, are provided and connected to one side of each circuit board 1512 and 1514 (e.g., the bottom side, in some embodiments), and about fifty disk-drive sockets are provided and connected to the opposite side of each circuit board 1512 and 1514 (e.g., the top side, in some embodiments). In some embodiments, DC-to-DC power supplies that use forty-eight volts input, and that supply one or more output voltage and current values, as required by the disk drives, are used. In other embodiments, three such DC-to-DC power supplies, any two of which could supply sufficient power for about fifty disk drives, are provided for each circuit-board portion 1512 and 1514. In still other embodiments, other power-supply configurations are used. High-reliability relays of the type used in automotive applications and having almost no internal voltage drop across the relay contacts (unlike solid-state relays which typically dissipate a not-insubstantial amount of power) are used, in some embodiments, to selectively connect the power supplies to the disk drives when desired or disconnect them if a failure is detected. In some embodiments, these relays are used to sequentially connect a few drives at a time upon power-up, in order to reduce the power surge due to spin-up of the disks.

Figure 16A:
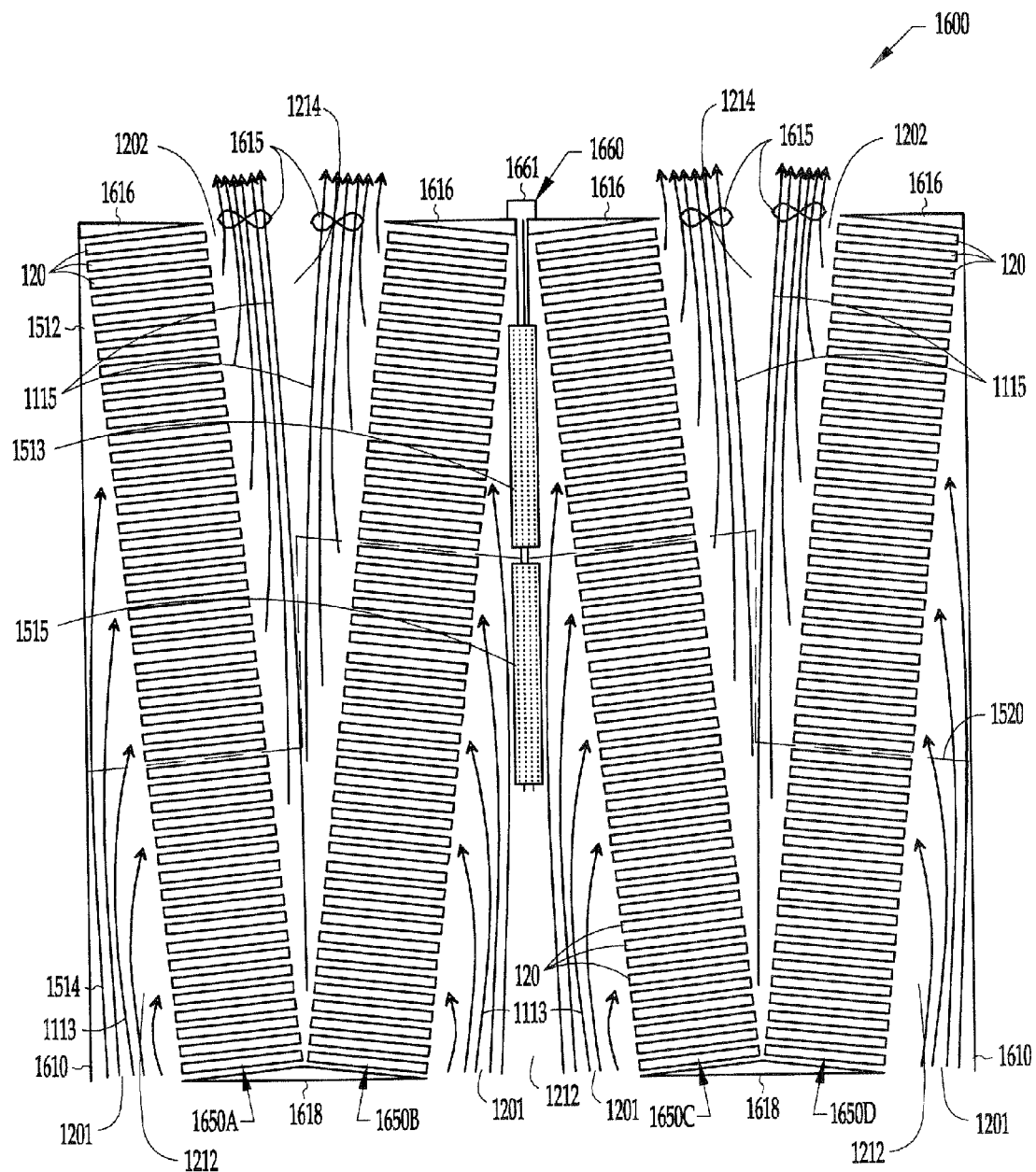
FIG. 16A is a plan-view block diagram of a data-storage system 1600 of some embodiments of the invention that provides a high density enclosure having four rows of disk drives.

FIG. 16A is a plan view block diagram of a data-storage system 1600 of some embodiments of the invention that provides a high-density enclosure having (in this exemplary embodiment) four rows of disk drives. In some embodiments, system 1600 is mounted (e.g., in a rack) with its major faces horizontal, the front side with air inlet ports 1201 being at the bottom of FIG. 16A, the back side with air outlet ports 1202 at the top of FIG. 16A, and with the left and right sides of enclosure 1610 being closed. Inlet air 1113 is guided toward the back or top of inlet manifold 1212, and a little of this air splits off between each pair of drives 120 to cool the disk drives, and the warmed outlet air 1115 collects in outlet manifold 1214 and is drawn by fans 1615 through and out outlet ports 1202. In some embodiments, the disk drives themselves act as heat-sink fins (e.g., of the enclosure as a whole, as well as for the electronic circuits on circuit boards 1512 and 1514 and the disk drives themselves), both directing air flow and conducting heat into the air flow passing though the spaces between the disk drives. Reference numbers in FIG. 16 that are not explicitly described here refer to elements discussed previously and shown in earlier Figures.

Each row 1650 has a plurality of drives (in some embodiments, up to fifty or more disk drives 120). Front wedges 1618 provide air passages in front of the front-most disk drives, and back wedges 1616 provide the same function for the rear-most disk drives, thus assuring that each and every disk drive receives the appropriate amount of air flow on both sides of every drive. In some embodiments, blank spacers are placed at socket positions that do not have disk drives in order that air flow is not disrupted by blank openings where disk drives are missing (air flow going through the path of least resistance).

In some embodiments, a centrally mounted personality board 1660 is plugged into socket or connector 1515 of the front circuit board 1514 and into socket or connector 1513 of the rear circuit board 1512.

Figure 16B:
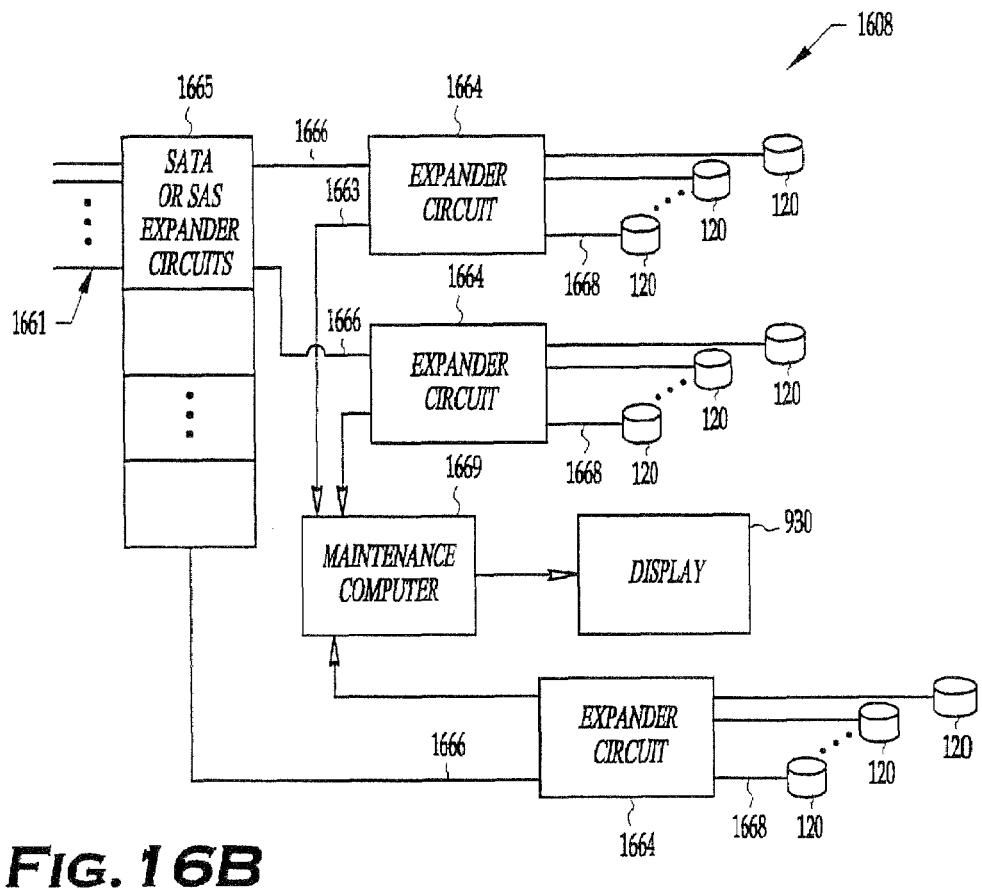
FIG. 16B is a functional block diagram of a circuit 1608 used in some embodiments of system 1600.

FIG. 16B is a functional block diagram of a circuit 1608 used in some embodiments of system 1600. In some embodiments, a plurality of M first-level fanout-fanin expander circuits 1664 are each connected to a plurality of disk drives 120 (e.g., each circuit provides N=six, eight, ten, twelve, or some other number of "downward busses" 1668 to a like number of disk drives) and each fanout-fanin expander circuit 1664 provides one or two intermediate "upward busses" including upward bus 1666 onto which is placed the consolidated data traffic to and from the N drives (e.g., a first upward bus onto which system data is sent or received, and a second upward bus that remains in the enclosure for status, data reconstruction, and display purposes). In some embodiments, the second upward bus 1663 from each of the first-level fanout-fanin circuits are fed directly, or through further fanout-fanin concentrator circuits that feed into, a status controller or maintenance computer 1669 in the enclosure, which tracks status of all the drives, and if a drive has failed or has been detected to be in a condition that indicates the drive is about to fail, the data from that drive is reconstructed (for example, the data is copied from a drive that mirrors the data on the failed drive) and placed on a spare drive, that from then on is used in place of the failed drive. In some embodiments, status controller 1669 also provides a driver to display various messages on display 930 as described for FIG. 9A, FIG. 9B, and FIG. 10.

In some embodiments, the first M upward busses 1666 are in turn consolidated through further fanout-fanin expander circuits 1665 to a fewer K number of upward externally-presented data busses 1661. In some embodiments, personality board 1660 includes electronic circuits that provide some or all of the circuitry for presenting upwardly a plurality of serial attached SCSI (SAS) busses (e.g., about ten to about twenty-five busses, in some embodiments, providing connectivity to about two-hundred disk drives), or alternatively, provide a plurality of serial ATA busses (e.g., about ten to about twenty-five busses, in some embodiments).

Figure 16C:
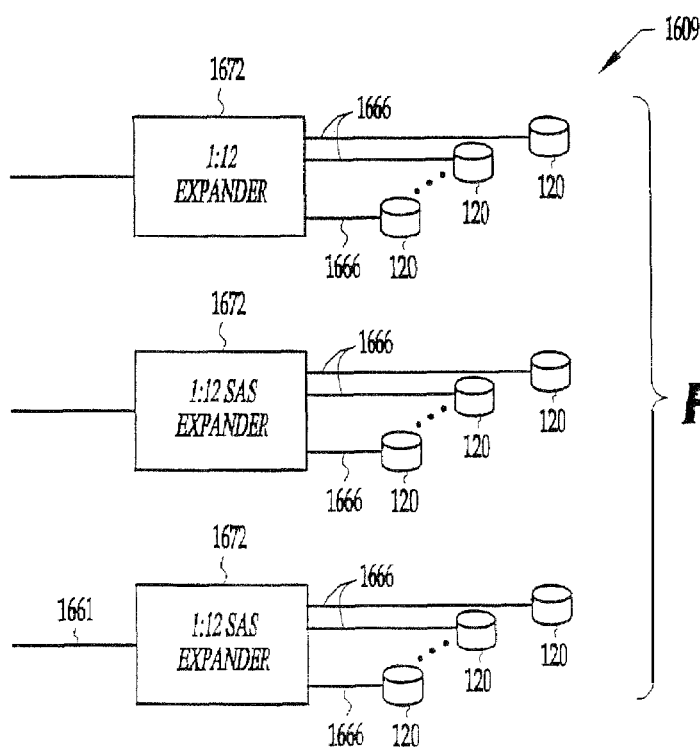
FIG. 16C is a functional block diagram of a circuit 1609 used in some embodiments of system 1600.

As shown in FIG. 16C, in some embodiments, each of these serial external busses 1661 is connected to its own electronic fanout-fanin circuit 1672 that connects either directly to a plurality of disk drives (e.g., one or two external busses on one side of the circuit and eight, ten, or twelve disk drives each connected to its bus 1666 on the other side of circuit 1672, in some embodiments), or connects to further levels of fanout-fanin circuitry as shown in FIG. 16B.

Referring again to FIG. 16A, in some embodiments, the split line (the demarcation) 1520 between the plurality of boards is made such that all connectors for disk drives 120 or connectors for personality board 1660 are completely on one board (e.g., 1512) or another (e.g., 1514). In some embodiments, a first plurality of on-board DC-to-DC power supplies (e.g., three power supplies, in some embodiments) is connected to board 1512 and selectively switched to provide redundant power to the plurality of disk drives that are connected to board 1512, and a second plurality of on-board DC-to-DC power supplies (e.g., three power supplies, in some embodiments) is connected to board 1514 and selectively switched to provide redundant power to the plurality of disk drives that are connected to board 1514. In some embodiments, a set of sequentially activated switches (e.g., solenoid-controlled relays) on each board are connected from the various power supplies to different subgroups of disk-drive connectors, in order to reduce the magnitude of surge current that is drawn by the disk drives as they spin-up.

Figure 17:
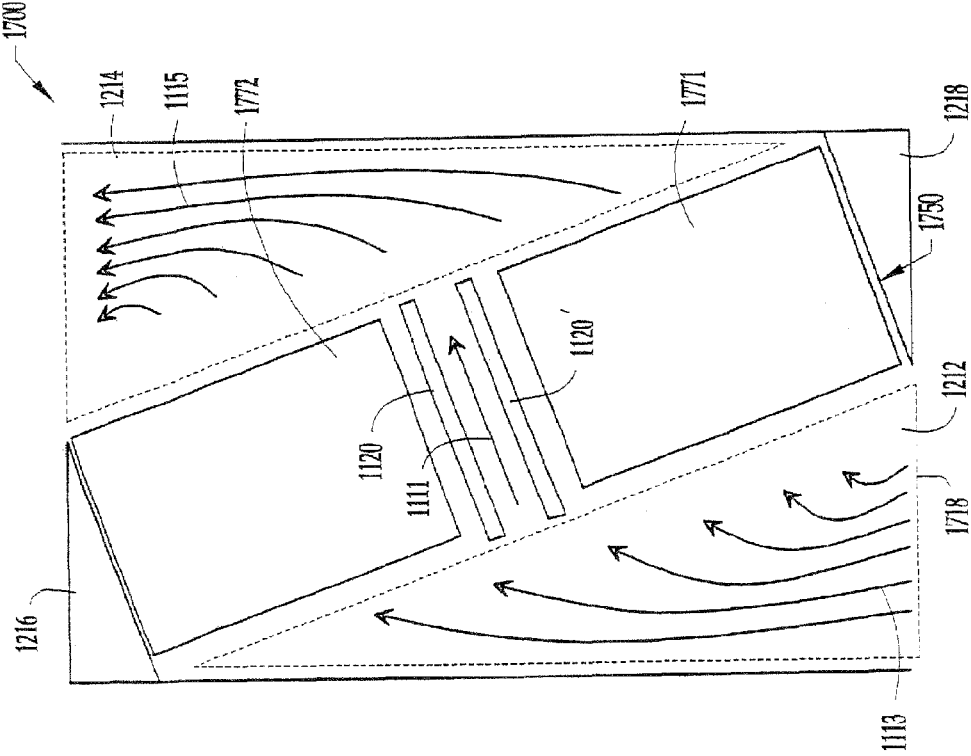
FIG. 17 is a plan-view block diagram of a data-storage system 1700 of some embodiments of the invention that provides a high density enclosure having one or more rows of disk drives accommodating a variable number of disk drives in each row.

FIG. 17 is a plan view block diagram of a data-storage system 1700 of some embodiments of the invention that provides a high density enclosure having one or more rows of disk drives accommodating a variable number of disk drives in each row. In some embodiments, one or more variable-width air-flow blocks (or spacers) 1771 and 1772 are provided to fill the space or spaces that are not currently occupied by disk drives. In the embodiment shown, two disk drives 120 and 1120' are initially provided, and variable-width air-flow blocks 1771 and 1772 (e.g., each including a stack of disk-drive-width spacers, equal in number to the missing disk drives) are provided to fill all the other disk-drive spaces. In other embodiments, the disk drives are inserted at the front or back end of the row, and a single spacer (e.g., 1771) is used. As additional drives are inserted into system 1700, the widths of air-flow blocks 1771 and/or 1772 are decreased. In this way, row 1650 is able to accommodate a variable number of disk drives and maintain appropriate air flow around all of those disk drives that are provided. Reference numbers in FIG. 17 that are not explicitly described here refer to elements discussed previously and shown in earlier Figures. In some embodiments, the shape of row 1750 is straight and oriented at a right angle to air inlet side 1718, similar to row 1150 as shown in FIG. 11. In some embodiments, the variable-width air blocks 1771 and 1772 are adjustable in different increments, to accommodate the varying spacings between disk drives from the front to the back of the row. In some embodiments, the shape of row 1750 is straight and oriented at an acute or diagonal angle to the air inlet side, similar to row 1250 as shown in FIG. 12. In some embodiments, the shape of row 1750 is curved and at an acute angle to air inlet side 1718, similar to row 1350 as shown in FIG. 13. In some embodiments, adjacent pairs of disk drives in row 1750 is staggered, similar to row 1450 as shown in FIG. 14, as well as being curved (e.g., as in FIG. 13) and/or at a diagonal angle (e.g., as in FIG. 12) and/or at a right angle (e.g., as in FIG. 11). In some embodiments, two or more such rows (either as shown or mirror image, or alternating as shown and mirror image—e.g., as in FIG. 16) are arranged side-by-side in a single enclosure.

In some embodiments, the number of functionally utilized disk drives is fewer than the number that could be placed in an enclosure (e.g., one-hundred-seventy-two of a possible one-hundred-ninety-two, in some embodiments (e.g., four rows of forty-eight drives per row)) and a variable number of spare drives are provided (e.g., up to twenty spare drives, in some embodiments), wherein the number of spare drives provided is variable and set by calculating the number needed to provide a given system lifetime to a given probability (e.g., ninety-eight percent probability of lasting three years without running out of spares, or 99.9 percent probability of lasting five years without running out of spares). Given a predicted failure-rate curve for the entire population of disk drives, the number of disk drives to be used functionally, and perhaps other parameters such as the expected temperature inside the enclosure over time), the number of spare drives needed is calculated. In other embodiments, the total number of drives is fixed (e.g., one-hundred-ninety-two disk drives), and the number of disk drives to be used functionally (and thus the total data capacity) is varied, such that the other drives provide sufficient spares for the expected lifetime of the enclosure.

In some embodiments, the enclosure is delivered to the customer with a stated total capacity (based on the number of disk drives to be used functionally, e.g., one-hundred-seventy-two), and with a given number of spare drives (e.g., twenty). Over time, individual ones of the functional disk drives will fail and be replaced using the spare drives. In some embodiments, the data on each drive is mirrored on a corresponding disk drive of an adjacent row, and the data space is striped over a row of drives. In some embodiments, if one drive of such a mirrored pair fails, its data is reconstructed to both drives of a spare pair of drives using data from the mirror drive of the failed drive, and the spare pair will thereafter be used in place of the pair with the one failed drive. For example, the above enclosure could be configured as eighty-six pairs of functional drives and ten pairs of spares (i.e., totaling one-hundred-ninety-two disk drives). During an initial "pair-of-drives-swap" phase, if either drive of a pair fails, a spare pair is loaded with recovered data from the remaining good drive, and that spare drive is swapped for the pair having one failed drive. Later, once all the paired spares have been used to replace pairs of disk drives (each pair having only a single drive that has failed and another drive that is still good), a second "single-drive swap" phase is used, wherein when a single-drive failure is detected, its recovered data is placed on the remaining single good drive of one of the pairs that was swapped out. In some embodiments, during the initial "pair-of-drives-swap" phase, the reduced rotational vibration (RAV) characteristic is maintained by swapping a pair of drives having reduced RAV (e.g., counter-rotating drives or drives at orientations, e.g., at right angles, that reduce RAV effects) for a pair having a failed drive, and during the later "single-drive swap" phase, the slight loss or reduction in RAV resistance is tolerated or compensated for by somewhat reduced performance.

Figure 18:
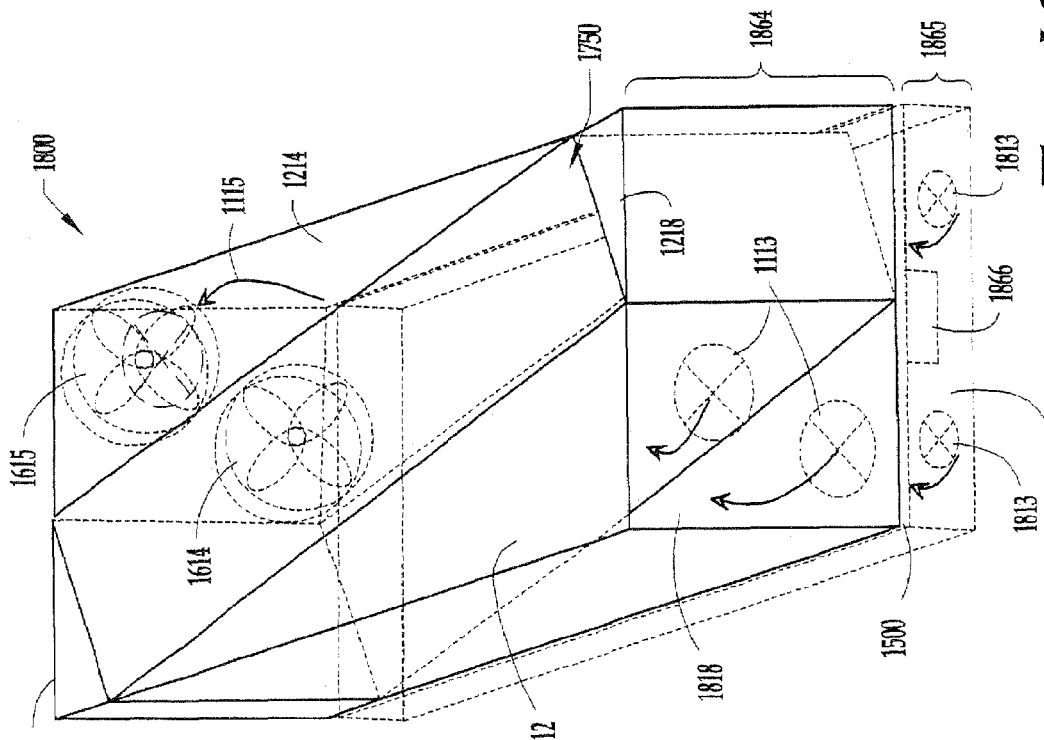
FIG. 18 is a perspective-view block diagram of a data-storage system 1800 of some embodiments of the invention that provides one or more rows of disk drives in an upper portion of the enclosure and one or more power supplies in an adjacent lower portion of the enclosure.

FIG. 18 is a perspective view block diagram of a data-storage system 1800 of some embodiments of the invention that provides one or more rows 1750 of disk drives 120 in an upper portion of the enclosure and one or more power supplies in an adjacent lower portion of the enclosure. In some embodiments, one or more rows 1750 of disk drives are connected to the top side of connector plate or circuit board 1500. In some embodiments, each disk drive is a 0.35-inch (9 mm) thick, 2.5-inch (6.35 cm) form-factor unit that is plugged into a corresponding socket (e.g., either parallel ATA (PATA), serial ATA (SATA) or serial SCSI (SSCSI)) that is soldered to the upper surface of connector board 1500. In some embodiments, one or more power supplies 1866 are connected to the lower surface of connector board 1500. Reference numbers in FIG. 18 that are not explicitly described here refer to elements discussed previously and shown in earlier Figures.

FIG. 19 is a cutaway side view of a data-storage system 1900 of some embodiments of the invention that provides a high density enclosure having one or more rows of disk drives. Reference numbers in FIG. 19 that are not explicitly described here refer to elements discussed previously and shown in earlier Figures. In some embodiments, a first face 1121 of each disk drive (e.g., 120 and 1120') is facing one direction (left in the figure) along the axis of row 1150 and the opposing second face 1122 is facing the opposite direction (right in the figure) along row 1150. For example, in some embodiments, for each disk drive, the first face 1121 includes a metal cover 1123 that covers the disks and actuator and opposite side (second face 1122) includes a printed circuit card 1124 that holds the electronics for the disk drive 120. Along one side (e.g., the side facing the viewer in FIG. 19) of disk-drive row 1150 is an air-inlet manifold that conveys inlet air 1113 to the closer edge of the disk-drives 120 in row 1150. Along one side (e.g., the side facing the viewer in FIG. 19) of disk-drive row 1150 is air-inlet manifold 1112 that conveys inlet air 1113 to one edge of the disk-drives 120 in row 1150. The bottom edge (as viewed in FIG. 19) of each disk drive 120 has a connector (e.g., two rows of pins) that connects to connector 1923 that is mounted to connector board 1500 (e.g., in some embodiments, connector 1923 is a socket configured to receive the pins of the disk-drive connector). In some embodiments, a resilient (e.g., elastomeric or visco-elastic) boot (or other shape that connects disk drive 120 to connector board 1500 and/or to connector 1923) 1972 provides a mechanical connection between each disk drive 120 and connector board 1500 that absorbs vibrations (such as from actuator-caused rotational acceleration or vibration) that otherwise would be transmitted from one disk drive 120 to another 1120'. In some embodiments, at the opposite side (e.g., the top of each drive in FIG. 19), an adhesively connected resilient (e.g., elastomeric or visco-elastic) disk-drive-cap material 1971 connects the side or edge opposite the connector edge of each disk drive 120 to top cover 1970 (e.g., a plate of sheet steel or aluminum or reinforced composite). Disk-drive-cap material 1971 provides mechanical support for each disk drive 120 by providing a double-sided adhesive structure that, together with connector 1923 and/or boot 1972, holds the disk drive in place. In some embodiments, disk-drive-cap material 1971 provides a vibration-dampening function (e.g., absorbing vibration energy and converting it to heat). In some embodiments, no screws, shuttles, or other mechanical structures are used to hold drives 120. This allows more moving air 1111 to contact and cool the disk drives 120, reduces weight of data-storage system 1900, and simplifies and reduces the cost of assembly. In some embodiments, one or more power supplies 1866 have pins 1867 that are soldered to through holes in connector board 1500 and power supplies 1866 are thus attached to the bottom side of board 1500 opposite the disk drives. In some embodiments, bottom cover 1979 (e.g., a plate of sheet steel or aluminum or reinforced composite) is placed in contact with a surface of power supply 1866 to provide a heat spreader/heat sink, and air passes around the lateral sides of power supply 1866.

FIG. 20A is an elevation view of a data-storage system 2000 of some embodiments of the invention that provides a high density enclosure having one or more rows of disk drives arranged in coupled pairs of counter-rotating disk drives. In some embodiments, data-storage system 2000 is similar to system 1900 of FIG. 19, except that at least some of the disk drives 120 are placed back-to-back (within a pair) and front-to-front between pairs. Further, in some embodiments, a perforated plate 2073 (e.g., a plate of sheet steel or aluminum or reinforced composite) is provided (in some embodiments, in place of the boots 1972 shown in FIG. 19, or, in other embodiments, in addition to boots 1972) such that an opening is provided for each of a plurality of disk drives 120, and a resilient (e.g., elastomeric or visco-elastic) material 2074 bridges at least some of the gaps between the disk drives 120 and plate 2073. In some embodiments, resilient material 2074 is much larger in height and width than is shown in FIG. 20A, and provides significant dampening of vibrations of drives 120. In some embodiments, the height of plate 2073 with respect to the connector edge of the disk drives is variable, in order to be able to select a position that best dampens vibrations. In some embodiments (for example, movable by screw adjustment to different distances from connector board 1500), the height of plate 2073 with respect to the connector edge of the disk drives is different for various drives in a single enclosure, in order to be able to select a configuration that best dampens vibrations. In some embodiments, a plurality of fans 1614 and 1615 (optionally in differing vertical positions) are provided to urge air flow through the enclosure, both around and/or in between (e.g., flow 1111) disk drives and around and/or between power supplies 1866. In the embodiment shown, fan 1614 provides both flows 1813 and flows 1111, while fan 1615 provides mainly flows 1111. In some embodiments, a plurality of other disk drives 120 are faced in alternating directions to the left and right of the disk drives 120 shown here, in order to help cancel or reduce rotational accelerations transmitted between disk drives 120.

In some embodiments, a large plurality of disk drives (e.g., in some embodiments, the number of drives equals 48, 50, 96, 100, 150, 172, 192, 200, or more disk drives, and four, six or more power supplies) are adhesively held in the enclosure of system 2000, with a sufficient number of spare drives (e.g., ten, 16, 20, or more spare disk drives) such that the enclosure can be placed in service with the expectation and probability that enough spares have been provided to allow the system to remain in service for the expected lifetime (e.g., three years or five years or other selected periods) without needing a field-service call.

FIG. 20B is an elevation view of a data-storage system 2001 of some embodiments of the invention that provides a high density enclosure having one or more rows of disk drives with an adjustable-height mid-drive vibration damper 2075. In some embodiments, mid-drive damper 2075 is made of or includes a visco-elastic material, elastomeric material, resilient material, or the like. In some embodiments, a metal grid such as grid 2073 of FIG. 20A is embedded in, placed under, or otherwise supports damper 2075. In some embodiments, at the opposite side from the electrical connector (e.g., the top of each drive in FIG. 20B), an adhesively connected resilient (e.g., elastomeric or visco-elastic) disk-drive-cap material 1971 connects the side or edge opposite the connector edge of each disk drive 120 to top cover 1970 (e.g., a plate of sheet steel or aluminum or reinforced composite or the like). Disk-drive-cap 1971 and mid-drive damper 2075 provide mechanical support for each disk drive 120 by providing adhesive structures that, together with connector 1923 (and/or boot 1976 shown in FIG. 20C), hold the disk drive in place. In some embodiments, disk-drive-cap 1971 and mid-drive damper 2075 provide a vibration-dampening function (e.g., absorbing vibration energy and converting it to heat). In some embodiments, disk-drive-cap 1971 is omitted, leaving the mid-drive damper 2075 to provide the support and vibration-absorption functions. In some embodiments, no screws, shuttles, or other mechanical structures are used to hold disk drives 120, but rather disk-drive-cap 1971 and mid-drive damper 2075 together with connector 1923 provide the only support and fastening for disk drives 120.

FIG. 20C is an elevation view of a data-storage system 2002 of some embodiments of the invention that provides a high density enclosure having one or more rows of disk drives with a cast-in-place vibration-damper boot 2076. In some embodiments, the disk drives 120 are inserted into their respective socket (or other electrical connector) 1923, and a liquid or flowable dampening material is poured, injected, or otherwise placed around the base of each disk drive 120, and solidified (e.g., by thermal, chemical, photonic, or other means) to form vibration-damper boot 2076. In some embodiments, one or more openings 2080 are provided in connector circuit board 1500 that allow the visco-elastic material to flow between board 1500 and power supply 1866 to provide additional dampening properties.

FIG. 20D is an elevation view of a data-storage system 2003 of some embodiments of the invention that provides a high density enclosure having one or more rows of disk drives with a cast-in-place mid-drive vibration damper 2077. In some embodiments, a mold 2078 (such as a sheet of stretchy plastic film having a slit or other suitable opening to fit over each disk drive 120) is placed over a plurality of the disk drives 120, and a liquid or flowable vibration dampening material is poured, injected, or otherwise placed onto mold 2078 around a selected mid-point 2081 each disk drive 120, and solidified (e.g., by thermal, chemical, photonic, or other means) to form mid-drive vibration-damper 2077. In some embodiments, the mid-point location 2081, at which mid-drive damper 2077 is placed, is not half-way between connector end 2082 and opposite end 2083 of each drive, but is at some height around each disk drive that is selected to improve vibration dampening. In some embodiments, the height is selected to be at approximately the center of rotational vibration mass of each disk drive 120. In some embodiments, mold 2078 is a stretchy tube that is placed around the disk drives 120 and which is filled with a material (such as a gas, liquid, or a material that solidifies) in order to stretch the tube into contact with drives 120. In some such embodiments, the tube is made of an adhesive-coated resilient (e.g., elastomeric or visco-elastic) plastic material.

In some embodiments, two or more of the vibration dampening structures such as boot damper 1972, cap damper 1971, mid-drive damper 2073 and 2074, mid-drive damper 2075, boot damper 2076, and/or mid-drive damper 2077 are used in a single enclosure to combine to provide improved dampening.

Figure 21:
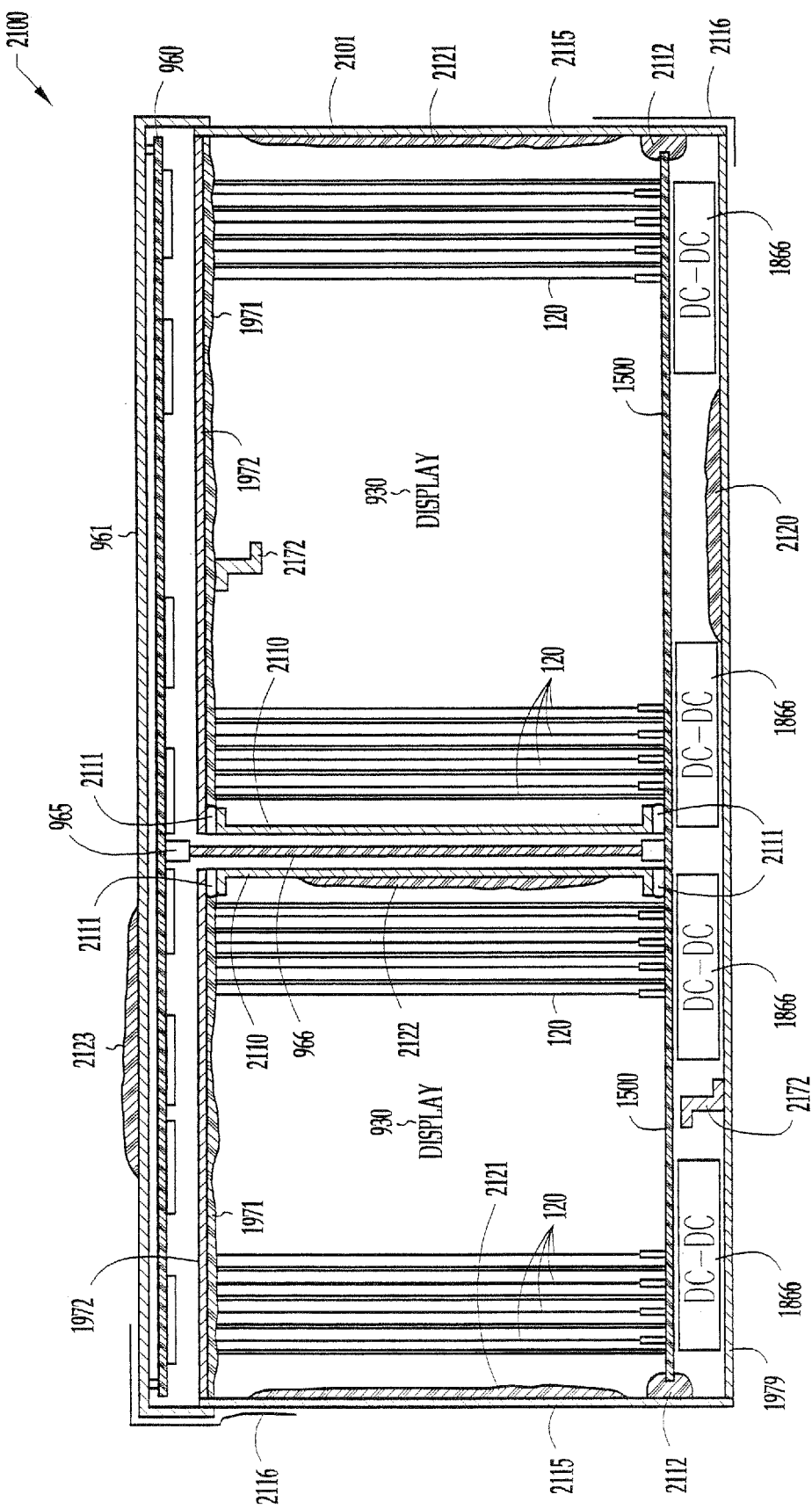
FIG. 21 is a front elevation view of a data-storage system 2100 of some embodiments of the invention that provides a high-density enclosure having one or more rows of disk drives with vertical beam stiffener 2110 and optional vibration damper 2122.

FIG. 21 is a front elevation view of a data-storage system 2100 of some embodiments of the invention that provides a high density enclosure having one or more rows of disk drives 120 with one or more vertical beam stiffeners 2110 and optional vibration damper 2122. System 2100 includes an enclosure 2101 having side walls 2115, bottom plate 1979 and top cover 961. In some embodiments, one or more side walls 2115 and/or covers 1979 and 961 are at least partially coated (e.g., on their inside surfaces) with a visco-elastic vibration-dampening sheet 2121, 2120 and 2123, respectively. In some embodiments, visco-elastic vibration-dampening sheet 2121, 2120 and 2123 are attached on the inside, and in other embodiments, they are on the outside. In some embodiments, one or more side walls 2115 and/or covers 1979 and 961 are at least partially coated (e.g., on their outside surfaces) with an ESD coating 2116 to dissipate static electric charge. In some embodiments, vertical beam stiffeners 2110 are attached to connector circuit board 1500 and/or drive cap plate 1972 using elastomeric or visco-elastic material 2111. In some embodiments, visco-elastic vibration-dampening sheet 2120 is also adhesively attached (e.g., across most or all of their bottom surfaces) to power supplies 1866. In some embodiments, connector circuit board 1500 is held in place using elastomeric or visco-elastic material 2112. In some embodiments, controller card 960 is attached (e.g., by a plug-and-socket 965) to center circuit board 966. In some embodiments, elastomeric or visco-elastic material 1971 is adhesively attached to the top of each disk drive 120 to hold it in place (rather than using metal or plastic shuttles or other holding devices. In some embodiments, a stiffening ridge 2172 is welded to or attached using elastomeric or viscoelastic adhesive material to cap plate 1972 and/or bottom plate 1979. In some embodiments (not shown) a similar stiffening ridge is added to top cover 961.

Read-Splitting

Read-splitting is an important and valuable technique for increasing the performance of disk arrays that use pairing. In some embodiments, data is "mirrored" to two or more drives (in a set of M drives, where M is two or greater, each data write from the system causes the same data to be replicated and written to each of the M drives). The data can be striped as well (for example, eight drives can be configured as mirror-four and stripe-two, such that each write operation is replicated four times, and if the block spans more than one drive, each of the four sets of data is striped across two drives; alternatively, the data could be mirrored-two and striped-four, where the data is replicated twice, and long pieces of data are striped across four drives).

In some embodiments, when reading, every Mth read operation goes to the first drive of a set, every $M+1^{st}$ read goes to the second drive, etc. This reduces the utilization of each drive, since only 1/M of the reads are directed to each drive. In other embodiments, each read operation is sent to all drives, and the first drive to return data has its data used, and the other drive's data is ignored or discarded. This increases the speed of retrieval, since the fastest drive provides the data.

Embodiment C1

Read-splitting Using Vibration-interaction Mapping (e.g., Wherein Physical Location of Drives Determines Which Drive is Used For a Particular Read Operation)

When data is read from a plurality of mirrored or striped/mirrored drives using read-splitting logic in the RAID controller or software, it can be highly unlikely that an I/O request to logical disk will cause simultaneous actuator movements among mirrored physical disk drives, and it is problematic to try to predict the direction and duration of these accelerations with respect to nearby disk drives. Rather, read-splitting and bus/loop arbitration logic among the disk drives makes it likely that these accelerations will be random with respect to other drives, and therefore also likely that RAV energy created by one disk of a mirrored set that is seeking will be transmitted to a nearby disk (the "subject" disk) that is in the process of transferring data to/from the media, making the subject disk particularly vulnerable to RAV.

In some embodiments, a coordinated logical to physical mapping of mirrored disk drives via RAID ensures that mirrored HDA's are oriented orthogonally (Embodiments B1, B2, and the like) to one another, while striped HDAs are oriented with alternating rotational directions (Embodiments A1, A2, and the like).

In some embodiments, a first data structure is kept (e.g., in the enclosure's controller-card memory) that maps the physical location (see Table 1B below) and/or drive-to-drive vulnerability (see Table 1A below) of each drive of each mirrored set, and a second data structure is kept that indicates the state (e.g., idle, seeking, reading, or writing, etc., and/or the actuator location or address of last data block accessed) of each drive. In some such embodiments, read splitting is used, wherein the determination of which drive of a mirrored set is selected to use for a given read-split read operation is based, at least in part, on the state of nearby drives that could be affected by sending a seek operation to a given drive. For example, if a read command is received by the enclosure's controller card that could be satisfied by sending the command to any one of a plurality of drives in a mirrored set, for each drive that can provide the requested data the controller examines the state (as specified by the second data structure) of the nearby or most vulnerable drives (as specified by the first data structure), and the controller then selects the drive that is least likely to cause an error in its neighboring drives.

In some embodiments, the content of the first data structure, for each drive in the enclosure, specifies which other drives are most vulnerable to an RAV error due to a seek operation, and optionally specifies the magnitude of vulnerability (the probability of an induced RAV error). In some embodiments, the content of the first data structure is determined, at least in part, by the physical location and/or orientation of each drive. In some embodiments, the content of the first data structure is determined, at least in part, by an empirical measurement, for each drive, of the drive-to-drive vulnerability as measured by establishing a read-tracking mode in a subject drive and then performing a seek operation of a given magnitude in the drive being tested. For example, when determining the neighboring-drive-vulnerability mapping of the first drive (the seek drive), one at a time each one of the neighboring drives (the victim drive) is forced into a state of read tracking, the first drive is then made to perform a seek operation, and it is determined whether the victim drive suffered a tracking error as a result of the seek. In some embodiments, this is repeated a number of time to ascertain the probability of a tracking error being caused. In some embodiments, a plurality of different seek amounts or magnitudes (e.g., small, medium, or large) is tried for each seek drive during the data structure generation, and the resulting tracking-error probabilities are determined for each of the other drives in the enclosure.

TABLE 1A

| Data Structure 1 Seek Drive | Large seek or large rotation acceleration vibration (RAV) | | | | | | | medium seek or RAV | | | | | small seek or RAV ... | | | |
|---|---|---|---|---|---|---|---|---|---|---|---|---|---|---|---|---|
| | Victim drive | error probability | Victim drive | error probability | Victim drive | error probability | ... | Victim drive | error probability | Victim drive | error probability | ... | Victim drive | error probability | ... | ... |
| 1 | 2 | .6 | 5 | .5 | 17 | .15 | ... | 2 | .4 | 5 | .1 | ... | 2 | .05 | ... | ... |
| 2 | 1 | .55 | 4 | .4 | 17 | .3 | ... | 1 | .3 | 4 | .2 | ... | 1 | .03 | ... | ... |
| 3 | 2 | .24 | 44 | .24 | 1 | .08 | ... | 2 | .14 | 4 | .14 | ... | 2 | .024 | ... | ... |
| ... | | | | | | | ... | | | | | ... | | | ... | ... |
| N | 147 | .1 | 145 | .09 | 12 | .07 | ... | 147 | .1 | 145 | .07 | ... | 147 | .02 | ... | ... |

In use, suppose a read-split read is received and can be serviced by either drive 1 or drive 3 (since the requested data is replicated/mirrored on these two drives). If all the drives in row 1 and row 3 of data structure 1 are idle, then the enclosure controller can send this read operation to whichever drive (1 or 3) would have the shortest seek or the least rotation acceleration, or a random choice or ping-pong (i.e., alternating successive reads between these two data sources) choice between drive 1 and 3 could be made. Suppose, however, that drive 5 is in a read-tracking state: the entries for drive 1 show that there is a non-negligible error probability (0.50) that a tracking error will occur if the specified seek (suppose a large seek for this example), while the entries for drive 3 do not indicate that an error is probable for drive 5 if a seek is performed on drive 3. Accordingly, the read-split read command will be directed to drive 3, since there is little or no likelihood that a tracking error would result. Note also that, in some embodiments, data structure 2 provides actuator-location information for each candidate drive, which when compared to the address of the incoming read-split read command, provides the indication of the size of the seek operation (i.e., the magnitude of the acceleration vibration that will be generated). In some embodiments, data structure 2 provides a parameter for each drive of the enclosure's relative flexibility or stiffness at that drive's location (and/or the node-antinode parameter that indicates how close to or far from a standing-wave-resonance node that drive is positioned). In some embodiments, this stiffness and/or node parameter is an input into the formula used to determine the size of the seek or rotational acceleration vibration that is used as an input to Table 1A (i.e., if a drive is positioned at a stiff location or near a resonance node, a seek that would cause a "Large" RAV on another drive might cause only a medium or small RAV for this drive).

TABLE 2

| Data Structure 2 Drive | Drive state | Actuator location or sector last accessed | Enclosure relative flexibility or stiffness at drive location, or node-antinode |
|---|---|---|---|
| 1 | Idle | track 3047 | 5 |
| 2 | Idle | track 1540 | 8 |
| 3 | Seek | track 10 | 1 |
| 4 | write tracking | track 30205 | 7 |
| 5 | read tracking | track 1540 | 6 |
| . . . | | | |
| N | Idle | track 4222 | 2 |

Cabinet Design

One problem addressed by this present invention is created when rotational vibration (movement that revolves around the axis of the actuator motor), usually from another drive, rotates the drive relative to the actuator, and thus pulls the head off the track it is reading from or writing to. With drives that are mounted vertically, one problem is that RAV that raises or lowers one corner 119 of the drive 120, and/or lowers or raises the opposite corner 121 in the other direction.

One aspect of some embodiments of the present invention includes positioning and orienting each drive to achieve a desired flow pattern and volume of cooling air through the enclosure. Another aspect of some embodiments of the invention includes positioning drives in the enclosure with a spacing, orientation, and/or location so as to reduce or minimize drive-to-drive RAV induced tracking (or other) errors. Another aspect of some embodiments of the invention includes timing and/or synchronizing access commands that

TABLE 1B

| Data Structure 1 Seek Drive | Victim drive | drive-drive spacing, orientation | Victim drive | drive-drive spacing, orientation | Victim drive | drive-drive spacing, orientation | . . . |
|---|---|---|---|---|---|---|---|
| 1 | 2 | 6.0 cm, parallel | 5 | 5.0 cm, 60 degrees | 17 | 1.5 cm, in-line | . . . |
| 2 | 1 | 6.0 cm. parallel | 4 | 4.0 cm, parallel | 17 | 3.0 cm, parallel | . . . |
| 3 | 2 | 2.4 cm, orthogonal | 44 | 2.4 cm, 20 degrees | 1 | 0.8 cm, orthogonal | . . . |
| . . . | | | | | | | . . . |
| N | 147 | 1 cm, facing | 145 | 19 cm, 25 degrees | 12 | 17 cm, parallel | . . . |

Rather than or in addition to Table 1A that tracks the drive-drive vulnerability to errors, in some embodiments, a data structure such as Table 1B is kept that stores the distance and/or relative orientation and/or node-antinode positioning and/or relative stiffness between a plurality of pairs of drives. Table 1B is used in a manner similar to the use of Table 1A, in that an incoming read-split read operation is received by the enclosure controller, which then makes a choice between the possible source drives for the requested data based on the distance, orientation, node-antinode positioning, and/or relative stiffness between the selected drive and other drives that are in a state that makes them vulnerable to RAV-induced tracking errors.

are sent to the drives in the enclosure so as to reduce or minimize drive-to-drive RAV induced tracking (or other) errors.

In some embodiments, the disk drives are electrically connected to a connector on the disk-drive-connector circuit board 1500, but are held in place in the enclosure primarily using a visco-elastic material that contacts each disk drive at one or only a few locations to ensure that the disk drive remains connected to the connector, are allowed to move slightly within the constraints of the visco-elastic holder, have their vibrations dampened by the visco-elastic holder, and still have a substantial surface area exposed to the air flow through the cabinet to cool the drives. By eliminating the metal or plastic shuttle and/or screws that are typically used to hold a disk drive in place, a substantial weight reduction is achieved.

In some embodiments, because of the large number of operational disk drives, and the large number of spare disk drives that can be swapped in if there is a failure detected, the drives can be sealed in place, for example, by adhering every disk drive to the visco-elastic holder, and adhering the visco-elastic holder to the enclosure. The large number of operational and spare drives also allows meaningful statistical analysis of the failure rate and a determination of where the unit is in the life cycle of the enclosure. A typical expected life of the enclosure can be tailored by adjusting the number of spare drives, for example, yielding a unit having a three-year expected lifetime with more usable operational data storage space (e.g., using fewer spare drives, e.g., perhaps ten initial spare drives and one-hundred-ninety operational drives), or yielding a unit having a five-year expected lifetime with less usable operational data storage space (e.g., using more spare drives, e.g., perhaps twenty-five initial spare drives and one-hundred-seventy-five operational drives).

Controller Design

Another aspect of some embodiments of the invention includes mirroring or replicating data on a plurality of drives (which improves reliability and/or performance) so that each read command can be directed to one or more drives in order to shorten access time (if the same command is sent to two or more drives, the one that returns the data fastest is used, which improves performance), reduce the average drive utilization (the command is sent to fewer than all the drives that have the data, so that the other drives remain available to perform other operations, which can also improve performance). In some embodiments, one of a plurality of drives containing the data is selected based at least in part on whether nearby or vulnerable drives would suffer errors as a result (e.g., based on such parameters as what state each of the other drives is in (e.g., read-tracking, seeking, or idle), the relative probability that a seek in a selected drive will cause an error in another drive, the distance between drives, the relative orientation, stiffness, node-antinode positions, etc.).

Another aspect of some embodiments of the invention includes sending substantially simultaneous and substantially the same size seek commands to counter-rotating drives that are positioned relative to one another so that the rotational accelerations cancel, at least to some extent. The term "counter-rotating drives" means a set of drives configured such that for every drive that receives a given seek command that causes a given rotational acceleration around an axis, there is another drive positioned such that the same seek command will cause substantially the same rotational around substantially the same axis but in the opposite rotational direction (thus canceling some or all of the RAV seen by other drives). Such a set of drives can have any even number of drives in the set (2, 4, 6, etc.). Data can be mirrored and/or striped across the set of drives in order to have many or all of the commands sent to the set of counter-rotating drives provide the RAV-canceling function.

Striping Using Two or More Disk Drives to Send Opposing Rotational Accelerations; and/or Counter-rotating Pairs; Each Drive in a Pair Physically Facing the Other In some embodiments, a plurality of the drives are placed in opposite-facing pairs (either front-to-front, or back-to-back). The system stripes all writes and reads so 1/N (half the data if mirrored pairs of drives are used; N=2) of the data goes to each clockwise drive and 1/N (or half) of the data is sent to each counterclockwise drive (in a pair, both drives move their respective actuators the same direction and amount, either both "clockwise" or both "counterclockwise" for a given access relative to their own top cover, but since they are face-to-face, simultaneous clockwise accelerations are in opposite directions relative to an outside frame of reference). The system-level sectors are N times (e.g., twice if N=2) as big as drive sectors. In some embodiments, all seek accesses that move the actuator are sent simultaneously to the CW and CCW drive of a pair so the rotational moments cancel within the pair. In some embodiments, the timing of the seek operations is synchronized to better cancel the rotational acceleration. The pair is mounted rigidly or semi-rigidly to one another, but held with elastomer or visco-elastic to the case so the rotational changes cancel within the pair and do not transfer to the case. In some embodiments, the "simultaneous" pairs of seeks do not occur at the same time, but both seek portions take place while the other drive is preparing to do its seek or has just finished its seek acceleration, but has not started to do the read or write portion. Thus, both seek portions take place during a first portion of the operation when the other drive is not trying to stay on track but is still settling to its desired track, and the data-access portions both take place in a second portion of the operation when the other drive is not seeking. During the first portion, both drives are in a less-vulnerable state and can tolerate more RAV. During the second phase, both drives are in the more-vulnerable read or write mode where they must stay on track to avoid losing performance or data, and neither is generating RAV to disturb the other.

FIG. 4A, for example, shows a pair of disk drives 120 and 120' plugged into connectors on bottom membrane 150.

In Some Embodiments, Avoid In-Line Or L-Type Orthogonal Positioning; Use T-Type Orthogonal Positioning Drives are most sensitive to rotational-acceleration vibration (RAV) moves. To correct for this, in some embodiments, the corner of one drive is placed at the rotational "center" of next drive. Some embodiments use a T-orientation. In some embodiments, drives are placed in pairs as described above, and each pair is placed at an angle (e.g., a T-type right angle) to an adjacent pair.

Orthogonal or Staggered Positioning—Herringbone But With Rotational Moments of Inertia of One Drive (i.e., the Corner) Positioned at the Actuator Center or Rotational Center-of-Mass of Adjacent Drive What starts as rotational torque around the $Z_R$-direction can be made to be X- or Y-movement to drives that are at right angles, and even to drives that are at other intersecting angles. For example, positioning a first corner of a first drive next to the center of rotational mass of an adjacent second drive means that rotational torque that moves the first corner downward is downward movement at the center of rotational mass of the second drive, and thus will move the entire second drive down rather than rotating it. Further, the angled orientation (intersecting planes of the disk drives) provides additional stiffening of the enclosure, particularly in embodiments where the bottom edge of each drive is held to the connector circuit board 1500 and the top edge is adhesively held, for example, to a visco-elastic sheet that is adhesively held to a top plate (e.g., a sheet-metal enclosure cover). This arrangement also allows a large amount of the total exterior surface of each drive to be exposed to the flow of cooling air, and for the disk drives themselves to serve as air vanes and/or heat-sink fins to direct the flow of the cooling air flow.

Add Walls and/or I-beams as Stiffeners Parallel to Major Face of Drives-perpendicular to Dotted Lines That Connect Adjacent Corners of Drives Some embodiments add walls 2110 and/or ridges 2172 at right-angles to the bottom and/or top enclosure surface (which act as vibrational membranes). These stiffeners reduce vibration transferred between drives. Stiffener walls can be added across what would otherwise be antinodes, discussed below. In some embodiments, visco-elastic dampening materials 1971, 2120, 2121, and/or 2123 are applied to walls 2121, or enclosure surfaces 961, 1979, and/or 1972 to dampen vibrations and reduce noise.

Use the Array-controller Card as I-beam Stiffener Down Center of Case, Between Rows of Drives In some embodiments, center controller card 966 (e.g., the card that receives commands from other units and passes the appropriate commands to the drives, buffers data, and/or does RAID generation and correction of data) can act as an alternative or additional stiffener to the walls discussed above.

Include a Visco-elastic Dampener to Attach Face of Controller PC Board to Face of Steel or Fiberglass I-beam A visco-elastic adhesive or other such material attached across a wall face acts to dampen vibrations in that wall. In some embodiments, visco-elastic material with one or more adhesive faces is adhered to such walls and other enclosure covers, and/or is used to connect walls to bottoms, covers, and intermediate structures to stop transmission of vibrations from one structure to another. In some embodiments, visco-elastic material is adhered to circuit boards as well.

Include a Visco-elastic Dampener to Attach One or More I-beams to Top and/or Bottom Covers A visco-elastic adhesive attached between walls at right angles to one another (e.g., to connect them to each other) acts to dampen vibrations that would otherwise transfer between those walls.

Place Drives at Node (Lesser-vibrating) Positions of the Standing-wave Pattern of the Bottom Membrane of the Diskdrive Array Enclosure Conventional multi-drive disk storage subsystems place all the disk drives adjacent an outer surface, typically each one with one of its two smallest faces pointing outward along the front panel of the enclosure, with the opposite small face, having the connectors, plugged into an outward-facing connector socket. This is needed in order to have access to drives in case they need to be serviced or replaced in the field (e.g., by hot-unplugging the failed drive and hot-plugging the new replacement drive in its place).

In contrast, some embodiments of the present invention include a much-larger number of physically small drives mounted in their enclosure in a manner intended not to be replaced in the field, and with a sufficient number of spare drives that can be logically swapped in place to the number of drives that could be expected to fail during the service life of the system. The operating drives are known as "fail-in-place" drives, since if and when they fail, the failed drive is left physically in place in the enclosure, and one of the spare drives is logically connected in its place and loaded with reconstructed data of the failed drive.

Two-dimensional surfaces (membranes) have vibrational-resonance patterns that are affected by the constrained edges (such as the outer edges of the bottom surface of the multi-drive enclosure disk storage system)

Some embodiments place drives in a pattern in the enclosure that matches more closely the non-vibrational node locations of the "membrane" surfaces (e.g., the bottom cover and/or wiring grid) to which they are attached. On a membrane, standing waves form a two-dimensional pattern, in which the constrained edges and other locations within the membrane have little or no standing-wave vibration, and other antinode locations have much vibration. The node/antinode locations are affected by the size, shape, and thickness of the membrane, as well as the other masses (e.g., disk drives and controller cards) and stiffeners (e.g., right-angle walls and/or I-beams). In some embodiments, these node and antinode locations are determined empirically by placing the drives on the surface, measuring the vibrational susceptibility and/or the node/antinode pattern (i.e., whether drives in a particular location suffer seek errors, or the magnitude of vibration at each drive as determined by, e.g., vibrational holography, in which a photosensitive film is exposed to the interference pattern between a reference beam, and another beam that is split from the reference beam and illuminates the membrane surface while it is being acoustically stimulated to form standing waves, as is well known in the art), then iteratively moving one drive slightly from its initial position and re-measuring until that drive reaches a point of minimum vibration; then iteratively repeating the process for neighboring drives until each drive is at a point on the membrane that is less or minimally RAV vulnerable (i.e., susceptible to read or write errors from received rotational acceleration vibration of other drives), and/or minimally RAV dangerous (i.e., capable of causing rotational acceleration vibration that is transmitted to other drives).

FIG. 4A is a perspective drawing that illustrates a hard-disk-drive (HDD) or disk drive 120 mounted in a vertical orientation into connector 126 integrated on a substrate printed circuit board (PCB) 150. The HDD 120 has a side A 190, a side B 492, an edge C 194, an edge D 196, and a connector 116 on the bottom edge. The HDD 120 has drive electronic circuit board 150 attached to side B 492. Internal to the HDD 120 is a set of one or more disks 115, and an actuator assembly 112. The actuator assembly 112 contains an R/W head 114. The actuator assembly 112 pivots around an axis of rotation 111 to perform seek operations.

When the actuator assembly 112 accelerates in one direction 191 or another to perform a seek operation, there is a corresponding counter rotation force or torque 192 in the HDD 120, as a whole, producing a rotational vibration. Since the mass of the HDD 120 is many times greater than mass of the actuator assembly 112, the magnitude of the rotation of HDD 120 produced is much smaller than the magnitude of the actuator assembly rotation. This acceleration-induced torque 192 rotating the HDD 120 produces rotational-acceleration vibration which is transferred to surrounding supporting structures such as the connector 126 and substrate 120. The characteristic "click, click, click" that can sometimes be heard during actuator seek operations is due partly to the rotational-acceleration vibration of the HDD 120. Rotational-acceleration vibration generated by drive 120 can cause vibration in neighboring drive 120' through supporting structures. Rotational-acceleration vibration is generally more problematic for closer neighboring drives than those further away. The rotational-acceleration vibration interaction between hard-disk drives (HDDs) can cause actuator assembly seek or tracking problems in close-neighboring drives. The present invention orients each of the drives in an enclosure to reduce or minimize drive-to-drive coupling of rotational vibration.

In some embodiments, the invention provides an apparatus that includes a substrate, and a plurality of disk drives each coupled electrically and mechanically to the substrate, the plurality of disk drives including at least a first and a second disk drive, wherein the first disk drive is positioned relative to the second disk drive so that a rotational force produced by the first disk drive is at least partially counteracted by a rotational force produced by the second disk drive.

In other embodiments, the apparatus can further comprise an enclosure, wherein the substrate and the plurality of disk drives are attached to the enclosure, at least one memory, and an information processing unit operatively coupled to the disk drives and to the memory, wherein the information processing unit sends read commands to the disk drives and receives data from the disk drives and from the memory.

The apparatus can optionally include an information processing unit that includes a multi-processor supercomputer. In some embodiments, the apparatus includes a plurality of substantially similar enclosures, wherein each enclosure holds a substrate and plurality of disk drives including at least a first disk drive and a second disk drive positioned such that a rotational force produced by the first disk drive is conveyed primarily as a translational force to the second disk drive, and wherein the plurality of enclosures are operatively coupled to the supercomputer.

In some embodiments, the apparatus further comprises a memory and a video-streaming apparatus operatively coupled to receive data from the memory, wherein the video-streaming apparatus is adapted to transmit digital video to a plurality of destinations and users. In some other embodiments, the plurality of disk drives includes more than two first disk drives in a first rotating orientation and fewer than about one-hundred-and-one first disk drives, and a substantially equal number of second disk drives in a second counter rotating orientation, wherein a plurality of the first and a plurality of the second disk drives are interleaved in coupled pairs. In some embodiments, the plurality of disk drives includes more than about one-hundred first disk drives and fewer than about two-hundred-and-one first disk drives, and a substantially equal number of second disk drives, wherein a plurality of the first and a plurality of the second disk drives are interleaved in coupled pairs, each pair including one disk drive in a rotating orientation, and another disk drive in a counter rotating orientation.

In some embodiments of the invention, at least some of the plurality of disk drives are each in contact with a boot unit. In some embodiments, the boot unit includes one or more resilient materials. In other embodiments, the boot unit has graded shock absorbance characteristics. In still other embodiments, the boot unit includes a vibration damping polymer. A boot unit can include a visco-elastic material. In some embodiments of the invention, a first edge of each one of the plurality of disk drives are adhesively connected to its boot unit. In other embodiments, a first edge of each one of the plurality of disk drives is bonded to its boot unit.

In some embodiments, an apparatus of the invention can further include a detent device that is adapted to be placed in disengageable contact with each one of the plurality of disk drives at an edge distal from the drive's first edge. In some embodiments, the detent device is wedge shaped at a first end and adapted to be inserted against each of a plurality of drives for transport and disengaged for disk operation. In other embodiments, the detent device includes a cam mechanism adapted to be engaged for transport and disengaged for disk operation.

In some embodiments of the invention, the first disk drive has a disk rotational torque vector due to its rotating disk(s) that is substantially antiparallel to a disk rotational torque vector of the second disk drive that is due to its rotating disk(s). In some embodiments, the disk rotational torque vector of the first disk drive is substantially collinear with the disk rotational torque vector of the second disk drive. In other embodiments, the disk rotational torque vector of the first disk drive is radially offset from the disk rotational torque vector of the second disk drive. In still other embodiments, the actuator rotational torque vector due to actuator arm rotation in the first disk drive is substantially collinear with the actuator rotational torque vector of the second disk drive.

In some embodiments, a first major face of each of the first and second disk drive each have a first heat-conduction characteristic and the second opposing major face of the first and second disk drive have a second heat-conduction characteristic that is different from the first heat-conduction characteristic. In some embodiments, the first major faces of the first and second disk drives each are substantially metallic. In other embodiments, the first major faces of the first and second disk drives are each portions of a respective metal cover that covers the respective disk drive's disk(s) and actuator arm. In still other embodiments, the second major faces of the first and second disk drives each are substantially non-metallic. In some embodiments, the second major faces of the first and second disk drives each include a printed circuit board. In some embodiments, the second major faces of the first and second disk drives each are substantially plastic, such as a fiberglass-reinforced epoxy circuit board.

In other embodiments, the first disk drive and the second disk drive are coupled to the substrate with the first major face of the first disk drive facing with a partial offset the first major face of the second disk drive. In still other embodiments, the first disk drive and the second disk drive are coupled to the substrate with the first major face of the first disk drive facing with no offset the first major face of the second disk drive. In some embodiments, the first and second disk drive form a first coupled pair, further including a second coupled pair having a third and fourth disk drive with a first major face of the third disk drive facing with no offset a first major face of the fourth disk drive, and a second major face of the second disk drive facing with partial offset a second major face of the third disk drive.

In some embodiments, the apparatus can further include a controller that receives a disk access request specifying a data length of 2 L and based on the request sends substantially simultaneous disk access requests to the first and second disk drive each specifying a data length of L. In some embodiments, the substantially simultaneous disk access request sent to the first and second disk drives cause seek operations having rotational forces that at least partially cancel each other.

In some embodiments of the invention, the plurality of disk drives are formed into coupled pairs having substantially opposite rotational torque within each pair. In other embodiments, a first edge of each coupled pair is coupled to the substrate and an opposing second edge is coupled to an elastomeric material.

In some embodiments, an apparatus can further comprise a stabilizer member having an elastomeric material in contact with at least some of the plurality of the disk drives between the first edge and the second edge of the respective disk drives. In some embodiments, the stabilizer member is a plate member having an elastomeric material in contact with at least some of the plurality of the disk drives between the first edge and the second edge of the respective disk drives. In some embodiments, the plate member is substantially parallel to the first and second edge and includes a plate having perforations that encircle each disk drive. In other embodiments, the plate member further includes an elastomeric material bridging a gap between an edge of a perforation in the plate member and the disk drive encircled by the perforation.

In some embodiments, the plurality of first disk drives and second disk drives are oriented as alternately facing coupled pairs. In other embodiments, for each one of a plurality of disk drives, the first major face of the respective drive is spaced closer to its nearest neighbor's first major face as compared to the spacing of the respective drive's second major face to its nearest neighbor's second major face, the second major faces having lower heat conductivity than the first major faces. In some embodiments, for each one of a plurality of disk drives, the first major face of the respective drive is spaced further from its nearest neighbor's first major face as compared to the spacing of the respective drive's second major face to its nearest neighbor's second major face, the second major faces having lower heat conductivity than the first major faces.

In some embodiments, the plurality of first and second disk drives are each coupled electrically and mechanically to the substrate in a row that conforms to a line, wherein the first disk drives and the second disk drives are facing in alternate directions positioned within the row. In some embodiments, the row includes two or more disk drives and fewer than two-hundred-and-one disk drives. In other embodiments, each of the first disk drives have a first major face and a second opposing major face and wherein each of the second disk drives have a first major face and a second opposing major face, and wherein the first major face of each first disk drive faces the first major face of an adjoining second disk drive, and the second major face of each first disk drive faces the second major face of an adjoining second disk drive. In some embodiments, the row conforms to a substantially linear line. In some embodiments, the row conforms to a substantially stepped curved line. In other embodiments, the stepped curved line curves in a substantially exponential manner. In still other embodiments, the row conforms to a substantially smooth curved line. In some embodiments, the substantially smooth curved line curves in a substantially exponential manner. In some embodiments, the apparatus includes one or more additional rows of disk drives. In some embodiments, the rows are positioned on the substrate with substantially mirror image orientation relative to a neighboring row.

In some embodiments, the apparatus further includes elastomeric material that is attached to the disk drives at a position on each of the disk drives that is opposite the position on the disk drives proximal to the substrate.

In some embodiments, the apparatus further includes an enclosure. In some embodiments, the substrate is oriented parallel to a first major surface of the enclosure. In some embodiments, the enclosure of the apparatus includes at least one air inlet and at least one air outlet. In some embodiments, the apparatus further includes at least one manifold that directs airflow over the disk drives. In some embodiments, the apparatus further includes an air-movement-causing device. In some embodiments, the air-movement device includes one or more fans. In other embodiments, the air-movement device includes one or more pairs of fans that rotate in opposite directions. In some embodiments, the enclosure of the apparatus includes a cover. In other embodiments, the cover includes a resilient material. In some embodiments, a resilient material is attached to a second edge of each one of a plurality of the disk drives. In some embodiments, the cover of the apparatus includes at least one stiffening rib. In some embodiments, a resilient material is attached to the cover. In some embodiments, the apparatus further includes a shipping-overshock display. In other embodiments, the apparatus further includes a mother board, a personality board, or any combination thereof.

The invention provides a method that includes mounting a plurality of drives in an enclosure, the enclosure including a connector substrate, the plurality of drives including at least a first disk drive and a second disk drive that are each electrically and mechanically coupled to the enclosure, and mechanically coupling the first drive and the second drive such that rotational force produced by the first disk drive is at least partially counteracted by rotational force produced by the second disk drive. In some embodiments, the rotational force produced by the second disk drive is opposite the rotational force produced by the first disk drive.

The method can include operatively coupling an information processing unit to the enclosure, and adding a memory to the enclosure, wherein the information processing unit is operatively coupled to the disk drives and to the memory, wherein the information processing unit sends read commands to the disk drives and the receives data from the disk drives and memory. In some embodiments, a multi-processor supercomputer is used as the information processing unit. In some embodiments, a plurality of substantially similar enclosures are operatively coupled to the supercomputer, wherein each enclosure holds a substrate and plurality of disk drives including at least a first disk drive and a second disk drive positioned such that a rotational force produced by the first disk drive is conveyed primarily as a translational force to the second disk drive, and wherein the plurality of enclosures are operatively coupled.

In some embodiments, the method includes storing data from the disk drives into a memory, and streaming video information from the enclosure, wherein the streaming video information includes receiving information from the memory and transmitting digital video to a plurality of destinations and users.

In some embodiments, the method includes causing a seek operation that results in a rotational force produced by the first disk drive. In some embodiments, the method includes positioning the plurality of disk drives such that a number of the first disk drives, the number being greater than two and fewer than about one-hundred-and-one, are in a first rotating orientation, and a substantially equal number of second disk drives are in a second counter-rotating orientation, wherein a plurality of the first disk drives and a plurality of the second disk drives are interleaved in mechanically coupled pairs. In some embodiments, the method includes positioning the plurality of disk drives such that a number of the first disk drives, which is greater than about one-hundred and fewer than about two-hundred-and-one, are in a first rotating orientation, and a substantially equal number of second disk drives are in a second counter-rotating orientation, wherein a plurality of the first disk drives and a plurality of the second disk drives are interleaved in mechanically coupled pairs, each pair including one disk drive in a rotating orientation, and another disk drive in a counter-rotating orientation.

In some embodiments, the method includes damping relative motion between at least some of the plurality of disk drives and the substrate. In some embodiments, the damping includes absorbing vibration energy in one or more resilient materials. In some embodiments, the damping includes absorbing vibration energy in one or more resilient materials that include graded shock absorbance characteristics. In some embodiments, the damping includes absorbing vibration energy in one or more resilient materials that include a vibration damping polymer. In some embodiments, the damping includes absorbing vibration energy in one or more resilient materials that include a visco-elastic material.

In some embodiments, the method includes positioning at least some of the plurality of disk drives in contact with one or more boot units. In some embodiments, the method includes providing one or more resilient materials for each one of the plurality of boot units. In some embodiments, the method includes providing one or more resilient materials for each of a plurality of boot units that include graded shock absorbance characteristics. In some embodiments, the method includes providing one or more resilient materials for each of a plurality of boot units that include a vibration damping polymer.

In some embodiments, the method further includes providing one or more resilient materials for each of a plurality of boot units that include a visco-elastic material. In some embodiments, the method includes adhesively connecting a first edge of each one of the plurality of disk drives to its boot unit. In some embodiments, the method includes bonding a first edge of each one of the plurality of disk drives to its boot unit.

In some embodiments, the method includes placing a detent device in disengageable contact with each one of the plurality of disk drives at an edge distal from a first edge of each one of the disk drives. In some embodiments, the method further includes sliding the detent device, that is wedge shaped at a first end and adapted to be inserted, until it rests against each of a plurality of drives for transport and is disengaged for disk operation. In some embodiments, the method includes camming (rotating a linear element having one or more cams for each disk drive) the detent device that is adapted to be engaged for transport and disengaged for disk operation.

In some embodiments, the method includes positioning the first disk drive so that its disk rotational torque vector due to its rotating disk(s) is substantially antiparallel to a disk rotational torque vector of the second disk drive that is due to its rotating disk(s). In some embodiments, the method includes positioning the first and second disk drive such that the disk rotational torque vector of the first disk drive is substantially collinear with the disk rotational torque vector of the second disk drive. In some embodiments, the method includes positioning the first and second disk drive such that the disk rotational torque vector of the first disk drive is radially offset from the disk rotational torque vector of the second disk drive. In some embodiments, the method includes positioning the first and second disk drive such that the actuator rotational torque vector due to actuator arm rotation in the first disk drive is substantially collinear with the actuator rotational torque vector of the second disk drive. In some embodiments, the method includes positioning the first and second disk drive such that the first major face of both the first and second disk drive each have a first heat-conduction characteristic and the second opposing major face of the first and second disk drive have a second heat-conduction characteristic that is different from the first heat-conduction characteristic. In some embodiments, the first major faces of the first and second disk drives each are substantially metallic. In some embodiments, the method includes positioning the first major faces of the first and second disk drives such that they face each other, wherein the first major faces of the first and second disk drives are each portions of a respective metal cover that covers at least a portion of the respective disk drive's disk(s) and actuator arm. In some embodiments, the method includes positioning the second major faces of the first and second disk drives such that they face each other, wherein the second major faces of the first and second disk drives are each substantially non-metallic. In some embodiments, the method includes positioning the second major faces of the first and second disk drives such that they face each other, wherein the second major faces of the first and second disk drives each include a printed circuit board. In some embodiments, the method includes positioning the second major faces of the first and second disk drives such that they face each other, wherein the second major faces of the first and second disk drives are each substantially plastic.

In some embodiments, the method includes coupling the first disk drive and the second disk drive to the substrate with the first major face of the first disk drive facing with a partial offset the first major face of the second disk drive. In some embodiments, the method includes coupling the first disk drive and the second disk drive to the substrate with the first major face of the first disk drive facing with no offset the first major face of the second disk drive. In some embodiments, the method includes forming a first coupled pair that includes the first and second disk drive, and forming a second coupled pair having a third and fourth disk drive with a first major face of the third disk drive facing with no offset a first major face of the fourth disk drive, and a second major face of the second disk drive facing with partial offset a second major face of the third disk drive.

In some embodiments, the method includes installing a controller that receives a disk access request specifying a data length of 2 L and based on the request sends substantially simultaneous disk access requests to the first and second disk drive each specifying a data length of L. In some embodiments, the substantially simultaneous disk access request sent to the first and second disk drives cause seek operations having rotational forces that at least partially cancel each other.

In some embodiments, the method includes forming the plurality of disk drives into coupled pairs having substantially opposite rotational torque within each pair. In some embodiments, the method includes coupling a first edge of each coupled pair to the substrate and coupling an opposing second edge to an elastomeric material. In some embodiments, the method includes stabilizing at least some of the plurality of disk drives with a stabilizing member having an elastomeric material in contact with the disk drives between the first edge and the second edge of the respective disk drives. In some embodiments, the stabilizer member is a plate member having an elastomeric material in contact with at least some of the plurality of the disk drives between the first edge and the second edge of the respective disk drives. In some embodiments, the plate member is substantially parallel to the first edge of the disk drives and includes a plate having perforations that encircle each disk drive. In some embodiments, the plate member further includes an elastomeric material bridging a gap between an edge of a perforation in the plate member and the disk drive encircled by the perforation.

In some embodiments, the method includes orienting the plurality of first disk drives and second disk drives as alternately facing coupled pairs. In some embodiments, for each one of a plurality of disk drives, a first major face of a respective drive is spaced closer to its nearest neighbor's first major face as compared to the spacing of the respective drive's second major face to its nearest neighbor's second major face, the second major faces having lower heat conductivity than the first major faces. In some embodiments, for each one of a plurality of disk drives, a first major face of a respective drive is spaced further from its nearest neighbor's first major face as compared to the spacing of the respective drive's second major face to its nearest neighbor's second major face, the second major faces having lower heat conductivity than the first major faces.

In some embodiments, the method includes coupling each of the plurality of first and second disk drives electrically and mechanically to the substrate in a row that conforms to a line, wherein the first disk drives and the second disk drives are alternately positioned within the row as neighboring disk drives. In some embodiments, the row includes two or more disk drives and fewer than about two-hundred-and-one disk drives. In some embodiments, each of the first disk drives have a first major face and a second opposing major face and wherein each of the second disk drives have a first major face and a second opposing major face, and wherein the first major face of each first disk drive faces the first major face of an adjoining second disk drive, and the second major face of each first disk drive faces the second major face of an adjoining second disk drive. In some embodiments, the method includes conforming the row to a substantially linear line. In some embodiments, the method includes conforming the row to a substantially stepped curved line. In some embodiments, the method includes conforming the stepped curved line so that it follows a substantially exponential curve. In some embodiments, the method includes conforming the row to a substantially smooth curved line. In some embodiments, the method includes conforming the substantially smooth curved line so that it curves in a substantially exponential manner. In some embodiments, the method includes positioning the first and second disk drives with a spacing between adjacent drives, wherein the spacing between the neighboring disk drives follows a substantially exponential function. In some embodiments, the method includes adding one or more additional rows of disk drives. In some embodiments, the method includes positioning the rows on the substrate with substantially mirror image orientation relative to an adjoining row.

In some embodiments, the method includes elastomerically coupling the disk drives at an edge of each disk drive that is opposite the substrate. In some embodiments, the method includes enclosing the substrate and the disk drives. In some embodiments, the substrate is oriented so that it is substantially parallel to a first major surface of the enclosure. In some embodiments, the method includes providing at least one air inlet along a first surface of the enclosure and at least one air outlet along a second surface of the enclosure. In some embodiments, the method includes adding at least one manifold that directs airflow over the disk drives. In some embodiments, the method includes flowing air through the at least one manifold and between the disk drives. In some embodiments, the method includes adding at least one air-movement device to the enclosure. In some embodiments, the method includes adding one or more pairs of fans that are coupled to have opposite rotational direction. In some embodiments, the method includes providing a cover for the enclosure. In some embodiments, the method includes attaching a resilient material to the cover and to a second edge of each one of a plurality of the disk drives. In some embodiments, the method includes attaching stiffening ribs to the cover. In some embodiments, the method includes adding a shipping-overshock display. In some embodiments, the method includes adding a mother board, a personality board, or any combination thereof.

In some embodiments, the invention provides an apparatus that includes an enclosure that includes a substrate, a means in the enclosure for mounting a plurality of disk drives to the enclosure, and a means for coupling a plurality of disk drives electrically and mechanically to the substrate, the plurality of disk drives including at least a first and a second disk drive, and wherein the first disk drive is positioned relative to the second disk drive so that a rotational force produced by the first disk drive is at least partially counteracted by a rotational force produced by the second disk drive.

In some embodiments, the invention provides an apparatus that includes a substrate, and a plurality of disk drives each coupled electrically and mechanically to the substrate, the plurality of disk drives including at least a first disk drive and a second disk drive, wherein the first and second disk drive each have a first major face surrounded by a first, second, third and fourth edge and having a first, second, third and fourth corner, wherein the first disk drive and the second disk drive are positioned such that a rotational force produced by the first disk drive is conveyed primarily as a translational force to the second disk drive. In some embodiments, the apparatus includes an enclosure, wherein the substrate and the plurality of disk drives are attached to the enclosure, at least one memory, and an information processing unit operatively coupled to the disk drives and to the memory, wherein the information processing unit sends read commands to the disk drives and receives data from the disk drives and from the memory. In some embodiments, the information processing unit includes a multi-processor supercomputer.

In some embodiments, the apparatus includes a plurality of substantially similar enclosures, wherein each enclosure holds a substrate and plurality of disk drives including at least a first disk drive and a second disk drive positioned such that a rotational force produced by the first disk drive is conveyed primarily as a translational force to the second disk drive, and wherein the plurality of enclosures are operatively coupled to the supercomputer.

In some embodiments, the apparatus includes a memory, and a video-streaming apparatus operatively coupled to receive data from the memory, wherein the video-streaming apparatus is adapted to transmit digital video to a plurality of destinations and users.

In some embodiments, the apparatus includes an enclosure to which the substrate is connected that encloses the substrate and the plurality of disk drives.

In some embodiments of the apparatus, the first edge of each of the first and second disk drives includes a substantially neutral position, relative to rotational force, located along the first edge between the first corner and the second corner. In some embodiments, the first disk drive and the second disk drive are positioned relative to each other so that the neutral position of the first disk drive is at a position along the first edge of the first disk drive that is closest to the first corner of the second disk drive. In some embodiments, the first disk drive and the second disk drive are positioned with their first major faces substantially perpendicular to each other. In some embodiments, the first disk drive and the second disk drive are positioned with their first major faces at an acute angle. In some embodiments, the first disk drive and the second disk drive are positioned with their first major faces substantially parallel to each other. In some embodiments, the first disk drive and the second disk drive are positioned with their first major faces laterally offset from each other.

In some embodiments, the apparatus includes an air-deflection vane positioned to direct additional air between the first disk drive and the second disk drive.

In some embodiments of the apparatus, the first disk drive and the second disk drive are positioned such that a rotational force produced by the second disk drive is at least partially conveyed as a translational force to the first disk drive. In some embodiments, the first disk drive and the second disk drive are positioned such that the rotational force produced by the second disk drive is conveyed primarily as a translational force to the first disk drive. In some embodiments, the first disk drive and the second disk drive are positioned such that the rotational force produced by the first disk drive is conveyed only as a translational force to the second disk drive. In some embodiments, the first disk drive and the second disk drive are positioned such that the rotational force produced by the second disk drive is conveyed only as a translational force to the first disk drive.

In some embodiments of the apparatus, the first disk drive has a disk rotational torque vector due to its rotating disk(s) that is substantially antiparallel to a disk rotational torque vector of the second disk drive that is due to its rotating disk(s). In some embodiments, the first disk drive and the second disk drive are positioned with their first major faces laterally offset from each other.

In some embodiments of the apparatus, the first disk drive has a disk rotational torque vector due to its rotating disk(s) that is substantially coparallel (i.e., that is collinear or parallel) to a disk rotational torque vector of the second disk drive that is due to its rotating disk(s). In some embodiments, the first disk drive and the second disk drive are positioned with their first major faces laterally offset from each other.

In some embodiments, the apparatus includes a resilient boot unit coupled between the first edge of each of the plurality of drives and the substrate. In some embodiments, the resilient boot unit includes a visco-elastic polymer material. In some embodiments, the resilient boot unit includes an elastomeric polymer material. In some embodiments, the apparatus includes one or more resilient materials between at least some of the plurality of disk drives and the substrate. In some embodiments, the resilient material has graded shock absorbance characteristics. In some embodiments, the resilient material includes a visco-elastic material. In some embodiments, the resilient material includes a vibration damping polymer.

In some embodiments, the apparatus includes a cover plate, and a resilient cap coupled between the second edge of each of the plurality of drives and the cover plate, wherein the second edge is on an opposite side of the first major face from the first edge. In some embodiments, the resilient cap includes a visco-elastic polymer material. In some embodiments, the resilient cap includes an elastomeric polymer material. In some embodiments, the resilient cap is adhesively coupled to the second edge of at least some of the plurality of disk drives. In some embodiments, the resilient boot unit is adhesively coupled to the first edge of at least some of the plurality of disk drives.

In some embodiments of the apparatus, the enclosure includes at least one air-inlet manifold and at least one air-outlet manifold, wherein air substantially passes from the inlet manifold between the first disk drive and second disk drive to the outlet manifold. In some embodiments, the apparatus includes at least one manifold that directs airflow over the disk drives. In some embodiments, the apparatus includes an air-movement device. In some embodiments, the air-movement device includes one or more fans. In some embodiments, the air-movement device includes at least one pair of fans that are mechanically coupled and have opposite rotation directions.

The invention provides a method that includes mounting a plurality of disk drives in an enclosure, the plurality of disk drives including at least a first disk drive and a second disk drive that are each electrically and mechanically coupled to the enclosure, and mechanically coupling the first disk drive and the second disk drive such that rotational force produced by the first disk drive is at least partially transmitted as translational force to the second disk drive. In some embodiments, the method includes operatively coupling an information processing unit to the enclosure, and adding a memory to the enclosure, wherein the information processing unit is operatively coupled to the disk drives and to the memory, and wherein the information processing unit sends read commands to the disk drives and receives data from the disk drives and memory. In some embodiments, the method includes utilizing a multi-processor supercomputer as the information processing unit. In some embodiments, the method includes operatively coupling a plurality of substantially similar enclosures to the supercomputer, wherein each enclosure holds a substrate and plurality of disk drives including at least a first disk drive and a second disk drive positioned such that a rotational force produced by the first disk drive is conveyed primarily as a translational force to the second disk drive, and wherein the plurality of enclosures are operatively coupled. In some embodiments, the method includes operatively coupling a memory to the enclosure, and operatively coupling a video-streaming apparatus to the enclosure, wherein the video-streaming apparatus receives data from the memory and is adapted to transmit digital video to a plurality of destinations and users.

In some embodiments, the method includes performing a seek function with the first disk drive, wherein a rotational force is produced.

In some embodiments, the method includes positioning the first disk drive and the second disk drive relative to each other so that a neutral position of the first disk drive is positioned along a first edge of the first disk drive that is closest to a first corner of the second disk drive. In some embodiments, the method includes positioning the first disk drive and the second disk drive with their first major faces substantially perpendicular to each other. In some embodiments, the method includes positioning the first disk drive and the second disk drive with their first major faces at an acute angle to each other. In some embodiments, the method includes positioning the first disk drive and the second disk drive with their first major faces substantially parallel to each other. In some embodiments, the method includes positioning the first disk drive and the second disk drive with their first major faces laterally offset from each other.

In some embodiments, the method includes positioning an air-deflection vane to direct additional air between the first disk drive and the second disk drive.

In some embodiments, the method includes positioning the first disk drive and the second disk drive such that a rotational force produced by the second disk drive is at least partially conveyed as a translational force to the first disk drive. In some embodiments, the method includes positioning the first disk drive and the second disk drive such that the rotational force produced by the second disk drive is substantially conveyed as a translational force to the first disk drive. In some embodiments, the method includes positioning the first disk drive and the second disk drive such that the rotational force produced by the first disk drive is conveyed only as a translational force to the second disk drive. In some embodiments, the method includes positioning the first disk drive and the second disk drive such that the rotational force produced by the second disk drive is conveyed only as a translational force to the first disk drive. In some embodiments, the method includes positioning the first disk drive so that a disk rotational torque vector due to its rotating disk(s) is substantially antiparallel to a disk rotational torque vector of the second disk drive that is due to its rotating disk(s). In some embodiments, the method of claim 5, further including positioning the first disk drive and the second disk drive with their first major faces laterally offset from each other.

In some embodiments, the method includes positioning the first disk drive so that a disk rotational torque vector due to its rotating disk(s) is substantially coparallel to a disk rotational torque vector of the second disk drive that is due to its rotating disk(s). In some embodiments, the method includes positioning the first disk drive and the second disk drive with their first major faces laterally offset from each other. In some embodiments, the method includes damping relative motion between at least some of the plurality of disk drives and the substrate. In some embodiments, the method includes using one or more resilient materials to dampen vibration energy. In some embodiments, the method includes using one or more resilient materials having graded shock absorbance characteristics. In some embodiments, the method includes using one or more resilient materials that include a vibration damping polymer. In some embodiments, the method includes using one or more resilient materials that include a visco-elastic material. In some embodiments, the method includes coupling a resilient boot unit between the first edge of each of the plurality of drives and the substrate. In some embodiments, the method includes using a resilient boot unit that includes a visco-elastic polymer material. In some embodiments, the method includes using a resilient boot unit that includes an elastomeric polymer material.

In some embodiments, the method includes adding a cover plate, and coupling a resilient cap between the second edge of each of the plurality of drives and the cover plate. In some embodiments, the method includes using a resilient cap that includes a visco-elastic polymer material. In some embodiments, the method includes using a resilient cap that includes an elastomeric polymer material. In some embodiments, the method includes adhesively coupling the resilient cap to the second edge of at least some of the plurality of disk drives. In some embodiments, the method includes adhesively coupling the resilient boot unit to the first edge of at least some of the plurality of disk drives.

The invention provides an apparatus that includes a substrate, and a means for mounting a plurality of disk drives to the substrate, and a means for coupling a plurality of disk drives electrically and mechanically to the substrate, the plurality of disk drives including at least a first disk drive and a second disk drive, wherein the first and second disk drive each have a first major face surrounded by a first, second, third and fourth edge and having a first, second, third and fourth corner, wherein the first disk drive and the second disk drive are positioned such that a rotational force produced by the first disk drive is conveyed primarily as a translational force to the second disk drive.

The invention provides an apparatus that includes a substrate, and a plurality of disk-drive connectors each coupled electrically and mechanically to the substrate, the plurality of disk-drive connectors including at least a first and a second disk-drive connector, wherein the first disk-drive connector is positioned relative to the second disk-drive connector so that a rotational force produced by a first disk drive that is connected to the first disk-drive connector is at least partially counteracted by a rotational force produced by a second disk drive that is connected to the second disk-drive connector. In some embodiments, the apparatus includes an enclosure, wherein the substrate and the plurality of disk-drive connectors are attached to the enclosure, at least one memory, and an information processing unit operatively coupled to the disk-drive connectors and to the memory, wherein the information processing unit sends read commands to disk drives that are connected to the disk-drive connectors and receives data from the disk drives and from the memory. In some embodiments, the information processing unit includes a multi-processor supercomputer. In some embodiments, the apparatus includes a plurality of substantially similar enclosures, wherein each enclosure holds a substrate and plurality of disk-drive connectors including at least a first disk-drive connector and a second disk-drive connector positioned such that a rotational force produced by a first disk drive that is connected to the first disk-drive connector is conveyed primarily as a translational force to a second disk drive that is connected to the second disk-drive connector, and wherein the plurality of enclosures are operatively coupled to the supercomputer. In some embodiments, the apparatus includes a memory, and a video-streaming apparatus operatively coupled to receive data from the memory, wherein the video-streaming apparatus is adapted to transmit digital video to a plurality of destinations and users.

In some embodiments of the apparatus, the plurality of disk-drive connectors includes more than two first disk-drive connectors in a first rotating orientation and fewer than about one-hundred-and-one first disk-drive connectors, and a substantially equal number of second disk-drive connectors in a second counter rotating orientation, wherein a plurality of the first and a plurality of the second disk-drive connectors are interleaved in coupled pairs. In some embodiments, the plurality of disk-drive connectors includes more than about one-hundred first disk-drive connectors and fewer than about two-hundred-and-one first disk-drive connectors, and a substantially equal number of second disk-drive connectors, wherein a plurality of the first and a plurality of the second disk-drive connectors are interleaved in coupled pairs so that first disk drives connected to the first disk-drive connectors each rotate in one orientation and the second disk drives connected to the second disk-drive connectors rotate in a counter orientation. In some embodiments of the apparatus, at least some of the plurality of disk-drive connectors are each in contact with a boot unit. In some embodiments, the boot unit includes one or more resilient materials. In some embodiments, the boot unit has graded shock absorbance characteristics. In some embodiments, the boot unit includes a vibration damping polymer. In some embodiments, the boot unit includes a visco-elastic material. In some embodiments of the apparatus, at least a portion of each one of the plurality of disk-drive connectors is adhesively connected to its boot unit. In some embodiments, of the apparatus, at least a portion of each one of the plurality of disk-drive connectors is bonded to its boot unit.

In some embodiments, the apparatus includes a detent device adapted to be placed in disengageable contact with each one of a plurality of disk drives that are connected to each one of the disk-drive connectors, wherein the detent device contacts the disk drive at an edge distal from the disk drive's first edge. In some embodiments, the detent device is wedge shaped at a first end and adapted to be inserted against each of a plurality of disk drives that are inserted into the disk-drive connectors, wherein the detent device can be used for transport and disengaged for disk drive operation. In some embodiments, the detent device includes a cam mechanism adapted to be engaged for transport and disengaged for operation of disk drives that are connected to each of the disk-drive connectors.

In some embodiments of the apparatus, the first disk-drive connector is positioned so that a first disk drive that is connected to the first disk-drive connector has a disk rotational torque vector due to its rotating disk(s) that is substantially antiparallel to a disk rotational torque vector that is due to a rotating disk(s) of a second disk drive that is connected to the second disk-drive connector. In some embodiments of the apparatus, the disk rotational torque vector of the first disk drive that is connected to the first disk-drive connector is substantially collinear with the disk rotational torque vector of the second disk drive that is connected to the second disk-drive connector. In some embodiments of the apparatus, the disk rotational torque vector of the first disk drive that is mounted in the first disk-drive connector is radially offset from the disk rotational torque vector of the second disk drive that is connected to the second disk-drive connector. In some embodiments of the apparatus, the actuator rotational torque vector due to actuator arm rotation in a first disk drive that is mounted in the first disk-drive connector is substantially collinear with the actuator rotational torque vector of a second disk drive that is connected to the second disk-drive connector. In some embodiments of the apparatus, the first disk-drive connector and the second disk-drive connector are coupled to the substrate so that a first disk drive connected to the first disk-drive connector is oriented with a first major face of the first disk drive facing with a partial offset a first major face of a second disk drive that is mounted in the second disk-drive connector. In some embodiments, the first disk-drive connector and the second disk-drive connector are coupled to the substrate so that a first disk drive connected to the first disk-drive connector is oriented with a first major face of the first disk drive facing with no offset a first major face of a second disk drive that is mounted in the second disk-drive connector. In some embodiments, the first and second disk-drive connectors form a first coupled pair, further comprising a second coupled pair having a third and fourth disk-drive connector, wherein the disk-drive connectors are positioned so that a first major face of a third disk drive connected to the third disk-drive connector faces with no offset a first major face of a fourth disk drive that is connected to the fourth disk-drive connector, and a second major face of a second disk drive that is connected to the second disk-drive connector faces with partial offset a second major face of the third disk drive that is connected to the third disk-drive connector.

In some embodiments, the apparatus includes a controller that receives a disk access request specifying a data length of 2 L and based on the request sends substantially simultaneous disk access requests to a first and second disk drive that each specify a data length of L, wherein the first and second disk drive are each connected to a first and second disk-drive connector. In some embodiments, the substantially simultaneous disk access request sent to the first and second disk drives cause seek operations having rotational forces that at least partially cancel each other.

In some embodiments of the apparatus, the plurality of disk-drive connectors are formed into coupled pairs so that disk drives connected to the disk-drive connectors have substantially opposite rotational torque within each pair. In some embodiments, a portion of each coupled pair of disk-drive connectors is coupled to the substrate and a portion of each disk-drive connector is coupled to an elastomeric material.

In some embodiments, the apparatus includes a stabilizer member having an elastomeric material in contact with at least a portion of the disk-drive connectors. In some embodiments, the stabilizer member is a plate member having an elastomeric material in contact with at least a portion of the disk-drive connectors.

In some embodiments of the apparatus, the plurality of first disk drive and second disk-drive connectors are oriented as alternately facing coupled pairs. In some embodiments, the plurality of disk-drive connectors are positioned as a first pair of disk-drive connectors that include first and second disk-drive connectors and a second pair of disk-drive connectors that include third and fourth disk-drive connectors on the substrate, wherein a space between the first and second disk-drive connectors is less than a space between the first and second pairs of disk-drive connectors.

In some embodiments of the apparatus, the plurality of first and second disk-drive connectors are each coupled electrically and mechanically to the substrate in a row that conforms to a line, wherein the first disk-drive connectors and the second disk-drive connectors are facing in alternate directions positioned within the row. In some embodiments, the row includes two or more disk-drive connectors and fewer than two-hundred-and-one disk-drive connectors. In some embodiments, the row conforms to a substantially linear line. In some embodiments, the row conforms to a substantially stepped curved line. In some embodiments, the stepped curved line curves in a substantially exponential manner. In some embodiments, the row conforms to a substantially smooth curved line. In some embodiments, the substantially smooth curved line curves in a substantially exponential manner.

In some embodiments, the apparatus includes one or more additional rows of disk-drive connectors. In some embodiments, the rows are positioned on the substrate with substantially mirror image orientation relative to a neighboring row.

In some embodiments, the apparatus includes an enclosure. In some embodiments, the substrate is oriented parallel to a first major surface of the enclosure. In some embodiments, the enclosure includes at least one air inlet and at least one air outlet. In some embodiments, the apparatus includes at least one manifold that directs airflow over disk drives when they are connected to the disk-drive connectors. In some embodiments, the apparatus includes an air-movement device. In some embodiments, the air-movement device includes one or more fans. In some embodiments, the air-movement device includes one or more pairs of fans that rotate in opposite directions. In some embodiments, the enclosure includes a cover. In some embodiments, the cover includes a resilient material. In some embodiments, a resilient material is attached to the cover. In some embodiments, the cover includes at least one stiffening rib. In some embodiments, the apparatus includes a resilient material that is attached to a second edge of each one of a plurality of disk drives that are connected to the disk-drive connectors. In some embodiments, the apparatus includes a shipping-overshock display. In some embodiments, the apparatus includes a mother board, a personality board, or any combination thereof.

The invention provides an apparatus that includes a substrate, and a plurality of disk-drive connectors each coupled electrically and mechanically to the substrate, the plurality of disk-drive connectors including at least a first disk-drive connector and a second disk-drive connector, wherein the first disk-drive connector and the second disk-drive connector are positioned such that a rotational force produced by a first disk drive connected to the first disk-drive connector is conveyed primarily as a translational force to a second disk drive connected to the second disk-drive connector. In some embodiments, the apparatus includes an enclosure, wherein the substrate and the plurality of disk-drive connectors are attached to the enclosure, at least one memory, and an information processing unit operatively coupled to disk drives that are connected to the disk-drive connectors and to the memory, wherein the information processing unit sends read commands to the disk drives and receives data from the disk drives and from the memory. In some embodiments, the information processing unit includes a multi-processor supercomputer.

In some embodiments, the apparatus includes a plurality of substantially similar enclosures, wherein each enclosure holds a substrate and plurality of disk-drive connectors including at least a first disk-drive connector and a second disk-drive connector that are positioned such that a rotational force produced by a first disk drive connected to the first disk-drive connector is conveyed primarily as a translational force to a second disk drive that is connected to the second disk-drive connector, and wherein the plurality of enclosures are operatively coupled to the supercomputer.

In some embodiments, the apparatus includes a memory, and a video-streaming apparatus operatively coupled to receive data from the memory, wherein the video-streaming apparatus is adapted to transmit digital video to a plurality of destinations and users.

In some embodiments, the apparatus includes an enclosure to which the substrate is connected that encloses the substrate and a plurality of disk drives that are connected to the plurality of disk-drive connectors.

In some embodiments of the apparatus, the disk-drive connectors are positioned so that a first edge of each of a first and second disk drive that are connected to the disk-drive connectors includes a substantially neutral position, relative to rotational force, located along the first edge between the first corner and the second corner of the disk drive. In some embodiments, the first disk-drive connector and the second disk-drive connector are positioned relative to each other so that the neutral position of a first disk drive connected to the first disk-drive connector is at a position along the first edge of a first disk drive that is closest to the first corner of a second disk drive that is connected to the second disk-drive connector. In some embodiments, the first disk-drive connector and the second disk-drive connector are positioned so that a first and second disk drives connected to the first and second disk-drive connectors are positioned with their first major faces substantially perpendicular to each other. In some embodiments, the first disk-drive connector and the second disk-drive connector are positioned so that a first disk drive connected to the first disk-drive connector and a second disk drive connected to the second disk-drive connector are positioned with their first major faces at an acute angle. In some embodiments, the first disk-drive connector and the second disk-drive connector are positioned so that a first disk drive connected to the first disk-drive connector and a second disk drive connected to the second disk-drive connector are positioned with their first major faces substantially parallel to each other. In some embodiments, the first disk-drive connector and the second disk-drive connector are positioned so that a first disk drive connected to the first disk-drive connector and a second disk drive connected to the second disk-drive connector are positioned with their first major faces laterally offset from each other. In some embodiments, the first disk-drive connector and the second disk-drive connector are also positioned such that a rotational force produced by a second disk drive that is connected to the second disk-drive connector is at least partially conveyed as a translational force to a first disk drive that is connected to the first disk-drive connector. In some embodiments, the first disk-drive connector and the second disk-drive connector are also positioned such that the rotational force produced by a second disk drive that is connected to the second disk-drive connector is conveyed primarily as a translational force to a first disk drive that is connected to a first disk-drive connector. In some embodiments, the first disk-drive connector and the second disk-drive connector are also positioned such that a rotational force produced by a first disk drive that is connected to a first disk drive is conveyed only as a translational force to a second disk drive that is connected to the second disk-drive connector. In some embodiments, the first disk-drive connector and the second disk-drive connector are also positioned such that a rotational force produced by a second disk drive that is connected to the second disk-drive connector is conveyed only as a translational force to a first disk drive that is connected to the first disk-drive connector.

In some embodiments of the apparatus, the first disk drive has a disk rotational torque vector due to its rotating disk(s) that is substantially antiparallel to a disk rotational torque vector of the second disk drive that is due to its rotating disk(s). In some embodiments, the first disk-drive connector and the second disk-drive connector are positioned so that a first disk drive that is connected to the first disk-drive connector and a second disk drive that is connected to the second disk-drive connector are positioned with their first major faces laterally offset from each other. In some embodiments, the first disk-drive connector and the second disk-drive connector are positioned so that a first disk drive that is connected to the first disk-drive connector has a disk rotational torque vector due to its rotating disk(s) that is substantially coparallel to a disk rotational torque vector due to a rotating disk(s) of a second disk drive that is connected to the second disk-drive connector. In some embodiments, the first disk-drive connector and the second disk-drive connector are positioned so that a first disk drive that is connected to the first disk-drive connector and a second disk drive that is connected with the second disk-drive connector have their first major faces laterally offset from each other.

In some embodiments, the apparatus includes one or more resilient materials between at least some of the plurality of disk-drive connectors and the substrate. In some embodiments, the resilient material has graded shock absorbance characteristics. In some embodiments, the resilient material includes a visco-elastic material. In some embodiments, the resilient material includes a vibration damping polymer.

In some embodiments, the apparatus includes an enclosure that includes at least one air-inlet manifold and at least one air-outlet manifold, wherein air substantially passes from the inlet manifold between a first disk drive that is connected to the first disk-drive connector and a second disk drive that is connected to the second disk-drive connector to the outlet manifold.

In some embodiments, the apparatus includes an air-movement device. In some embodiments, the air-movement device includes one or more fans. In some embodiments, the air-movement device includes at least one pair of fans that are mechanically coupled and have opposite rotation directions.

The invention provides a method that includes mounting a plurality of disk-drive connectors in an enclosure, the enclosure including a connector substrate, the plurality of disk-drive connectors including at least a first disk-drive connector and a second disk-drive connector that are each electrically and mechanically coupled to the enclosure, and mechanically coupling the first disk-drive connector and the second disk-drive connector such that rotational force produced by a first disk drive that is connected to the first disk-drive connector is at least partially counteracted by rotational force produced by a second disk drive that is connected to the second disk-drive connector.

In some embodiments, the method includes operatively coupling an information processing unit to the enclosure, and adding a memory to the enclosure, wherein the information processing unit is operatively coupled to disk drives that are connected to the disk-drive connectors and to the memory, wherein the information processing unit sends read commands to the disk drives and receives data from the disk drives and memory. In some embodiments, the method includes utilizing a multi-processor supercomputer as the information processing unit.

In some embodiments, the method includes operatively coupling a plurality of substantially similar enclosures to the supercomputer, wherein each enclosure holds a substrate and plurality of disk-drive connectors including at least a first disk-drive connector and a second disk-drive connector positioned such that a rotational force produced by a first disk drive that is connected to the first disk-drive connector is conveyed primarily as a translational force to a second disk drive that is connected to the second disk-drive connector, and wherein the plurality of enclosures are operatively coupled.

In some embodiments, the method includes operatively coupling a memory to the enclosure, and operatively coupling a video-streaming apparatus to the enclosure, wherein the video-streaming apparatus receives data from the memory and is adapted to transmit digital video to a plurality of destinations and users.

In some embodiments, the method includes positioning the plurality of disk-drive connectors such that a number of the first disk-drive connectors, the number being greater than two and fewer than about one-hundred-and-one, are in a first orientation, and a substantially equal number of second disk-drive connectors are in a second orientation, wherein a plurality of first disk drives and second disk drives that are connected to the first and second disk-drive connectors are interleaved in mechanically coupled pairs with opposite rotating orientation. In some embodiments, the method includes positioning the first disk-drive connector so that a disk rotational torque vector due to a rotating disk(s) of a first disk drive that is connected to the first disk-drive connector is substantially antiparallel to a disk rotational torque vector of a second disk drive that is due to a rotating disk(s) of a second disk drive that is connected to the second disk-drive connector. In some embodiments, the method includes positioning the first disk-drive connector so that a disk rotational torque vector due to a rotating disk(s) of a first disk drive that is connected to the first disk-drive connector is substantially collinear to a disk rotational torque vector of a second disk drive that is due to a rotating disk(s) of a second disk drive that is connected to the second disk-drive connector. In some embodiments, the method includes positioning the first disk-drive connector so that a disk rotational torque vector due to a rotating disk(s) of a first disk drive that is connected to the first disk-drive connector is radially offset to a disk rotational torque vector of a second disk drive that is due to a rotating disk(s) of a second disk drive that is connected to the second disk-drive connector. In some embodiments, the method includes positioning the first disk-drive connector so that a disk rotational torque vector due to a rotating disk(s) of a first disk drive that is connected to the first disk-drive connector is collinear to a disk rotational torque vector of a second disk drive that is due to a rotating disk(s) of a second disk drive that is connected to the second disk-drive connector. In some embodiments, the method includes coupling the first disk-drive connector and the second disk-drive connector to the substrate so that a first major face of a first disk drive connected to the first disk-drive connector faces with a partial offset of a first major face of a second disk drive that is connected to the second disk-drive connector. In some embodiments, the method includes coupling the first disk-drive connector and the second disk-drive connector to the substrate so that a first major face of a first disk drive connected to the first disk-drive connector faces with no offset of a first major face of a second disk drive that is connected to the second disk-drive connector. In some embodiments, the method includes forming a first coupled pair that includes the first and second disk-drive connector, and forming a second coupled pair having a third and fourth disk-drive connector so that a first major face of a third disk drive that is connected to the third disk-drive connector faces with no offset a first major face of a fourth disk drive that is connected to the fourth disk-drive connector, and a second major face of a second disk drive that is connected to the second disk-drive connector faces with partial offset a second major face of the third disk drive.

In some embodiments, the method includes installing a controller that receives a disk access request specifying a data length of 2 L and based on the request sends substantially simultaneous disk access requests specifying a data length of L a first and second disk drive that are connected to the first and second disk-drive connectors. In some embodiments of the method, the substantially simultaneous disk access request sent to the first and second disk drives cause seek operations having rotational forces that at least partially cancel each other.

In some embodiments, the method includes forming the plurality of disk-drive connectors into coupled pairs so that disk drives connected to the disk-drive connectors have substantially opposite rotational torque within each pair of disk drives. In some embodiments, the method includes orienting the plurality of first disk-drive connectors and second disk-drive connectors so that first disk drives and second disk drives connected to the first and second disk-drive connectors form alternately facing coupled pairs. In some embodiments, the method includes coupling each of the plurality of first and second disk-drive connectors electrically and mechanically to the substrate in a row that conforms to a line, wherein first and second disk drives that are connected to the first and second disk-drive connectors are alternately positioned within the row as neighboring disk drives. In some embodiments, the row includes two or more disk-drive connectors and fewer than about two-hundred-and-one disk-drive connectors. In some embodiments, the method includes conforming the row to a substantially linear line. In some embodiments, the method includes conforming the row to a substantially stepped curved line. In some embodiments, the method includes conforming the stepped curved line so that it follows a substantially exponential curve. In some embodiments, the method includes conforming the row to a substantially smooth curved line. In some embodiments, the method includes conforming the substantially smooth curved line so that it curves in a substantially exponential manner. In some embodiments, the method includes positioning the first and second disk-drive connectors with a spacing between adjacent disk-drive connectors, wherein the spacing between neighboring disk-drive connectors follows a substantially exponential function. In some embodiments, the method includes adding one or more additional rows of disk-drive connectors. In some embodiments, the method includes positioning the rows on the substrate with substantially mirror image orientation relative to an adjoining row.

In some embodiments, the method includes enclosing the substrate and disk-drive connectors in an enclosure. In some embodiments, the method includes orienting the substrate so that it is substantially parallel to a first major surface of the enclosure. In some embodiments, the method includes providing at least one air inlet along a first surface of the enclosure and at least one air outlet along a second surface of the enclosure. In some embodiments, the method includes adding at least one manifold that directs airflow over the disk-drive connectors. In some embodiments, the method includes adding at least one air-movement device to the enclosure. In some embodiments, the method includes adding one or more pairs of fans that are coupled to have opposite rotational direction.

In some embodiments, the method includes providing a cover for the enclosure. In some embodiments, the method includes attaching stiffening ribs to the cover. In some embodiments, the method includes adding a shipping-overshock display. In some embodiments, the method includes adding a mother board, a personality board, or any combination thereof.

In some embodiments, the invention provides an apparatus that includes an enclosure for holding a plurality of drives in each of one or more rows including a first row, a plurality of sockets arranged along the first row with the socket's long dimensions generally parallel to one another and at a non-parallel angle to the first row, each socket providing electrical connection and mechanical support along a first connector edge of one or more disk drives, and a resilient support member adapted to hold a second edge other than the first connector edge of each disk drive, such that the enclosure forms an inlet air manifold along a first side of the first row and an outlet air manifold along an opposite second side of the first row.

In some embodiments of the apparatus, the inlet air manifold has a length measured parallel to the first row that is longer than the inlet air manifold's width measured perpendicular to the first row, and wherein the outlet air manifold has a length measured parallel to the first row that is longer than the outlet air manifold's width measured perpendicular to the first row.

In some embodiments of the apparatus, the sockets for the first row are mounted to circuit board forming an internal plane of the enclosure, and wherein the resilient support member includes a cover mounted parallel to the circuit board.

In some embodiments of the apparatus, the cover includes a sheet-metal plate and a visco-elastic material that is located between the plate and each disk drive position, the visco-elastic material adapted to adhere to the cover and to each disk drive.

Some embodiments of the apparatus further include a plurality of disk drives mounted to the enclosure.

In some embodiments, the invention provides a method that includes mounting a plurality of disk-drive connectors in an enclosure, the plurality of disk-drive connectors including at least a first disk-drive connector and a second disk-drive connector that are each electrically and mechanically coupled to the enclosure, and mechanically coupling the first disk-drive connector and the second disk-drive connector such that rotational force produced by a first disk drive that is connected to the first disk-drive connector is at least partially transmitted as translational force to a second disk drive that is connected to the second disk-drive connector.

In some embodiments, the method includes operatively coupling an information processing unit to the enclosure, and adding a memory to the enclosure, wherein the information processing unit is operatively coupled to disk drives that are connected to the disk-drive connectors and to the memory, and wherein the information processing unit sends read commands to the disk drives and receives data from the disk drives and memory. In some embodiments, the method includes utilizing a multi-processor supercomputer as the information processing unit.

In some embodiments, the method includes operatively coupling a memory to the enclosure, and operatively coupling a video-streaming apparatus to the enclosure, wherein the video-streaming apparatus receives data from the memory and is adapted to transmit digital video to a plurality of destinations and users.

In some embodiments, the method includes positioning the first disk-drive connector and the second disk-drive connector relative to each other so that a neutral position of the first disk drive that is connected to the first disk-drive connector is at a position along the first edge of the first disk drive that is closest to a first corner of a second disk drive that is connected to the second disk-drive connector. In some embodiments, the method includes positioning the first disk-drive connector and the second disk-drive connector so that a first disk drive connected to the first disk-drive connector and a second disk drive connected to the second disk-drive connector are positioned with their first major faces substantially perpendicular to each other. In some embodiments, the method includes positioning the first disk-drive connector and the second disk-drive connector so that a first disk drive connected to the first disk-drive connector and a second disk drive connected to the second disk-drive connector are positioned with their first major faces at an acute angle. In some embodiments, the method includes positioning the first disk-drive connector and the second disk-drive connector so that a first disk drive connected to the first disk-drive connector and a second disk drive connected to the second disk-drive connector are positioned with their first major faces substantially parallel to each other. In some embodiments, the method includes positioning the first disk-drive connector and the second disk-drive connector so that a first disk drive connected to the first disk-drive connector and a second disk drive connected to the second disk-drive connector are positioned with their first major faces laterally offset from each other.

In some embodiments, the method includes positioning an air-deflection vane to direct additional air between a first disk drive and a second disk drive that are connected to the first disk-drive connector and the second disk-drive connector.

In some embodiments, the method includes positioning the first disk-drive connector and the second disk-drive connector such that a rotational force produced by a second disk drive that is connected to the second disk-drive connector is at least partially conveyed as a translational force to a first disk drive that is connected to the first disk-drive connector. In some embodiments, the method includes positioning the first disk-drive connector and the second disk-drive connector such that a rotational force produced by a second disk drive that is connected to the second disk-drive connector is substantially conveyed as a translational force to a first disk drive that is connected to the first disk-drive connector. In some embodiments, the method includes positioning the first disk-drive connector and the second disk-drive connector such that a rotational force produced by a second disk drive that is connected to the second disk-drive connector is conveyed only as a translational force to a first disk drive that is connected to the first disk-drive connector. In some embodiments, the method includes positioning the first disk-drive connector and the second disk-drive connector so that a disk rotational torque vector due to a rotating disk(s) of a first disk drive connected to the first disk-drive connector is substantially antiparallel to a disk rotational torque vector that is due to a rotating disk(s) of a second disk drive that is connected to the second disk-drive connector. In some embodiments, the method includes positioning the first disk-drive connector and the second disk-drive connector so that a first major face of a first disk drive that is connected to the first disk-drive connector is laterally offset from a first major face of a second disk drive that is connected to the second disk-drive connector.

In some embodiments, the method includes positioning the first disk-drive connector and the second disk-drive connector so that a disk rotational torque vector due to a rotating disk(s) of a first disk drive connected to the first disk-drive connector is substantially coparallel to a disk rotational torque vector that is due to a rotating disk(s) of a second disk drive that is connected to the second disk-drive connector. In some embodiments, the method includes positioning the first disk-drive connector and the second disk-drive connector so that a first major face of a first disk drive that is connected to the first disk-drive connector is laterally offset from a first major face of a second disk drive that is connected to the second disk-drive connector.

In some embodiments, the method includes damping relative motion between at least some of the plurality of disk drives that are connected to the plurality of disk-drive connectors and the substrate. In some embodiments, the method includes using one or more resilient materials to dampen vibration energy. In some embodiments, the method includes using one or more resilient materials having graded shock absorbance characteristics. In some embodiments, the method includes using one or more resilient materials that include a vibration damping polymer. In some embodiments, the method includes using one or more resilient materials that include a visco-elastic material.

The invention provides a method that includes mounting a plurality of disk drives in an enclosure, the enclosure including a connector substrate, the plurality of disk drives including at least a first disk drive and a second disk drive, vibrationally coupling the first disk drive to the second disk drive, and sending a first seek operation to the first disk drive and a second seek operation to the second disk drive, wherein a timing of the first seek operation relative to the second seek operation is adjusted to minimize adverse vibrational interaction between the first disk drive and the second disk drive.

In some embodiments, the method includes mechanically coupling the first disk drive and the second disk drive such that rotational force produced by the first disk drive is at least partially counteracted by rotational force produced by the second disk drive. In some embodiments, the first and second seek operations are performed substantially simultaneously. In some embodiments, the first and second seek operations are timed so that the second seek operation does not occur while the first disk drive is reading data. In some embodiments, the first and second seek operations are timed so that the second seek operation does not occur while the first disk drive is writing data.

In some embodiments, the method includes obtaining vibration-interaction information regarding the first and second disk drives and adjusting the time of the second seek operation based on the information. In some embodiments, the method includes performing a plurality of seek operations to the second disk drive while the first disk drive is reading data in order to generate the vibration-interaction information. In some embodiments, the method includes storing the vibration interaction information in a look-up table.

In some embodiments of the method, the plurality of disk drives further include a third disk drive and a fourth disk drive and the method further includes performing a plurality of seek operations to the third disk drive while the first disk drive is reading data in order to generate vibration-interaction information relating to the third and first disk drives, storing the vibration interaction information in the look-up table, and choosing between performing a seek operation to the second disk drive versus performing a seek operation to the third disk drive based on the vibration-interaction information contained in the look-up table.

The invention provides an apparatus that includes a data structure having a plurality of entries, each entry containing vibration-interaction information relative to a read operation occurring on a first disk drive of a pair of disk drives and a seek operation being performed on a second disk drive of the pair. In some embodiments, the apparatus includes a memory and an information processing unit operatively coupled together, wherein the data structure is stored in the memory and wherein the information processing unit is adapted to adjust a timing of at least one seek operation based on information stored in the data structure. In some embodiments, the apparatus includes a video-streaming unit operatively coupled to the information processing unit, wherein the video-streaming unit receives data from the memory and is adapted to transmit digital video to a plurality of destinations and users. In some embodiments, the apparatus includes a multi-processor supercomputer operatively coupled to the information processing unit.

The invention provides an apparatus that includes a memory, the memory holding vibration-interaction information, and an information processing unit operatively coupled to the memory to receive the vibration-interaction information and adjust a timing of seek operations to a plurality of disk drives based on the information. In some embodiments, the apparatus includes an enclosure that holds the plurality of disk drives, the enclosure operatively coupled to the information-processing unit.

The invention provides a method that includes mounting a plurality of disk drives in shock mounts in an enclosure, and detenting the plurality of disk drives against vibration using a disengagable detent device. In some embodiments of the method, the detenting includes inserting a disengagable detent device that is wedge shaped at a first end and adapted to be inserted against each of a plurality of disk drives for transport and which can be disengaged for disk operation. In some embodiments, the inserting includes wedging the detent device against a plurality of disk drives in a non-simultaneous sequential manner. In some embodiments, the detenting includes camming a disengagable detent device into an engaged position for shipping; wherein the detent device is adapted to be disengaged for disk drive operation. In some embodiments, the camming is performed against a plurality of disk drives in a non-simultaneous sequential manner. In some embodiments, the camming is performed against a plurality of disk drives in a substantially simultaneous manner.

The invention provides an apparatus that includes an enclosure, a substrate held within the enclosure, a plurality of disk-drive connectors each coupled mechanically to the substrate, the plurality of disk-drive connectors including at least a first and a second disk-drive connector, and an over-shock detector operatively coupled to the enclosure and adapted to detect and store information regarding one or more over-shock events. In some embodiments, the apparatus includes at least one boot unit that includes one or more resilient materials, wherein at least some of the plurality of disk-drive connectors are each in contact with a boot unit. In some embodiments, the apparatus includes at least one boot unit having graded shock absorbance characteristics. In some embodiments, the apparatus includes at least one boot unit that includes a vibration damping polymer. In some embodiments of the apparatus, the over-shock detector is further operable to store time information regarding the over-shock events.

The invention provides a method that includes analyzing vibration-interaction between a plurality of disk drives held in an enclosure, and storing information that is based on the analysis into a data structure. In some embodiments, the method includes reading the stored information and adjusting a timing of at least one seek operation based on the information.

The invention provides a method that includes mounting a plurality of disk drives to disk-drive connectors within an enclosure, adhering a resilient sheet across the plurality of disk drives, and attaching a cover to the resilient sheet. In some embodiments of the method, attaching of the cover further includes adhering the cover to the resilient sheet. In some embodiments, the resilient sheet is attached to the cover before the resilient sheet is adhered to the plurality of disk drives. In some embodiments, the method includes connecting each of the plurality of disk drives to a boot unit. In some embodiments, the method includes adjusting a height of the boot unit based on a vibration characteristic of the plurality of disk drives. In some embodiments, the method includes connecting each of the plurality of disk drives to its own respective boot unit. In some embodiments, the method includes connecting each of the plurality of disk drives to a plurality of boot units. In some embodiments, the method includes connecting each of the plurality of disk drives to a vibration-absorbing member. In some embodiments, the method includes adjusting a height of the vibration-absorbing member based on a vibration characteristic of the plurality of disk drives. In some embodiments, the method includes connecting each of the plurality of disk drives to its own respective vibration-absorbing member. In some embodiments, the method includes connecting each of the plurality of disk drives to a plurality of vibration-absorbing members.

The invention provides an apparatus that includes a plurality of disk drives mounted to disk-drive connectors within an enclosure, a resilient sheet across the plurality of disk drives, and a cover. In some embodiments, the cover is adhered to the resilient sheet. In some embodiments, the resilient sheet is attached to the cover before the resilient sheet is adhered to the plurality of disk drives. In some embodiments, each of the plurality of disk drives is connected to a boot unit. In some embodiments, a height of the boot unit is adjusted based on a vibration characteristic of the plurality of disk drives. In some embodiments, each of the plurality of disk drives is connected to its own respective boot unit. In some embodiments, each of the plurality of disk drives is connected to a plurality of boot units. In some embodiments, each of the plurality of disk drives is connected to a vibration-absorbing member. In some embodiments, a height of the vibration-absorbing member is adjusted based on a vibration characteristic of the plurality of disk drives. In some embodiments, each of the plurality of disk drives is connected to its own respective vibration-absorbing member. In some embodiments, each of the plurality of disk drives is connected to a plurality of vibration-absorbing members.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
an enclosure;
a substrate mounted in the enclosure and having a first plurality of disk-drive connectors mounted to the substrate; and
one or more processing units and memory mounted in the enclosure and operatively connected to the first plurality of disk-drive connectors to form a video-streaming subsystem, the memory coupled to the one or more processing units and operable to send and receive data from disk drives connected to the first plurality of disk-drive connectors and to simultaneously output a plurality of video streams.

2. The apparatus of claim 1, further comprising:
a plurality of disk drives, each one of the plurality of disk drives connected to one of the first plurality of disk-drive connectors.

3. The apparatus of claim 2, further comprising:
a cable system operatively coupled to a large plurality of subscribers and to the one or more processing units and memory, and providing capability for video-on-demand to the subscribers.

4. The apparatus of claim 1, further comprising:
a first plurality of disk drives, each one of the first plurality of disk drives connected to one of the first plurality of disk-drive connectors;
wherein the first plurality of disk-drive connectors are positioned in a row that extends generally from an air-inlet side of the enclosure to an air-outlet side of the enclosure;
wherein the enclosure has an air-inlet manifold extending along a first side of the row from the air-inlet side of the enclosure for a length distance as measured from the air-inlet side of the enclosure to a furthest drive in the row;
wherein the length distance is greater than a width of the air-inlet manifold as measured perpendicular to the length, and an air-outlet manifold extending along an opposite second side of the row to the air-outlet manifold; and
wherein the apparatus includes a plurality of fans mounted to the enclosure and configured to move air through the enclosure such that the air moves from the air-inlet manifold between the plurality of disk drives to get to the air-outlet manifold.

5. The apparatus of claim 1, further comprising:
a first plurality of disk drives, each one of the first plurality of disk drives connected to one of the first plurality of disk-drive connectors;
wherein the first plurality of disk-drive connectors are positioned in a row that extends generally from an air-inlet side of the enclosure to an air-outlet side of the enclosure;
wherein the enclosure has an air-inlet manifold extending along a first side of the row from the air-inlet side of the enclosure for a length distance as measured from the air-inlet side of the enclosure to a furthest drive in the row;
wherein the length distance is greater than a width of the air-inlet manifold as measured perpendicular to the length, and an air-outlet manifold extending along an opposite second side of the row to the air-outlet manifold; and
wherein the air-inlet manifold is tapered from a larger cross-section closer to the air inlet manifold to a smaller cross section farther from the air-inlet manifold.

6. The apparatus of claim 1, further comprising:
a first plurality of disk drives, each one of the first plurality of disk drives connected to one of the first plurality of disk-drive connectors;
wherein the first plurality of disk-drive connectors are positioned in a row that extends generally from an air-inlet side of the enclosure to an air-outlet side of the enclosure;
wherein the enclosure has an air-inlet manifold extending along a first side of the row from the air-inlet side of the enclosure for a length distance as measured from the air-inlet side of the enclosure to a furthest drive in the row;
wherein the length distance is greater than a width of the air-inlet manifold as measured perpendicular to the length, and an air-outlet manifold extending along an opposite second side of the row to the air-outlet manifold; and wherein adjacent ones of the disk drive connectors are separated from one another by a spacing, and the spacings between adjacent ones of drive connectors varies from a smaller value closer to the air inlet manifold to a larger value farther from the air-inlet manifold.

7. The apparatus of claim 1, wherein the first plurality of disk-drive connectors are positioned in a first row that extends from an air-inlet side of the enclosure to an air-outlet side of the enclosure, and wherein the apparatus further includes at least:

a first plurality of disk drives, wherein each one of the first plurality of disk drives is connected to one of the first plurality of disk-drive connectors;

a second plurality of disk-drive connectors mounted to the substrate in a second row that extends from the air-inlet side of the enclosure to the air-outlet side of the enclosure;

a second plurality of disk drives, wherein each one of the second plurality of disk drives is connected to one of the second plurality of disk-drive connectors;

a third plurality of disk-drive connectors mounted to the substrate in a third row that extends from the air-inlet side of the enclosure to the air-outlet side of the enclosure;

a third plurality of disk drives, wherein each one of the third plurality of disk drives is connected to one of the third plurality of disk-drive connectors;

a fourth plurality of disk-drive connectors mounted to the substrate in a fourth row that extends from the air-inlet side of the enclosure to the air-outlet side of the enclosure;

a fourth plurality of disk drives, wherein each one of the fourth plurality of disk drives is connected to one of the fourth plurality of disk-drive connectors; and wherein the apparatus includes a plurality of fans configured to move air in one or more air-inlet manifolds extending along a first side of each row from the air-inlet side of the enclosure for a length distance as measured from the air-inlet side of the enclosure to a furthest drive in the respective row, wherein the length distance is greater than a width of the respective air-inlet manifold as measured perpendicular to the length, and to move air in one or more air-outlet manifolds extending along an opposite second side of each row to the air-outlet manifold such that the air moves from the air-inlet manifolds between the disk drives to the air outlet manifolds.

8. A method comprising:

providing a device having an enclosure and a substrate mounted to the enclosure, the substrate having a first plurality of disk-drive connectors mounted to the substrate in a first row that extends from an air-inlet side of the enclosure to an air-outlet side of the enclosure and a second plurality of disk-drive connectors mounted to the substrate in a second row that extends from the air-inlet side of the enclosure to the air-outlet side of the enclosure, each one of the first plurality of disk-drive connectors having a respective disk drive mounted to it, each one of the second plurality of disk-drive connectors having a respective disk drive mounted to it, the enclosure including a processing unit and memory mounted in the enclosure and operatively connected to the first plurality of disk-drive connectors and to the second plurality of disk-drive connectors to form a video-streaming subsystem;

receiving, by the device, data access requests for video programming for a plurality of destinations;

simultaneously reading data from a plurality of the first plurality of disk drives and from a plurality of the second plurality of disk drives based on the received requests; and simultaneously outputting a plurality of video streams based on the read data from the video-streaming subsystem to the plurality of destinations based on the requests.

9. The method of claim 8, further comprising: connecting the video-streaming subsystem to the destinations via a cable system.

10. The method of claim 8, wherein the reading of data from the plurality of the first plurality of disk drives further includes arranging the data being read onto counter-rotating pairs of the plurality of the first plurality of disk drives; and performing at least some seek operations simultaneously to each of two drives of at least one of the pairs in order to cancel at least to some extent, rotational accelerations.

11. The method of claim 8, wherein the enclosure has an air-inlet manifold extending along a first side of the first row from the air-inlet side of the enclosure, and an air-outlet manifold extending along an opposite second side of the first row to the air-outlet manifold, and wherein the method further includes:

moving air through the enclosure such that the air moves from the air-inlet manifold between the plurality of disk drives to get to the air-outlet manifold.

12. The method of claim 8, wherein the enclosure has an air-inlet manifold extending along a first side of the first row from the air-inlet side of the enclosure, and an air-outlet manifold extending along an opposite second side of the first row to the air-outlet manifold, and wherein the method further includes:

tapering the air-inlet manifold from a larger cross-section closer to the air inlet manifold to a smaller cross section farther from the air-inlet manifold.

13. The method of claim 8, wherein the first plurality of disk-drive connectors are positioned in a row that extends from an air-inlet side of the enclosure to an air-outlet side of the enclosure; wherein the enclosure has an air-inlet manifold extending along a first side of the row from the air-inlet side of the enclosure for a length distance as measured from the air-inlet side of the enclosure to a furthest drive in the respective row, wherein the length distance is greater than a width of the respective air-inlet manifold as measured perpendicular to the length, and an air-outlet manifold extending along an opposite second side of the row to the air-outlet manifold, wherein the disk drives of each pair of disk drives are separated from one another by a spacing; and wherein the method further includes varying the spacings between adjacent ones of the drives from a smaller value closer to the air inlet manifold to a larger value farther from the air-inlet manifold.

14. The method of claim 8, wherein the first plurality of disk-drive connectors are positioned in a first row that extends from an air-inlet side of the enclosure to an air-outlet side of the enclosure, and wherein the device further includes at least a third plurality of disk-drive connectors mounted to the substrate in a third row that extends from the air-inlet side of the enclosure to the air-outlet side of the enclosure and a disk drive connected to each one of the third plurality of disk-drive connectors and a fourth plurality of disk-drive connectors mounted to the substrate in a fourth row that extends from the air-inlet side of the enclosure to the air-outlet side of the enclosure and a disk drive connected to each one of the fourth plurality of disk-drive connectors; and wherein the method further includes moving air into one or more air-inlet manifolds extending along a first side of each row from the air-inlet side of the enclosure, and moving air in one or more air-outlet manifolds extending along an opposite second side of each row to the air-outlet manifold such that the air moves from the air-inlet manifolds to the air outlet manifolds by moving between the disk drives.

15. An apparatus comprising:
a device that includes:
an enclosure;
a substrate mounted in the enclosure and having a first plurality of disk-drive connectors mounted to the substrate and a second plurality of disk-drive connectors mounted to the substrate, each one of the first plurality of disk-drive connectors having a respective disk drive mounted to it, each one of the second plurality of disk-drive connectors having a respective disk drive mounted to it; and
a processing unit and memory mounted in the enclosure and operatively connected to the first plurality of disk-drive connectors and the second plurality of disk-drive connectors to form a video-streaming subsystem; and
means for receiving, by the device, data access requests for video programming from a plurality of destinations;
means for simultaneously reading data from a plurality of the first plurality of disk drives and from a plurality of the second plurality of disk drives based on the received requests; and
means for simultaneously outputting a plurality of video streams based on the read data from the video-streaming subsystem to the plurality of destinations based on the requests.

16. The apparatus of claim 15, farther comprising: means for connecting the video-streaming subsystem to the destinations via cable.

17. The apparatus of claim 15, farther comprising:
means for arranging the data being read onto counter-rotating pairs of the plurality of the first plurality of disk drives; and
means for performing at least some seek operations simultaneously to each of two drives of at least one of the pairs in order to cancel at least to some extent, rotational accelerations.

18. The apparatus of claim 15, wherein the enclosure has an air-inlet manifold extending along a first side of the first row from the air-inlet side of the enclosure, and an air-outlet manifold extending along an opposite second side of the first row to the air-outlet manifold, and wherein the apparatus further includes:

means for moving air through the enclosure such that the air moves from the air-inlet manifold between the plurality of disk drives to get to the air-outlet manifold.

19. The apparatus of claim 15, wherein the enclosure has an air-inlet manifold extending along a first side of the first row from the air-inlet side of the enclosure for a length distance as measured from the air-inlet side of the enclosure to a furthest drive in the respective row, wherein the length distance is greater than a width of the respective air-inlet manifold as measured perpendicular to the length, and an air-outlet manifold extending along an opposite second side of the first row to the air-outlet manifold, and wherein the apparatus farther includes:

means for tapering the air-inlet manifold from a larger cross-section closer to the air inlet manifold to a smaller cross section farther from the air-inlet manifold.

20. The apparatus of claim 15, wherein the first plurality of disk-drive connectors are positioned in a first row that extends from an air-inlet side of the enclosure to an air-outlet side of the enclosure, and wherein the device further includes at least a third plurality of disk-drive connectors mounted to the substrate in a third row that extends from the air-inlet side of the enclosure to the air-outlet side of the enclosure and a disk drive connected to each one of the third plurality of disk-drive connectors and a fourth plurality of disk-drive connectors mounted to the substrate in a fourth row that extends from the air-inlet side of the enclosure to the air-outlet side of the enclosure and a disk drive connected to each one of the fourth plurality of disk-drive connectors; and wherein the apparatus further includes:

means for moving air into one or more air-inlet manifolds extending along a first side of each row from the air-inlet side of the enclosure, and means for moving air in one or more air-outlet manifolds extending along an opposite second side of each row to the air-outlet manifold such that the air moves from the air-inlet manifolds to the air outlet manifolds by moving between the disk drives.

* * * * *

UNITED STATES PATENT AND TRADEMARK OFFICE
CERTIFICATE OF CORRECTION

| | | |
|---|---|---|
| PATENT NO. | : 7,626,805 B2 | Page 1 of 1 |
| APPLICATION NO. | : 11/537607 | |
| DATED | : December 1, 2009 | |
| INVENTOR(S) | : Hall et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this

Second Day of November, 2010

David J. Kappos
*Director of the United States Patent and Trademark Office*